Dec. 12, 1967  T. C. MURRAY ET AL  3,357,574

SEQUENTIAL CONTROL SYSTEM

Filed June 30, 1965  23 Sheets-Sheet 1

INVENTORS
THOMAS C. MURRAY
RUSSELL R. ROBERTS
BY
ATTORNEYS

INVENTORS
THOMAS C. MURRAY
RUSSELL R. ROBERTS
ATTORNEYS

FIG. 4

INVENTORS
THOMAS C. MURRAY
RUSSELL R. ROBERTS
ATTORNEYS

INVENTORS
THOMAS C. MURRAY
RUSSELL R. ROBERTS
BY
ATTORNEYS

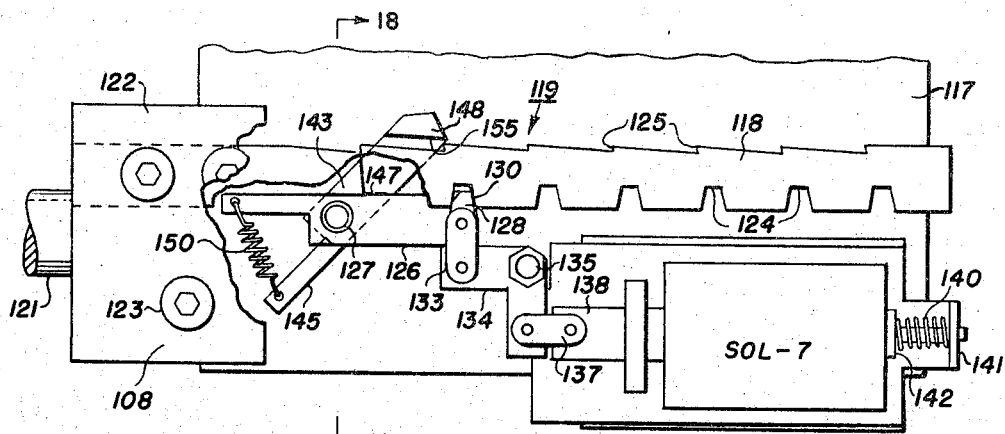
FIG. 13
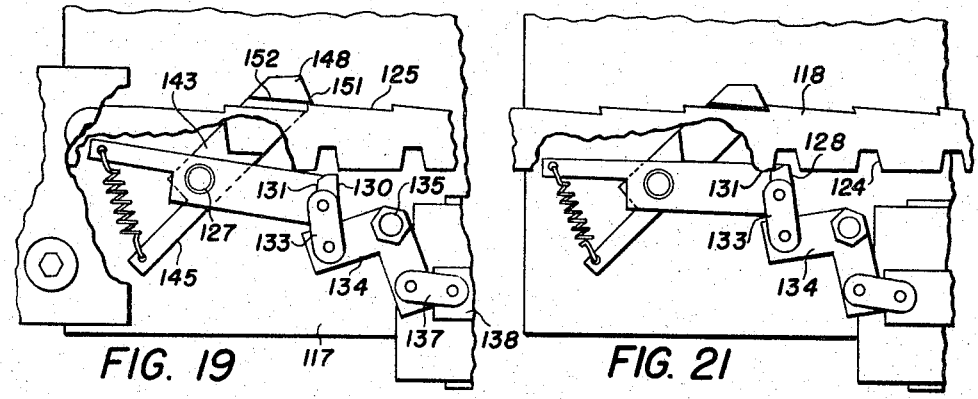
FIG. 19  FIG. 21
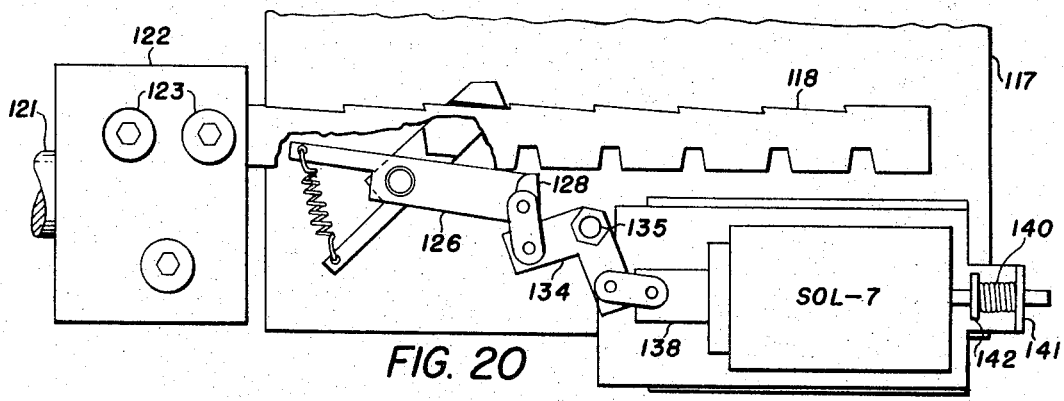
FIG. 20
INVENTORS
THOMAS C. MURRAY
RUSSELL R. ROBERTS
BY
ATTORNEYS

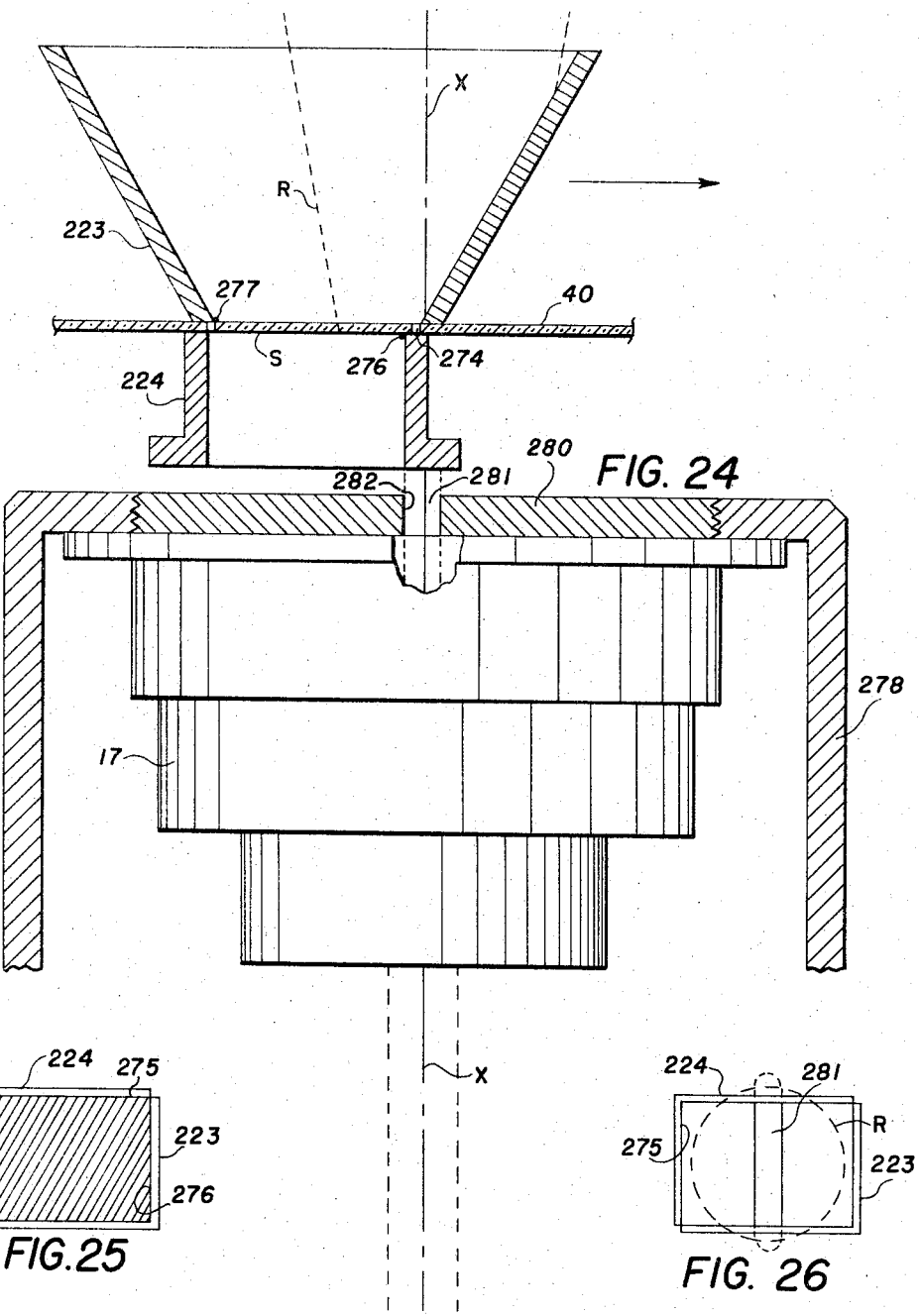

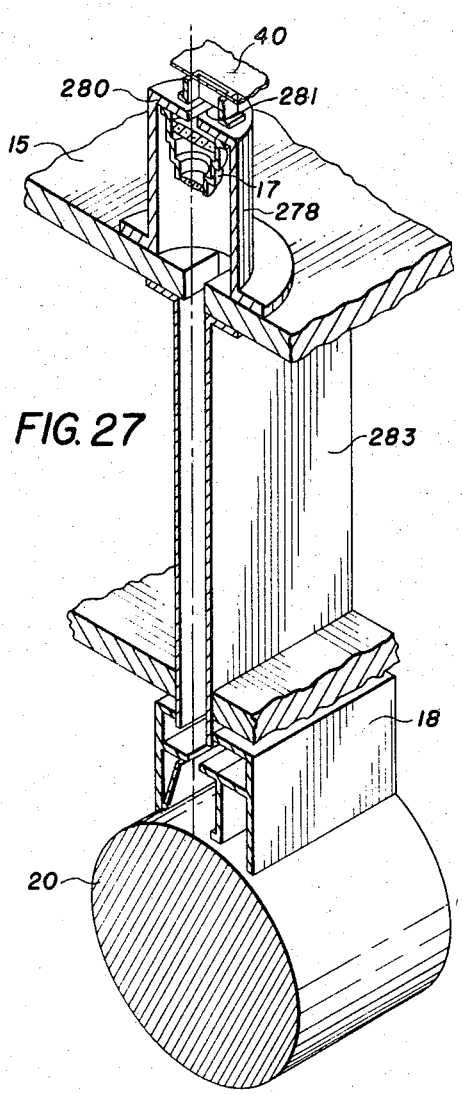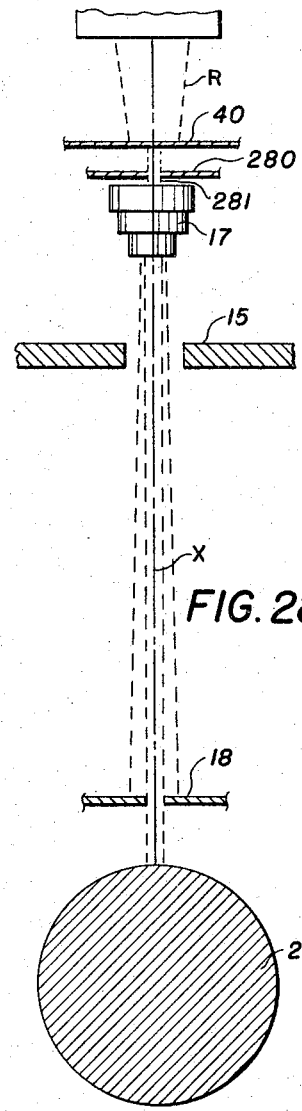

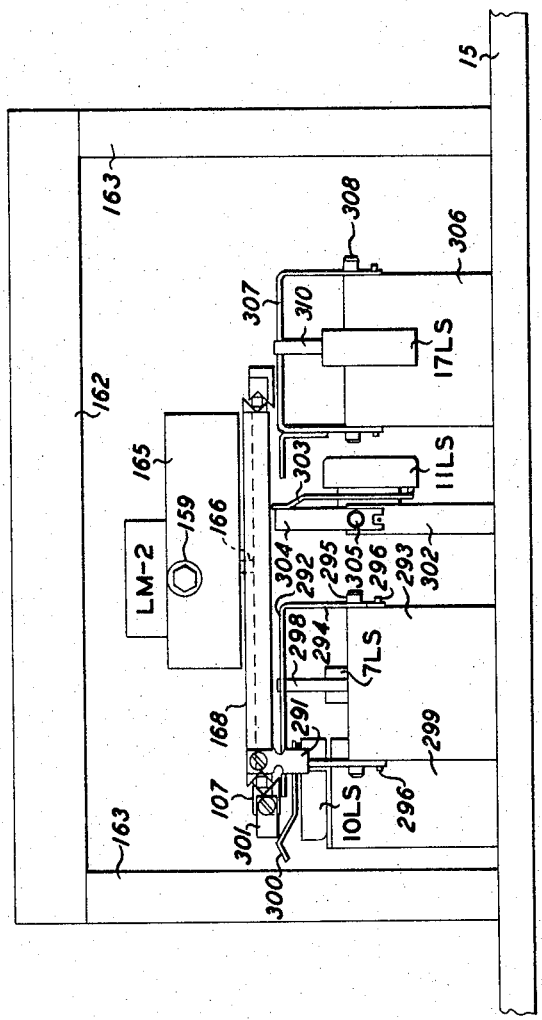

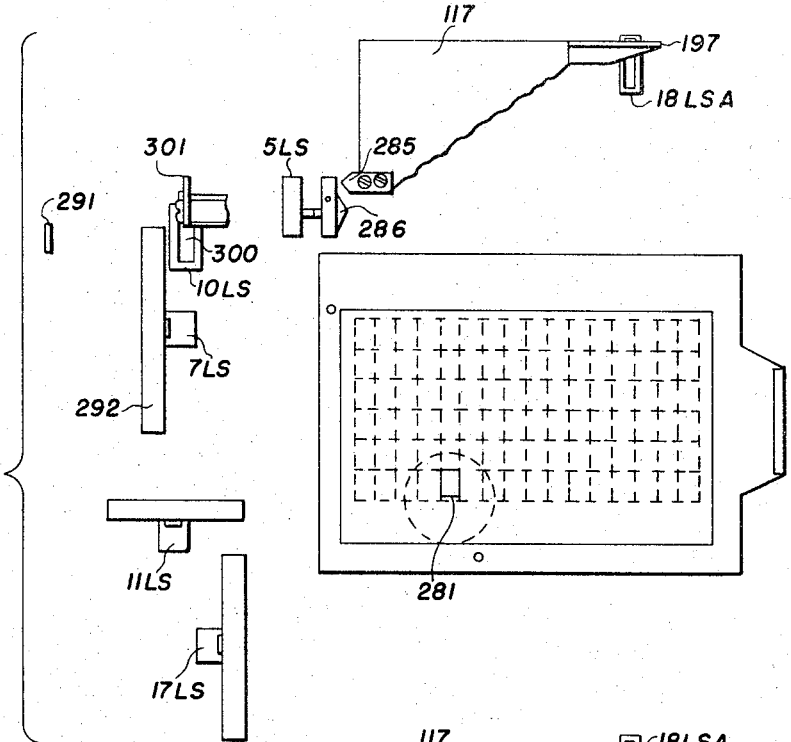
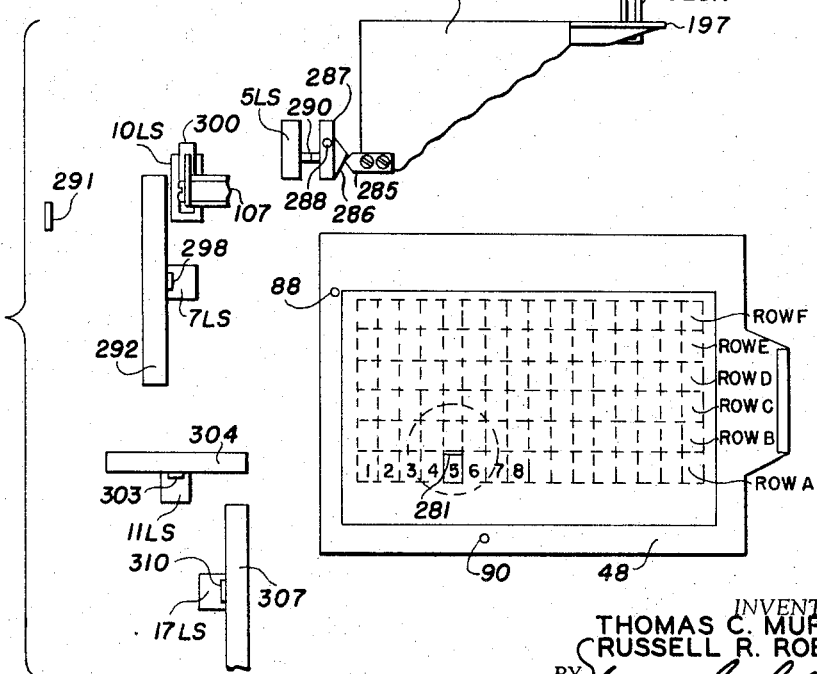

Dec. 12, 1967   T. C. MURRAY ET AL   3,357,574
SEQUENTIAL CONTROL SYSTEM
Filed June 30, 1965   23 Sheets-Sheet 18

INVENTORS
THOMAS C. MURRAY
RUSSELL R. ROBERTS
BY
ATTORNEYS

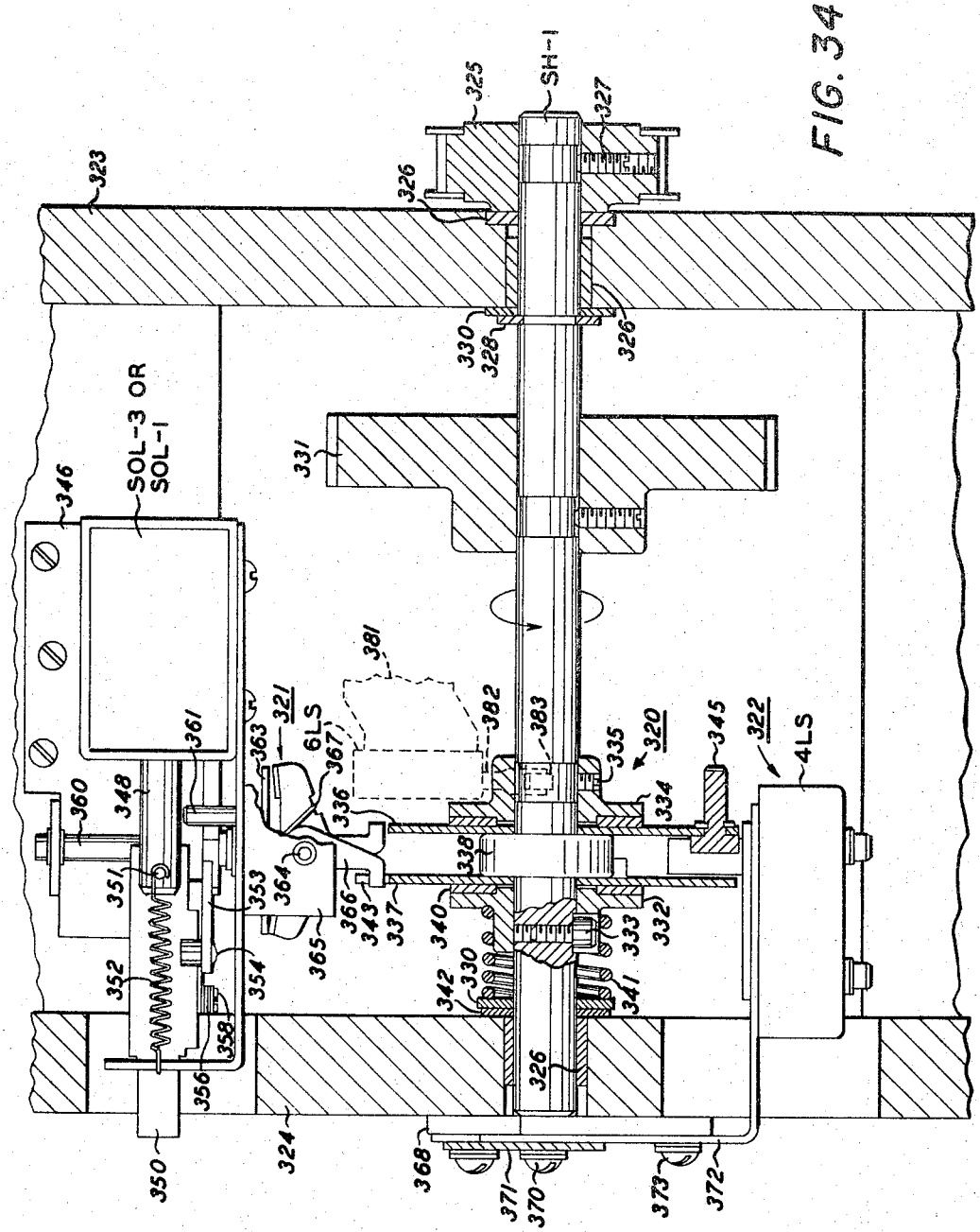

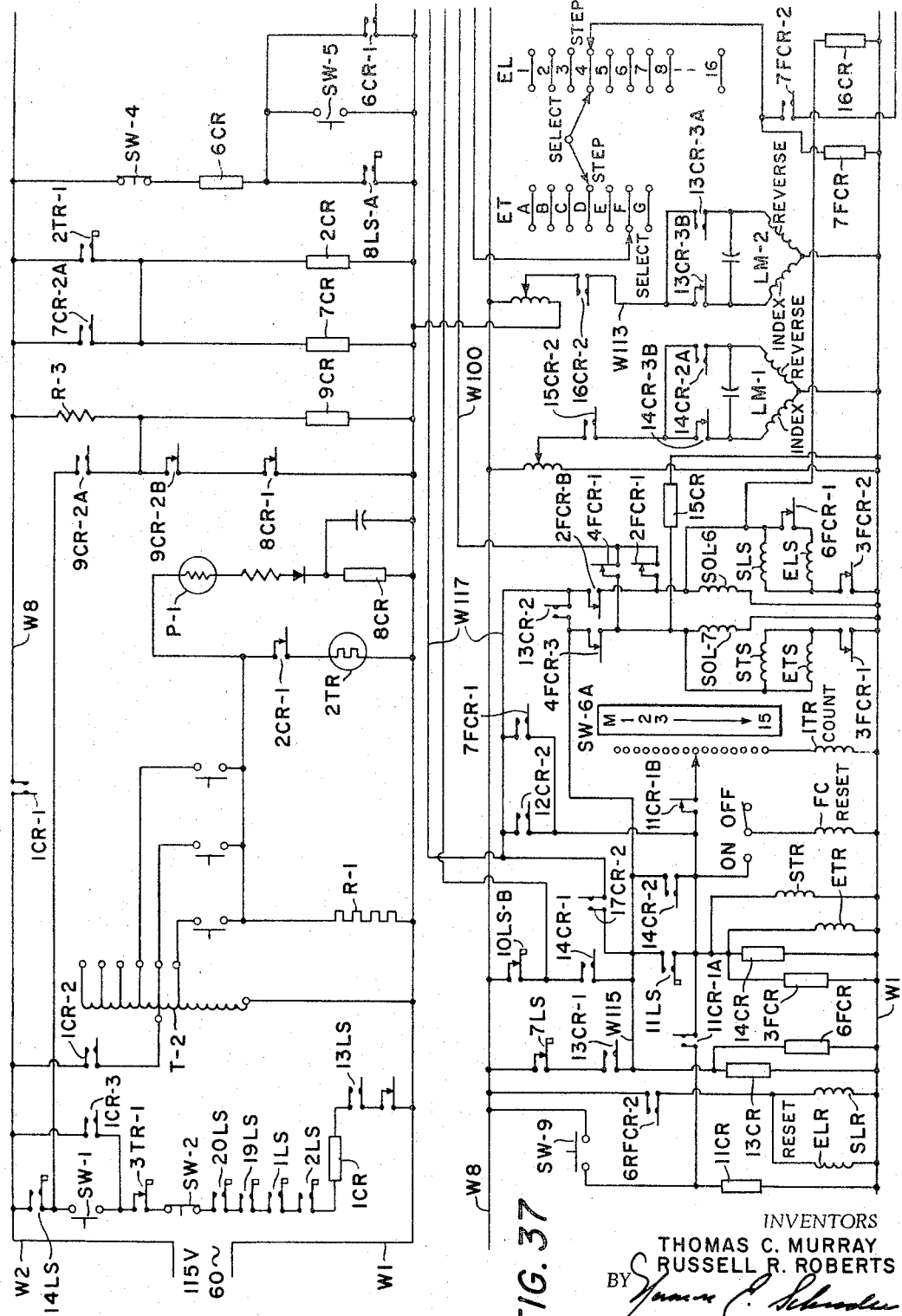
FIG. 37
INVENTORS
THOMAS C. MURRAY
RUSSELL R. ROBERTS
BY
ATTORNEYS

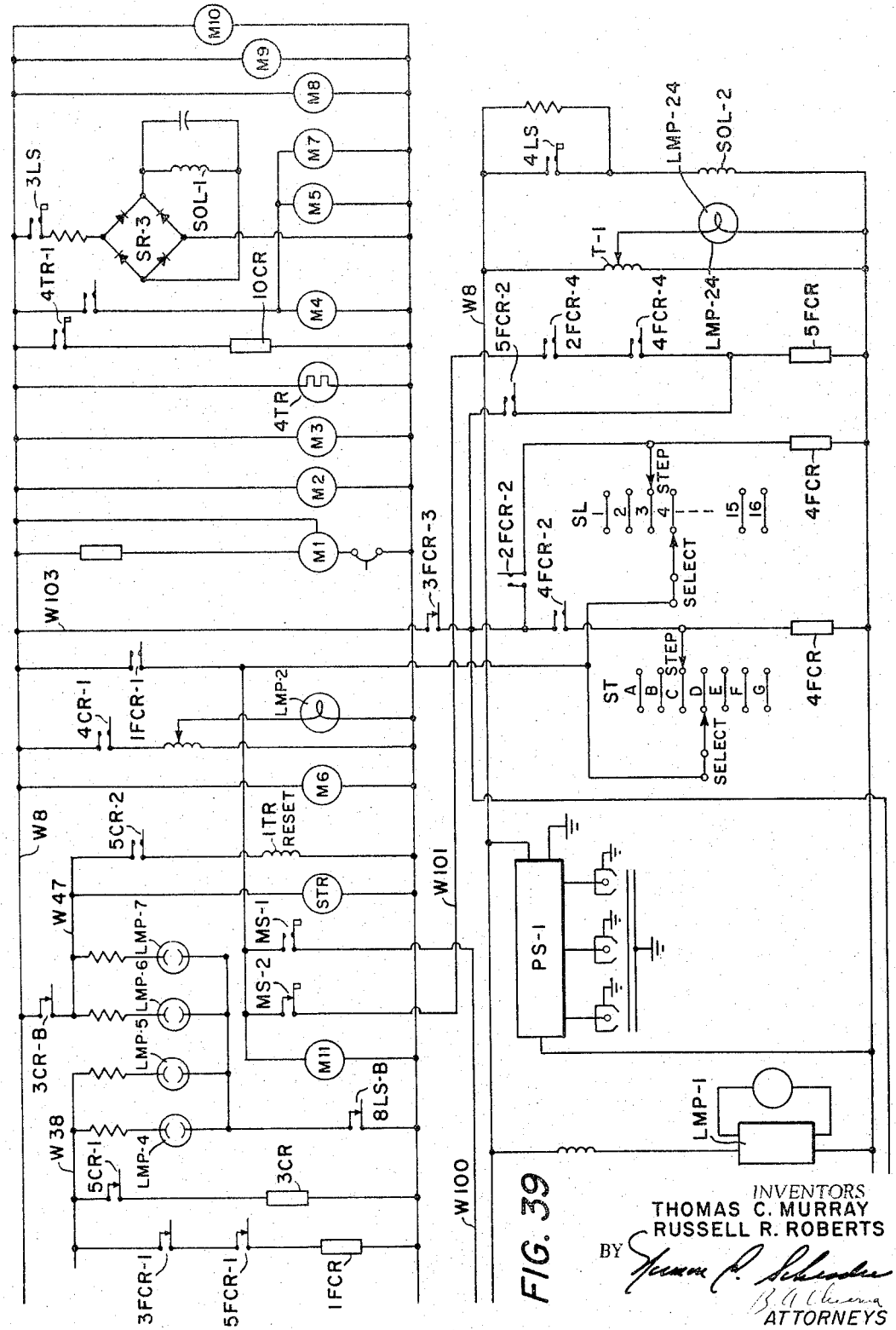

3,357,574
SEQUENTIAL CONTROL SYSTEM
Thomas C. Murray, Rochester, and Russell R. Roberts, Ontario, N.Y., assignors to Xerox Corporation, Rochester, N.Y., a corporation of New York
Filed June 30, 1965, Ser. No. 468,338
2 Claims. (Cl. 214—1)

ABSTRACT OF THE DISCLOSURE

An apparatus arranged to control sequential movement of a positionable element along two directional lines of movement and having an individual indexing means for imparting each of such movements, a drive system for imparting motion to a support for the positionable element and the indexing means and, a control circuit arranged to effect the sequential movement of the support after specific movements of the positionable element in one of the two lines of movement.

---

This invention relates to improvements in automatic control systems and particularly to improvements in the sequential control of the movement of a positionable element that may be utilized in the making of enlarged reproductions or projections from microimages arranged on a microfiche card.

As is well known, in recent years the steadily increasing size of various industries and especially the scientific information available to the government has required an enormous increase in the number and variety of technical records and reports that must be made, maintained, disseminated and be kept available for use. Prior to the advent of the unitized microform known as microfiche, conventional systems utilizing aperture cards or microfilm rolls and various types of viewing or print-out devices were employed for this purpose. However, the increasing enormity of record making and print-out operations made this phase of information storage, retrieval and dissemination increasingly expensive and burdensome to the point that it was becoming economically unfeasible to continue by conventional techniques.

Generally, in the microfilm data processing system, records are maintained under conditions of relative security from destruction and at the same time are available for day-to-day use. This system, generally known as a "unitized" microfilm system, comprises the basic steps of (1) copying onto microfilm, original drawings, documents, memorando, reports, or other records likely to require reproduction at a later date, etc.; (2) maintaining a continuous film reel of the microfilm or mounting the individual microfilm frames into the apertures of microfilm data processing cards, which may be designated by coded perforations for use in conventional card-controlled machines; and (3) using such film reels or microfilm cards for the reproduction of the film information thereon. However, the use of aperture cards involves considerable costs for mounting the microfilm frames on processing cards, for handling and filing more than one card for each original in the event that a multi-document report is to be printed out on a print-out apparatus.

In the field of microfilming, a microfiche is a single sheet of film containing sequences of microimages and is provided with a border area for titles, authors, names, classification data, etc., which can be read by the unaided eye. A microfiche is an ideal form for containing related images and is unsurpassed when compared to other systems of microfilming for economy, storage, ease of handling and print-out for images that represent many pages of a single report or books that are to be occasionally or extensively reproduced for wide distribution.

A microfiche may contain anywhere from 20 to 112 microimages, depending upon the size of the form film sheet. For recording and storing images of periodicals, books or reports having 20 to 112 pages, a single microfiche will accomplish the purpose as opposed to the need for the same number of aperture cards as there are pages. The storage of a single film sheet requires far less space than a bundle of aperture cards, and the handling of a single film sheet for processing and print-out involves far less manipulative steps than that necessary for processing and the print-out of aperture cards. This ease of handling for all phases in microfilm use is further compounded when microimages are to be used as masters to produce other microimages.

In the use of conventional aperture cards with the present day microfilm reproduction apparatus, a microimage in the form of a microfilm frame is mounted in an aperture card, and the card is key punched with appropriate holes and notches representing certain descriptive terms defining, identifying, or relating to the microfilm picture and placed in an index file. Thereafter, these cards may be manually or machine sorted and otherwise processed when the index file is interrogated in accordance with conventional uses of such cards. For viewing or reproducing a multi-page record, book, periodical or report, it will be apparent then that the use of microfilm aperture cards requires the practice of many processing steps and the need for corresponding equipment to practice the process.

The present invention is able to avoid certain disadvantages in microfilm viewing or reproduction processes by being particularly adapted to control movement of the images on a microfiche during use thereof in a reproduction machine. As previously stated, a typical minified data or information form contemplated herein is the type which has a plurality of sequentially arranged microimages on a single card.

By means of the present invention, it is possible to control three separate movements of a microfiche conveniently and economically that would contribute substantially to the utility and effectiveness of minified records system. This is effected by means of an improved drive system and an arrangement of driven structure that can support a microfiche during indexing and scanning in an optical scanning system. The images produced thereby may be projected onto a sensitized surface of a reproduction apparatus such as a xerographic machine or onto a projection screen for viewing and study.

A further object of the invention is to improve indexing drive systems for controlling indexing movement in at least two directions and a continuous movement in another phase.

The principal object of the invention is to improve indexing drive systems for controlling indexing movement in at least two directions and a continuous movement in another phase.

A further object of the invention is to improve microfiche handling apparatus to enable automatic and precise movement of a microfiche with reproduction or viewing systems.

These and other objects of the invention are attained by means of an improved sequential drive system employing a plurality of drive devices useful with microfiche handling apparatus which is adapted for moving a microfiche containing microimages seriatim, transversely and longitudinally, whereby each microimage may be transported past the optical axis of a projection system. For illustration purposes, the sequential control system is used to control movement of a microfiche in timed relation to the movement of a sensitized xerographic plate whereby the light image of each of the microimages is effective to form an electrostatic latent image on the xerographic plate in an enlarged configuration of the light image. Thereafter, the electrostatic latent image is developed to form a xerographic powder image of the image on the plate and transferred to a sheet of support material. After image transfer, the transfer sheet material is passed through a fusing apparatus wherein the xerographic powder image is permanently affixed to the sheet. The apparatus also includes means for controlling the operation of the microfiche apparatus whereby a predetermined number of reproductions of each microfiche may be made, as required. While a complete automatic xerographic reproduction machine is illustrated and described herein, it is only for illustration purposes as the machine provides a typical environment for the use to which the invention may be made.

A preferred form of the invention is shown in the accompanying drawings in which:

FIG. 4 is a schematic illustration of a typical microfiche card showing the arrangement of microimages thereon;

FIG. 13 is a plan view of one of the indexing devices utilized in the handling mechanism;

FIGS. 19, 20 and 21 are plan views, partly broken away, showing the indexing mechanism in various positions of operation;

FIG. 24 is a fragmentary view of the optical system utilized in the microfiche handling mechanism as it is applied to a microfiche card;

FIGS. 25 and 26 are schematic illustrations of the application of a detail of the optical system upon the microfiche card;

FIG. 27 is an isometric view of the optical system in relation to the xerographic drum;

FIG. 28 is a schematic illustration of the optical system showing the path of the light rays produced thereby;

FIG. 29 is a rear view of the microfiche handling mechanism showing the arrangement of some of the control limit switches therefor;

FIGS. 30, 31, 32 and 33 are schematic illustrations of the various arrangements that the microfiche holding device assumes relative to some of the control switches during operation of the handling mechanism;

FIG. 34 is a top view, partly in section, of the xerographic processing programmer for coordinating operation between the microfiche handling mechanism and xerographic processing;

FIGS. 37, 38 and 39 are schematic electrical wiring diagrams of the xerographic apparatus and, when combined in end-to-end relationship, illustrate the complete wiring system.

Throughout this description, the front of the xerographic processing system (see FIG. 1) is regarded as that portion which the operator faces while placing a microfiche holder in the machine for reproduction and while adjusting the several manual operating controls. The right and left end of the machine are regarded as being to the right and left of the operator as he faces the machine.

Figure 1:
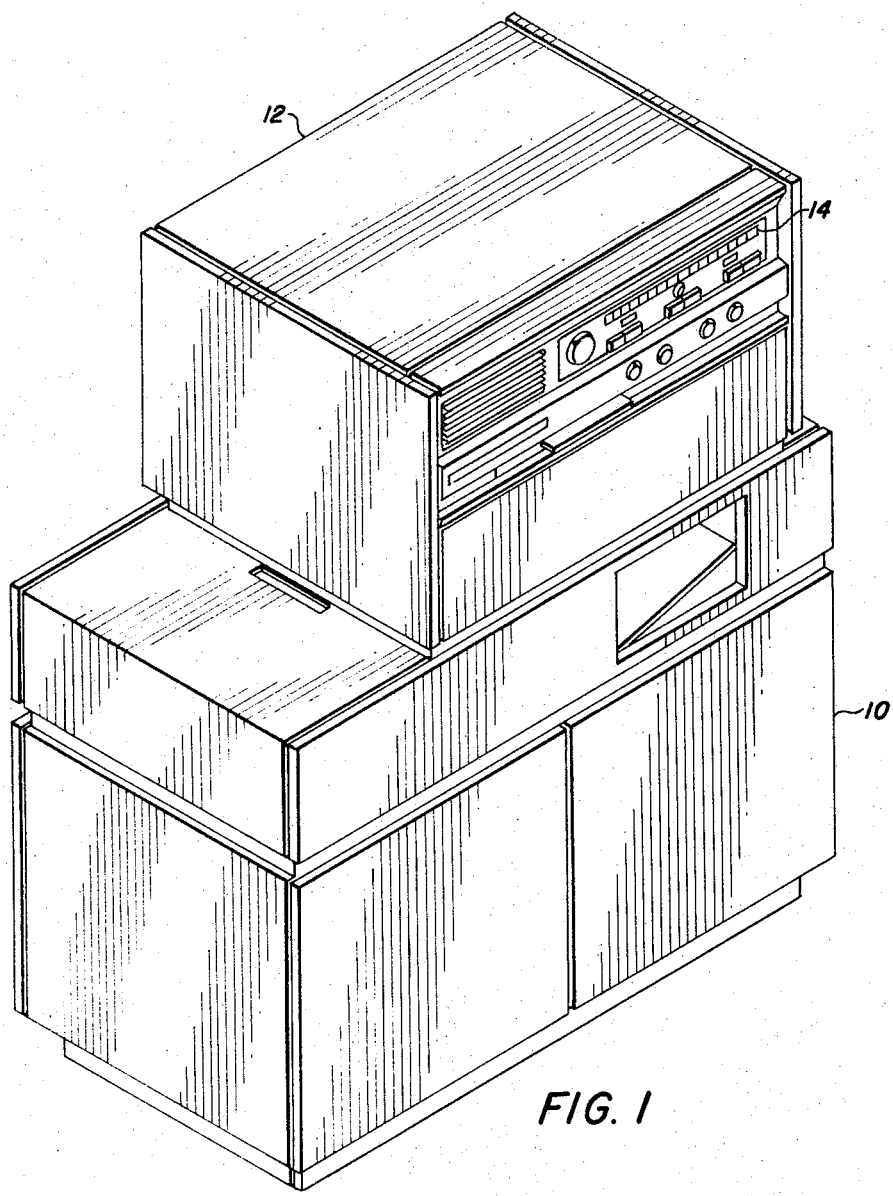
FIG. 1 is a perspective view of an automatic xerographic processing machine which incorporated the invention.

In the particular arrangement shown in the drawings, the invention is incorporated in a microimage reproduction system that is a fully automatic, continuous printer for reproducing information contained on microfiche sheets. This equipment reproduces copy on individual sheets of paper, that may have a width up to 9 inches and a length of 14 inches in a magnification ratio of approximately 16× which is enlarged to the full width of the sheet of material. Referring to FIG. 1, the system may be considered to include three distinct sections for housing the several elements thereof; namely, the base section 10 for housing the xerographic drum; the paper supply tray and feeding apparatus, as well as the device for effecting the xerographic functions of plate charging, xerographic developing, image transfer, brush cleaning, etc.; an upper section 12 for housing the microfiche handling apparatus, as well as the bulk of the optical system; and a control section 14, mounted on the base section and forward of the upper section, for housing certain of the electrical equipment required in the system and to provide a control panel whereon the operator may set selected a one of a plurality of switches for selecting the desired type of operation.

Figure 2:
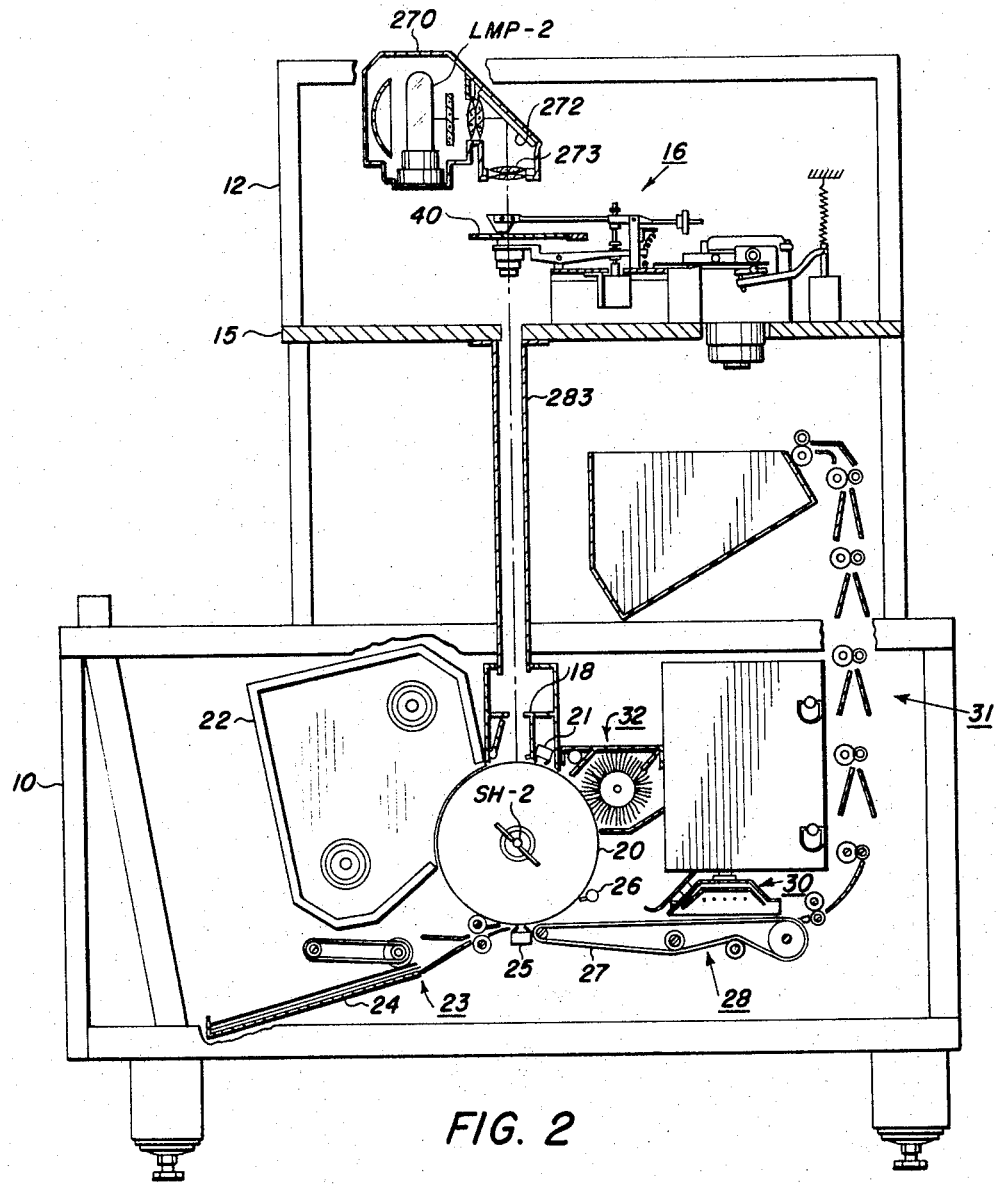
FIG. 2 is a schematic sectional view of the machine embodying the invention.

As shown in FIG. 2, base section 10 includes two side frames that are connected across their tops by a base plate 15, whereby the entire system is supported. Suitable cover plates are included to enclose the mechanism, and access doors are provided on the front of the machine to facilitate repair and adjustment. Upper section 12 includes suitable cover plates for enclosing the bulk of the microfiche handling apparatus and the optical system, as well as a microfiche indexing mechanism generally indicated by the reference numeral 16. The entire structure is specifically arranged to form a light-tight enclosure in the areas of the optical projection system and the xerographic developing system.

Control section 14 (see also FIG. 3) includes an instrument panel for supporting the several operating controls in convenient reach of the operator. These controls include an automatic reset-type counter 1TR, that is presettable by a switch SW–6B to the desired number of copies required to be made of any microfiche sheet; an "On" switch SW–1, to initiate the warmup of the system; a "Print" switch SW–7, to initiate operation of the machine; a "Print Stop" switch SW–9, that functions to stop the machine within a predetermined interval after it is pushed to permit the completion of certain xerographic operations; and an "Emergency Stop" switch SW–2, that is effective to stop the system instantaneously in the event this should become necessary. Other switches are also included and will be described in the machine operation section herein.

For a general understanding of the xerographic processing system in which the invention is incorporated, reference is had to FIG. 2 in which the various system components are schematically illustrated. As in all xerographic systems, a light image of copy to be reproduced is projected onto the sensitized surface of a xerographic plate to form an electrostatic latent image of copy to be reproduced and is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by any suitable form of fusing device, whereby the powder image is caused to adhere permanently to the support surface.

In the system disclosed herein, a microfiche sheet holder containing a microfiche is placed in the indexing mechanism 16 from which it is sequentially moved first in one direction and then in another direction. Suitable driving means are provided for effecting the two-directional movement of the microfiche whereby it is caused to move past the optical axis of a light projecting system to be described hereinafter for the purpose of scanning the microimages with a scanning light line. The light image of each microimage arranged on the microfiche is projected downwardly through an adjustable objective lens assembly 17 and through a slit aperture assembly 18 and onto the surface of a xerographic plate in the form of a drum 20.

The xerographic drum 20 includes a cylindrical member mounted in suitable bearings in the frame of the machine and is driven in a counterclockwise direction by a motor at a constant rate that is proportional to the scan rate of each of the microimages on the fiche, whereby the peripheral rate of the drum surface is proportional to the rate of movement of the projected light image. The drum surface comprises a layer of photoconductive material on a conductive backing that is sensitized prior to exposure by means of a corona generaing device 21.

The exposure of the drum to the light image discharges the photoconductive layer in the areas struck by light, whereby there remains on the drum a latent electrostatic image in image configuration corresponding to the light image projected from each of the frames of a minified data fiche. As the drum surface continues its movement, the electrostatic latent image passes through a developing station in which there is positioned a developer apparatus including a casing or housing 22 having a lower or sump portion for accumulating developing material. A bucket-type conveyor having a suitable driving means may be used to carry the developing material to the upper part of the developer housing where it is cascaded down over a hopper chute on the xerographic drum.

As the developing material is cascaded over the xerographic drum, toner particles are pulled away from the carrier component of the developing material and deposited on the drum to form powder images, while the partially denuded carrier particules pass off the drum into the developer housing sump. As toner powder images are formed, additional toner particles must be supplied to the developing material in proportion to the amount of toner deposited on the drum. For this purpose, a suitable toner dispenser may be used to accurately meter toner to the developing material.

Positioned next and adjacent to the developing station is the image transfer station which includes a sheet feeding mechanism adapted to feed sheets of paper successively to the developed image on the drum at the transfer station. This sheet feeding mechanism, generally designated 23, includes a sheet source such as a tray 24 for a plurality of sheets of a suitable transfer material that is typically sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 25 that is located at or immediately after the point of contact between the transfer material and the rotating drum. The corona transfer device 25 is substantially similar to the corona discharge device 21 in that it includes an array of one or more corona discharge electrodes that are energized from a suitable high potential source and extend transversely across the drum surface and are substantially enclosed within the shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pickoff mechanism, generally designated 26, for removing the transfer material from the drum surface. This device includes a plurality of small diameter, multiple outlet conduits of a manifold that is supplied with pressurized aeriform fluid through the outlet conduits into contact with the surface of the drum slightly in advance of the sheet material to strip the leading edge of the sheet material from the drum surface and to direct it onto an endless conveyor 27 of a horizontal transport mechanism 28 whereby the sheet material is carried to a fixing device or heat fuser 30, whereby the developed and transferred xerographic powder image on the sheet material is permanently fixed thereto.

After fusing, the finished copy is preferably discharged from the apparatus at a suitable point for collection externally of the apparatus. To accomplish this, there is provided a vertical conveyor, generally designated 31, by means of which the copy is delivered to a copy holder positioned in a suitable superstructure overhanging the rear portion of the desk top.

The next and final station in the device is a drum cleaning station 32, having positioned therein a suitable drum cleaning device adapted to remove any powder remaining on the xerographic drum after transfer.

Any residual electrical charge remaining on the xerographic drum is dissipated by light from a fluorescent lamp mounted in a suitable lamp housing hinged to the dust hood, a starter being provided for energizing the fluorescent lamp.

Suitable drive means drive the drum and the mechanism for sequentially scanning a microfiche at predetermined speeds relative to each other and included are means to return the microfiche to its respective longitudinal and transverse starting positions and means to effect operation of the bucket-type conveyor, toner dispenser, endless conveyor, vertical conveyor; the separating roller and feed rollers being controlled in a manner to permit the feed of a sheet of transfer material into registered impression contact with the developed image on the xerographic drum as it is rotated through the transfer station.

Figure 4:
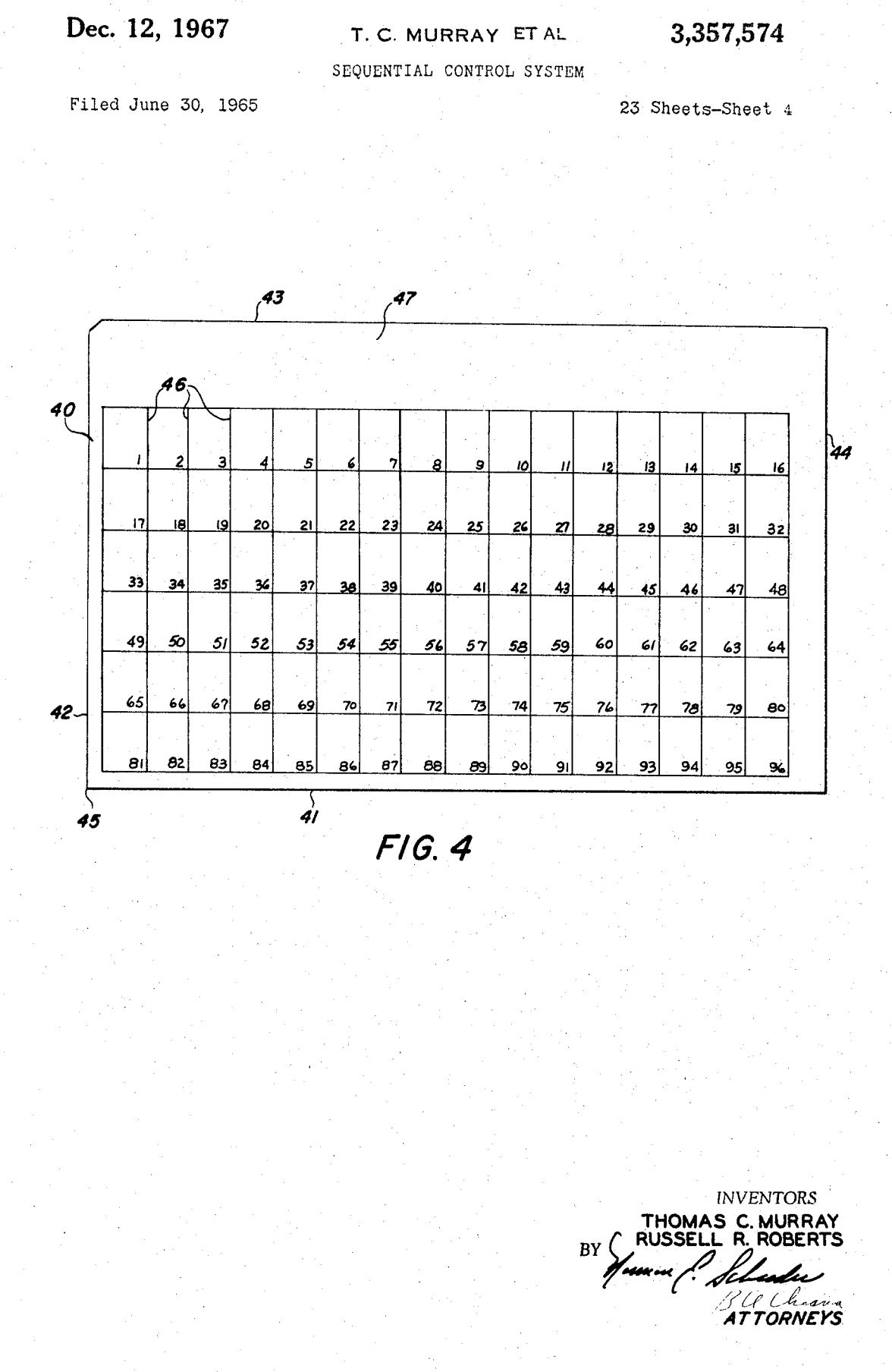

Since the present invention involves an apparatus for the automatic print-out of microfiche, a better understanding of the apparatus will require a brief description of a microfiche. Microfiche cards are available in various sizes, some of which have been standardized, such for example: 75 x 125 mm., 105 x 152.4 mm., 5 x 8 inches and 3.25 x 7.375 inches. Generally, the thickness of the film sheet ranges between 0.005 inch and 0.009 inch. The size of a microfiche will determine the number of frames that comprise it; for example, the fiche illustrated in FIG. 4 is nominally a 5-inch fiche and contains 96 single frames. These frames are arranged in six rows, running horizontally, as viewed in FIG. 4, and sixteen columns running vertically. For purposes of description, movement of a fiche along a row will be designated as longitudinal movement, and movement along a column will be designated transverse movement.

Both positive and negative film may be utilized for the fiche. However, if one or the other, the entire fiche must be of that form. As shown in FIG. 4, the microfiche 40 is defined by four edges, 41, 42, 43, 44; and for purposes of the following description of the scanning mechanism and to remain consistent with the industry accepted nomenclature for microfiche, the bottom edge 41 will be designated the reference edge, and the corner 45 between edges 41, 42 will be designated the reference corner.

As previously stated, the fiche 40 contains 96 film frames designated at 46, and these are arranged in horizontal rows and vertical columns with the left-hand column, the first column and the top row as the first row. The frames 46 have been numbered from 1 to 96 in the order in which they are scanned by the scanning mechanism of the present invention. In other words, scanning commences with the scanning of the frame located in the first column, first row, and proceeds until all of the frames have been scanned in the first row. The next frame to be scanned after the last frame or frame No. 16 has been scanned is the second frame in column 1, namely, frame No. 17, which is the first frame in the second row. In this manner, if all 96 frames are utilized, the fische is scanned sequentially from left to right and top to bottom.

Generally, the fiche is provided with a narrow marginal area 47 upon which is printed, or otherwise placed for reading by the unaided eye, the title of the subject matter contained in the frames of the fiche, the author, or any other useful information, file data summary, etc. This area can be utilized also for an additional row of microimage frames, such a fiche known in the industry as a trailer microfiche. In normal use of microfiche equipment, if the entire area of a document does not exceed 8½ x 11 inches, or the standard sheet of printed page, the mirror image is contained in a single frame 46. If the informational area on the document exceeds 8½ x 11 inches but does not exceed 11 x 17 inches, the microimage is contained within a double frame.

Figure 5:
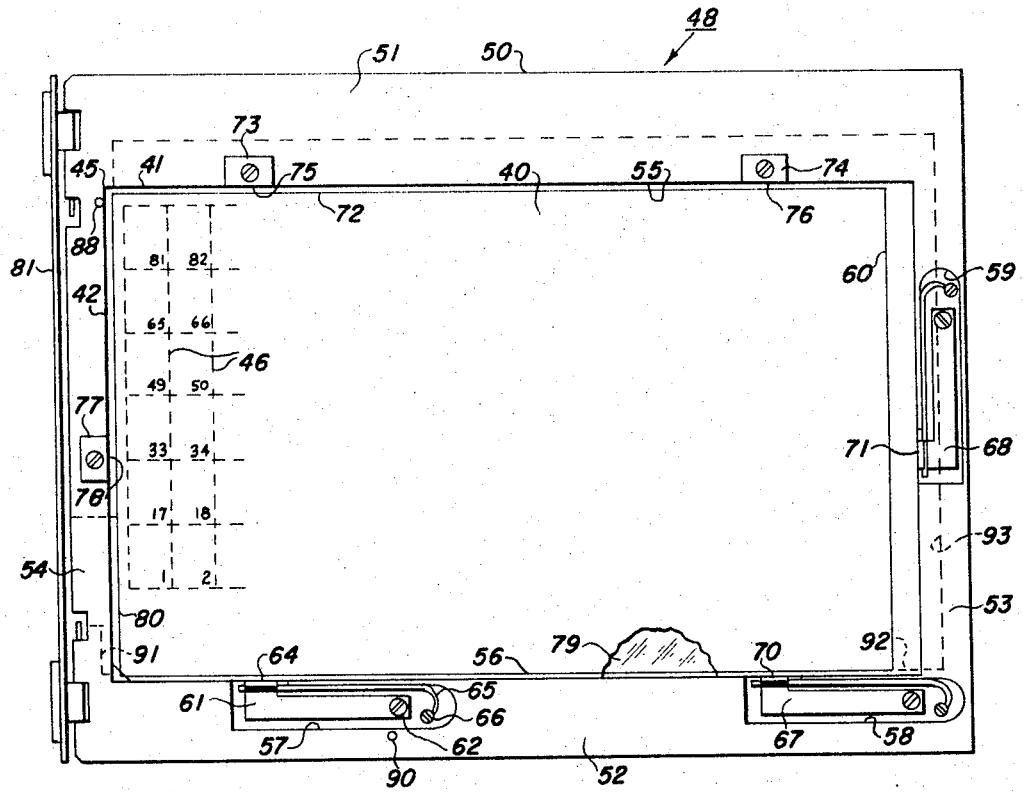
FIG. 5 is a plan view of a holding device for the microfiche card showing the cover plate.
Figure 6:
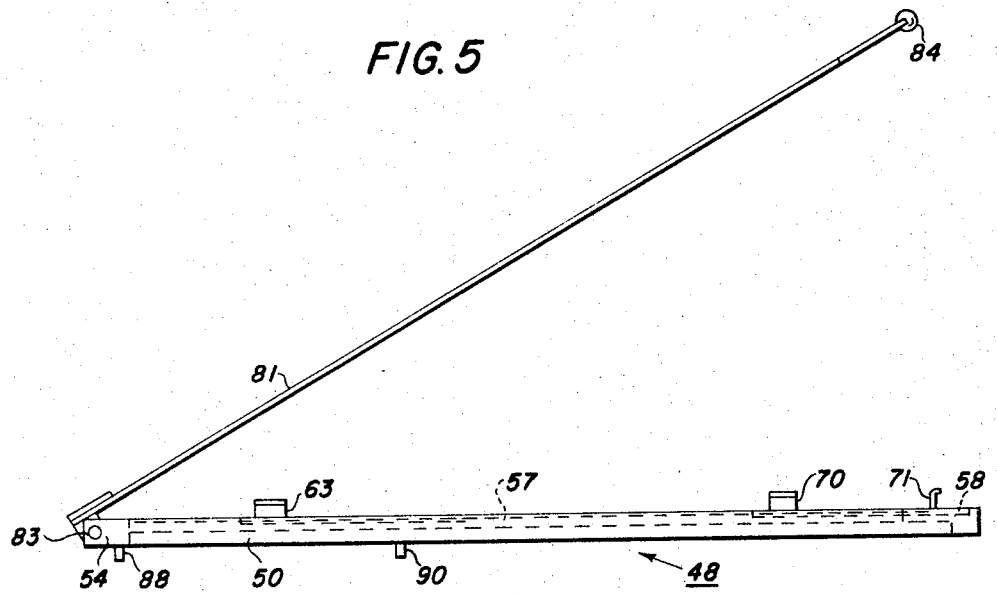
FIG. 6 is a side view of the holding device shown in FIG. 5 with the cover plate removed.

In order to scan a microfiche effectively in the apparatus illustrated in FIG. 2, there is provided a microfiche holder generally indicated by the numeral 48. As shown in FIGS. 5–8, the holder includes a holder base 50, of generally rectangular frame structure having integrally connected longitudinal side stiles 51, 52 and transverse end braces 53, 54. The inner edges of the stiles and braces form a rectangular opening 55 having logitudinal and transverse dimensions slightly larger than the total image area of a microfiche when held in the holder. In FIG. 5, a microfiche is shown in dotted lines, properly positioned in the holder base and inverted as to the microimages thereon.

Two flat, elongated recesses 57 and 58 of similar shape and dimension are formed adjacent to and spaced slightly from the inner edge 56 of the stile 52. A similar recess 59 is formed adjacent to and spaced slightly from the inner edge 60 of the end brace 53. Since these three recesses are similar and serve to contain similar structure, only one recess and its associated structure will be described.

With the recess 57 there is a guide plate 61 pivotally mounted at one end by a pivot 62. The guide plate has an upturned, curved guide tab 63 formed at the end thereof remote from the pivot 62 and has a straight edge 64 that will be arranged parallel to the inner edge 56 when a microfiche is positioned within the holder. The straight edge 64 is adapted for movement toward and away from the edge 56 when the guide plate 61 is rotated with its confines defined by the recess 57. A hair spring 65, anchored at one end by a screw 66, engages the free end of the plate 61 below the tab 63 and normally biases the plate 61 inwardly.

Similarly, the recesses 58 and 59 are provided with spring biased guide plates 67 and 68, respectively, each of which is provided with an inwardly forced straight edge 70, 71.

On the opposite side of the holder base 50 from the stile 52, the stile 51 is formed with an inner edge 72 arranged parallel to the edge 56. A pair of guide blocks 73, 74, provided with straight edges 75, 76, respectively, are secured on the stile 51 and arranged so that the straight edges are parallel to and slightly spaced inwardly from the edge 72. A similar guide block 77 with a straight edge 78 is secured to the end brace 54 as is spaced slightly from the inner edge 80 of that brace.

The straight edges 75, 76 and 78 serve to locate a microfiche precisely within the holder base 50 and, as shown in FIG. 5, the dotted fiche is arranged with the reference corner 45 thereof positioned so that the fiche edge 41 is against the straight edges 75, 76 and the fiche edge 42 is against the straight edge 78. In order to insure this proper location of the fiche when the same is placed within the holder, the spring biased straight edges 64, 70 and 71 engage and force under slight tension the adjacent fiche edges 44 and 43, respectively, into the locating straight edges on the guide blocks 73, 74 and 77.

The holder 48 is also provided with a cover plate 81 which serves to clamp a fiche to the holder base 50 to prevent outward buckling and removal of the fiche. The cover plate is rectangular in shape, resembling the general configuration of the holder base and is formed with a rectangular opening 82 which conforms with the four edges of the opening 55 in the holder base. Actually, the opening in the cover plate may be slightly larger than the corresponding opening in the holder base since the inner edges of the holder base serve as reference lines for the image areas of a fiche when the fiche holder base is properly mounted for operation in the fiche handling mechanism 12. Suitable pivot pins 83 mounted in the outer edge of the end brace 54 for the holder base serve as means for pivotally supporting the cover plate to the holder base. A handle 84 on the side of the cover plate remote from the pivot means therefor facilitates handling of the plate when inverting or removing a fiche from the holder base.

Figure 7:
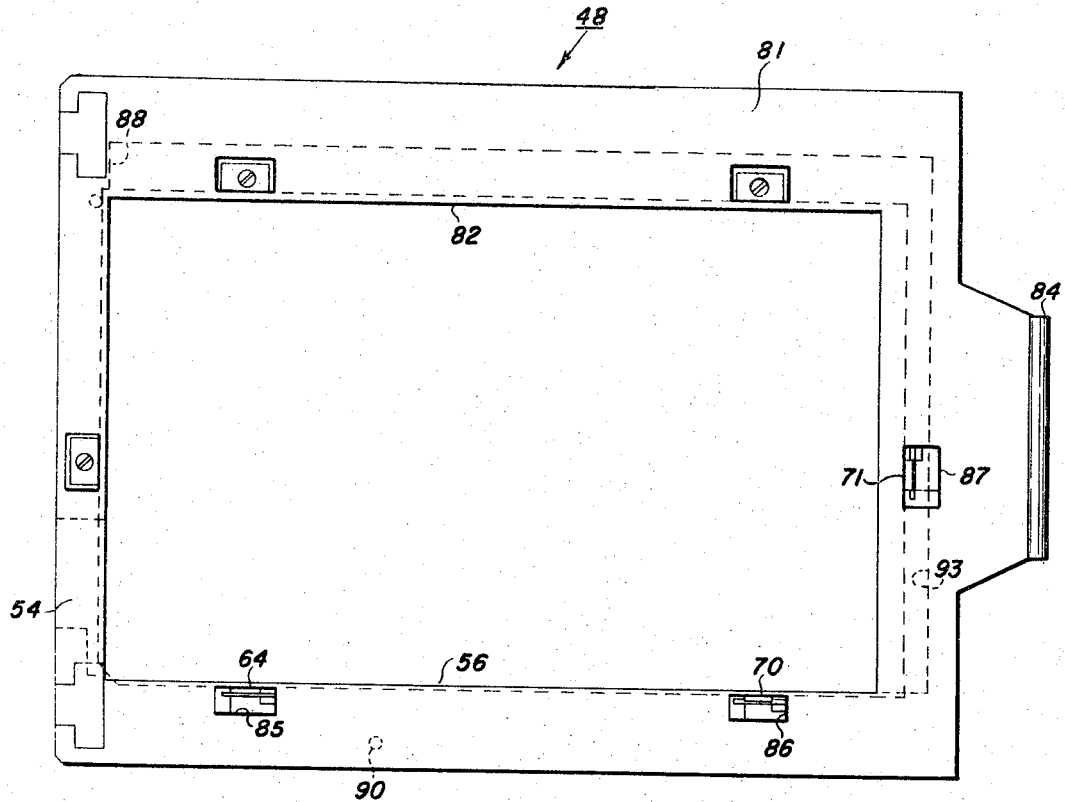
FIG. 7 is a top view of microfiche holding device showing the cover plate in proper locking position.
Figure 8:
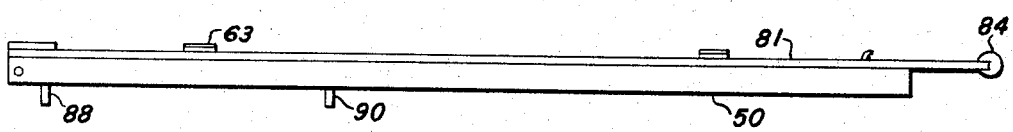
FIG. 8 is a side view of the holding device with the cover plate in holding position.
Figure 9:
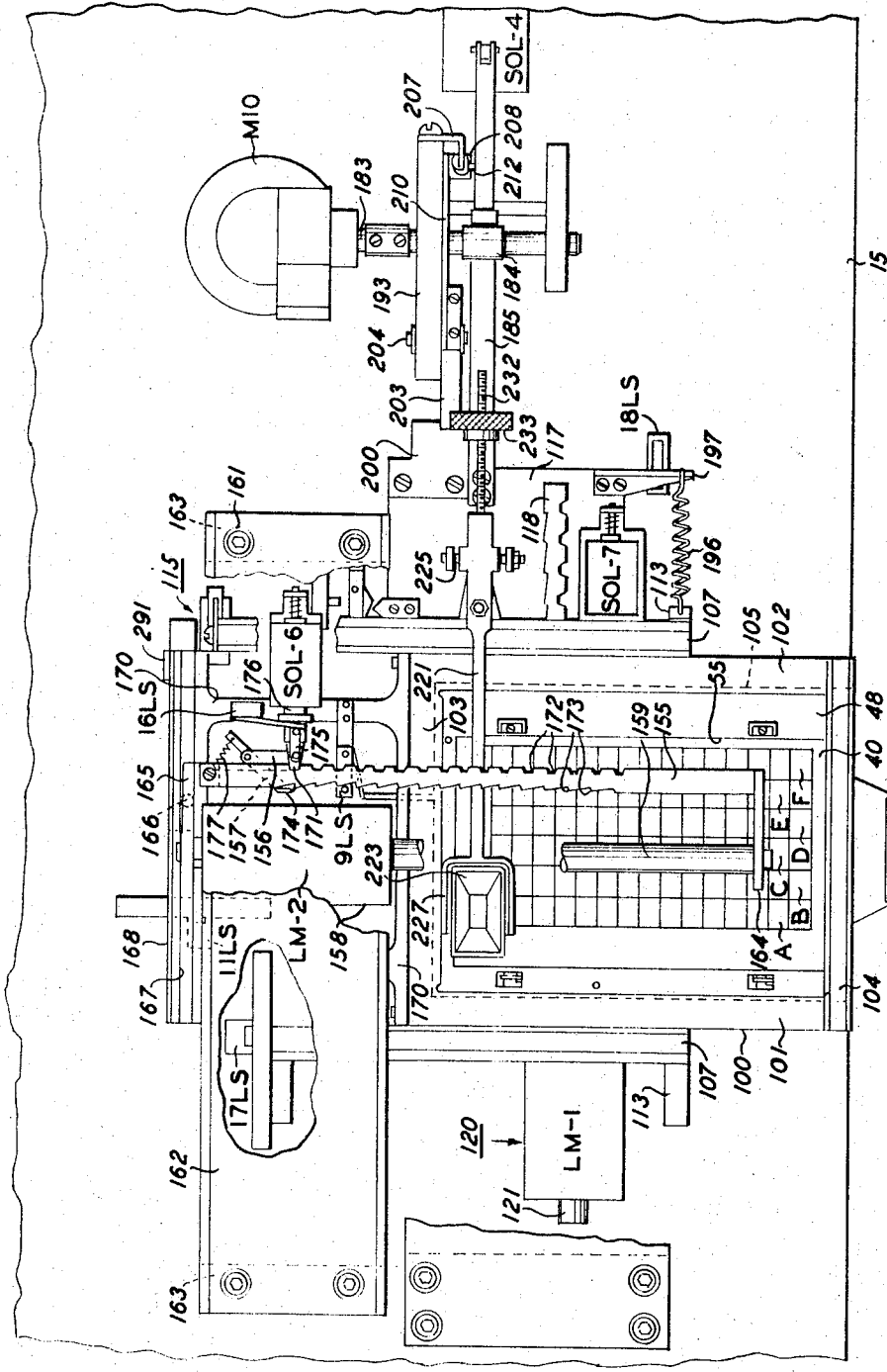
FIGS. 9, 10 and 11 are plan, front and side views, respectively, of the microfiche handling mechanism.

As shown in FIGS. 7 and 9, the cover plate 81 is formed with small rectangular openings 85, 86, 87 which permit the tab 63 and the tabs that form the straight edges 70 and 71 to project there through. In effect, these openings provide clearances for these tabs which extend a significant distance beyond the plane of a fiche when positioned in the holder base. Suitable openings are also provided in the cover plate for permitting the guide blocks 73, 74 and 77 to extend a safe distance beyond the plane of the microfiche.

Clamping of a fiche between the cover plate 81 and the holder base 50 is accomplished by the narrow marginal edges of these elements adjacent their openings. As previously stated, the guide blocks 73, 74 and 77 are fixed a slight distance from the corresponding edges of the holder base opening. By being so spaced, a slight shelf is provided along both edges 55 and 80 of the holder base, and it is upon these shelves that a fiche is placed when applied to the guide blocks 73, 74 and 75. Similarly, narrow portions of the stile 52 and the end brace 53 support the respective adjacent edges of the microfiche as there is sufficient widths to these portions to support a fiche. In order to support the microfiche throughout its entire area and yet permit the transmission of image light rays therethrough, a sheet of transparent material such as acetate 79 is cemented upon the narrow portions and shelves formed upon the stiles and braces. The clamping action between the cover 81 and the base 50 is against both the sheet 79 and the microfiche.

In FIG. 5, it will be noted that the edges of the fiche extend a short distance beyond the confining edges of the opening for the holder base. When the cover plate 81 is placed upon the holder base, the adjacent narrow portions along the inner edges of the opening in the cover plate will rest upon the parts of the fiche and the transparent sheet 79 between the plate and the base, and the weight of the plate is sufficient to clamp the microfiche firmly within the holder while it is being handled and inserted within the machine.

For positioning the holder 48 into the microfiche handling mechanism 12, as will be discussed more fully hereinafter, the fiche holder is held by hand so that the plane of the microfiche within the holder is horizontal; and the rear end or the end comprising the end brace 54 is inserted into a suitable slot formed in the cabinet for the machine. In this orientation of the holder, as viewed in FIG. 8, two tabs 88, 90 project downwardly from the holder base 50. One of the tabs 88 is secured to the end brace 54 at a point slightly rearwardly of the fiche reference corner 45. The other tab 90 is secured to the stile 52 closer to the outer edge thereof than the inner edge. These tabs serve to control certain handling devices of the operative sequence, during operation of the xerographic machine, as will be seen presently.

The lower surface of the holder base 50, when positioned for insertion into the machine, is also formed with a cut-out transverse recess 91 formed in the end brace 54, a longitudinal recess 92 formed in the stile 52 and a longitudinal recess 93 formed in the end brace 53. These serve to provide clearances for the holder 48 during insertion and movement of the same in the fiche handling mechanism 12.

The xerographic machine illustrated in FIG. 2 is provided with a microfiche carriage assembly which receives a microfiche holder and carries it through two indexed movements, one in a longitudinal direction, and the other in a transverse direction, and through a reciprocable scanning movement; that is the "scan" or exposure stroke and the return stroke during continuous operation of the machine. As previously stated, the microfiche is inverted when mounted in the holder 48; and this is the orientation that the fiche will maintain during scanning of each of the individual microimages thereon. In order to facilitate description for the microfiche handling mechanism, a typical fiche is illustrated in FIG. 9 as being mounted inverted in the holder 48.

Throughout the description of the microfiche handling mechanism 12, the movement of the holder 48 from bottom to top, as viewed in FIG. 9, will be considered movement in the longitudinal direction; and the movement from right to left will be designated movement in the transverse direction. This nomenclature is consistent with the layout of the several microimages on the microfiche wherein the rows extend in the longitudinal direction and the columns extend in the transverse direction. It will also be noted that the first microimage on the microfiche is in the upper left-hand corner of the opening 55 in the holder 48. This is the starting point for producing reproductions of the microimages on a microfiche by use of the present machine.

The carriage indicated generally by the reference numeral 100 for supporting the microfiche holder during indexing and scanning of the microfiche is of generally rectangular frame structure comprising side members 101 and 102, end member 103 and a brace 104 across the front end of the carriage. The members 101, 102 and 103 are connected and arranged coplanar in U-shape with the brace 104 being secured at its end to the open side of the frame and on the top surface thereof. In order to slidably retain the microfiche holder 48, each of the frame members 101, 102 and 103 is formed with a groove 105 (see FIG. 10) along the inner edge of each of the members. The transverse distance between the bottom of the grooves formed in the members 101 and 102 is equal to or slightly larger than the transverse distance between the outer edges of the stiles 51 and 52. The shape of each of the grooves are such that the microfiche holder may be slid along the sides of grooves until the outer edge of the end brace 54 engages the bottom of the groove formed in the end member 103. A plurality of spring biased ball bearings (not shown) may be provided in each of the grooves for lending friction to the engagement of the microfiche holder with the carriage members.

Mounted below each of the side members 101 and 102 along an outwardly extending flange thereof is the inner race 106 of a ball bearing slide suspension mechanism. The tapered grooves for the races faces outwardly and cooperates with the outer race 107 of the slide mechanism. Suitable ball bearings are arranged between the respective grooves for supporting the inner races, the carriage 100 and the microfiche holder 48 and also for permitting sliding action of this structure relative to the outer races 107. The outer races 107 are secured along the outer edges of a supporting plate 108 having a generally rectangular shape of larger size than the carriage 100. The support plate 108, in turn, is mounted to and immediately above a rectangular frame structure which comprises transverse extending elements 110 and longitudinal elements 111 (see FIGS. 10 and 11). The outer edges of the parallel elements 110 are formed as the inner races of a ball bearing slide suspension system which includes outer races 112 mounted upon vertically extending parallel support plates 113 and 114, which, in turn, are secured to the base plate 15. Suitable ball bearings are arranged along the opposing grooves of the races and thereby support the plate 108.

From the foregoing it will be apparent that the microfiche holder and its supporting carriage 100 is supported and adapted for movement in either direction on a longitudinal path by a slide mechanism comprising the bearing races 106 and 107, and is also adapted for movement in either direction on a transverse path by the slide mechanism comprising the races 110 and 111. In moving in a transverse path, the slide mechanism 110 and 111 carries the microfiche holder as well as the slide mechanism 106, 107 which supports the carriage for movement in a longitudinal path.

As previously stated, when placed in the microfiche holder, the microimages of a microfiche are arranged such that the images extend longitudinally in rows and transversely in columns. In the layout of a microfiche of the type shown in FIG. 4, the images numbered 1–16 are arranged longitudinally or from left to right along the lower edge of the microfiche, as viewed in FIG. 9. These microimages are arranged in side-by-side fashion which results during the photographic reproduction of a microfiche from original documents. In the second row, the images are numbered 17–32 and are also arranged in side-by-side fashion. By arranging the microimages in rows as the microfiche is produced, there also results a columnar arrangement of images wherein the images are in end-to-end pattern. For example, the microimages number 1, 17, 33, 49, 65 and 81 are in end-to-end relationship and therefore comprise the first column in the microfiche.

To facilitate the description of the indexing motion imparted to the microfiche in the following description, the rows in the microfiche are designated with capital letters, and the columns are designated by numerals. For the particular microfiche illustrated, there are six rows, and these are labeled A–F and; there are sixteen columns, and these are labeled 1–16. In the event that a seventh row is added when a particular microfiche is manufactured, this new row would occupy the space 47 of the fiche (see FIG. 4).

When a microfiche holder is inserted into the carriage 100, as the first step prior to operation of the machine, the microimage designated "1" is in a position to be scanned by a scanning mechanism described hereinafter. After the first microimage is scanned, the carriage 100 is indexed or moved a predetermined distance in a longitudinal path the width of a microimage to the left, as viewed in FIG. 9, in order to position the number "2" image into proper scanning position. After the number "2" image has been scanned, the carriage 100 is again indexed to the left in order to present the number "3" microimage into the scanning position. This procedure continues until the sixteenth microimage has been scanned to thereby complete the indexing and scanning of all of the microimages in row A. When this is accomplished, the microfiche carriage 100 is returned to its initial starting position in the longitudinal path and to the position wherein the microimage number "17" is in position to be scanned as the first microimage of row B. In moving to this position, the microfiche carriage 100 was indexed in the transverse path which is accomplished by moving the carriage to the left, as viewed in FIG. 9.

In making reproductions of the microimages on a microfiche, the microfiche is indexed in two directions, one direction for moving images of a row into scanning position and the other direction for moving the fiche from one row to another. To this end, there is provided an indexing mechanism generally indicated by the reference numeral 115 (see FIG. 9) for imparting longitudinal movement, and a similar indexing mechanism generally indicated by the reference numeral 116 (see FIG. 12) for imparting transverse movement of the microfiche.

Figure 12:
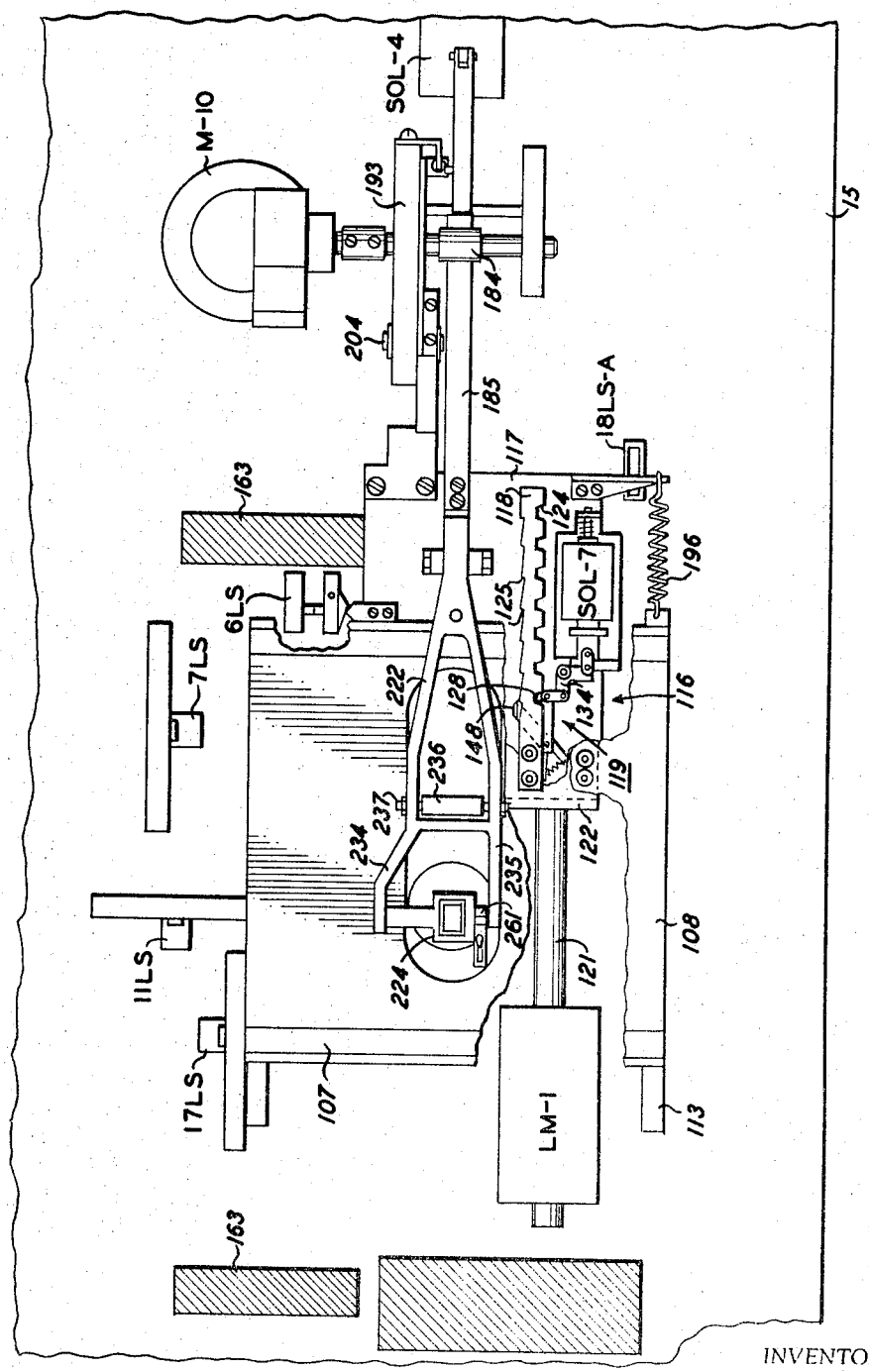
FIG. 12 is a plan view, partly broken away, of the portion of the handling mechanism positioned below the plane of the microfiche when in scanning position.

The transverse indexing mechanism 116 is illustrated in FIG. 12 as comprising a transverse escapement solenoid SOL–7 secured upon a scanning platform 117, an indexing rod 118, an escapement mechanism 119 and an indexing drive mechanism in the form of a linear induction motor or actuator 120 having a stator LM–1 and a drive rod 121. Any suitable type of linear motor may be utilized, but it is preferred that the motor be of the type wherein the stator comprises a series of coils through which a soft iron core or rod is movable in either direction, that is, in an indexing direction and in the reverse direction. The stator for the linear motor is adapted for energization with alternating current for producing a magnetic field along the length and, which with certain switching connections, may force the drive rod 121 in either direction depending upon the connections. When the series of coils are de-energized, the drive rod may be physically moved in either direction and, when energized, will move the rod with a constant velocity and force directly proportional to the electrical input thereto and in a direction determined by the switching arrangement utilized for imparting the rotation.

Figure 10:
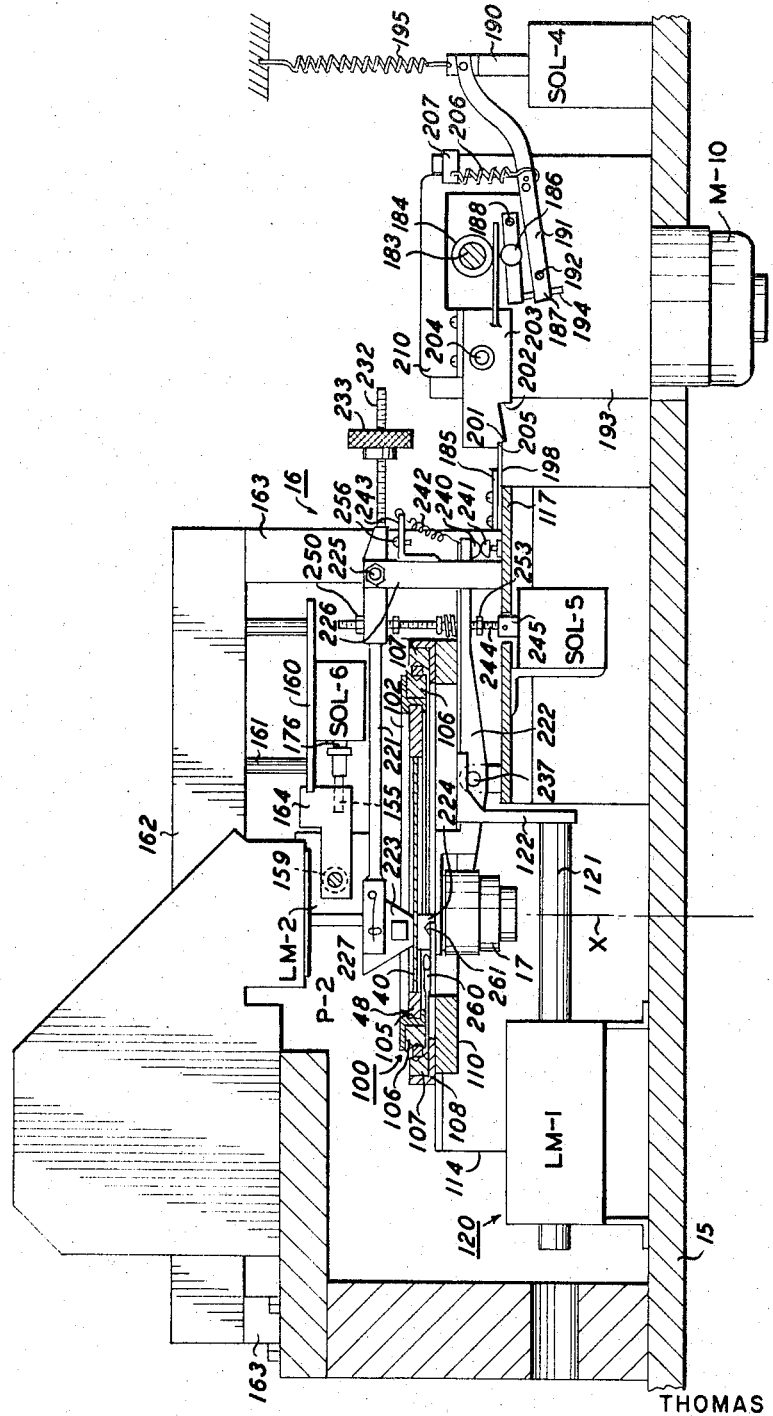

As shown in FIG. 10, the stator LM–1 for the linear actuator is secured to the base plate 15, and the drive rod 121 is relatively long, extending through and beyond both ends of the stator casing. One end of the drive rod 121 has an L-shaped bracket 122 secured thereto which in turn is secured to the under portion of the support plate 108, by any suitable means such as screws 123 (see FIG. 13). The screws 123 also serve to secure one end of the indexing rod 118 to the bracket 122 and consequently to the drive shaft 121. The escapement mechanism 119 has a dual function, one of which produces indexing of the plate 108 to effect indexing of the microimage rows of a microfiche when the induction motor 120 is energized, and the other to allow scanning movement of the scanning platform 117 by a scanning mechanism which causes the movement of plate 108 during a scanning operation.

The indexing rod 118 is unsupported at one end, is relatively long and generally flat in configuration, and has formed on one edge a plurality of tapered notches, in this case, seven notches, being spaced from each other a distance equal to the length of a microimage on the microfiche or the distance between a point on a microimage in one row and the corresponding point on the microimage located in the same column but spaced in the next row thereto. Since there are six rows of images on the microfiche illustrated, only six notches 124 are necessary. However, in the event that a seventh row is added in order to use up the space provided in the area 47 of the microfiche, the seventh notch on the indexing rod 118 may be utilized. The other longitudinal edge of the rod 118 is formed with a series of teeth 125, each of which is spaced from the other the same distance that the notches 124 are spaced from each other.

The notches 124 are adapted to cooperate with a latching device in the form of a lever 126 (see FIGS. 13–21) pivotally mounted by a pivot pin 127 extending through a suitable opening in the lever and secured to the scanning platform 117. The lever 126 is provided with a projecting latch element 128 which is adapted to slide into each of the notches 124 when the lever 126 is rotated to a particular position. As shown in FIGS. 13 and 19, the latch element 128 is formed with a bearing surface 130 which aligns itself parallel to one of the sides of the notch 124 when the element 128 is completely inserted in the notch. The element 128 is also formed with an angled bearing surface 131 which, as will be described hereinafter, serves as a cam for directing the latch element into a notch.

Immediately above the element 128, the lever 126 is provided with a pivot pin 132 (see FIG. 16) which pivotally cooperates with a link 133 which in turn is pivotally connected to one leg of a bell crank 134, as shown in FIG. 13. The apex of the bell crank is pivotally connected by a pivot pin 135 formed at the upper end of a vertical post 136 and mounted on the scanning platform 117. The pin 135 may have threads formed at one end for receiving a nut for detachably retaining the bell crank 134. The other leg of the bell crank 134 is connected by a pivotal link 137 to one end of a plunger 138 associated with the solenoid SOL–7.

When energized, the solenoid SOL–7 retracts the plunger 138 or actuates it to the right, as viewed in FIG. 13. The action rotates the crank 134 in a counterclockwise direction causing the withdrawal of the latch element 128 from a notch 124. In order to cushion the shock produced by the movement of the plunger 138, there is provided a coil spring 140 which encircles the end of an extension of the plunger projecting out of the end of the solenoid remote from the bell crank 134. This spring is anchored between an upturned flange 141 secured to the platform 117, and a washer 142 integrally secured to the plunger 138.

Figure 15:
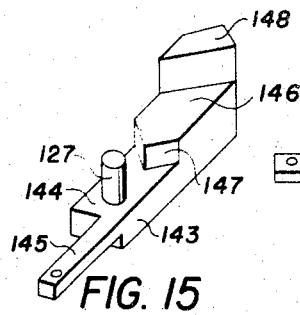
FIGS. 15, 16 and 17 are isometric views of a detail in the indexing device.
Figures 16, 17:
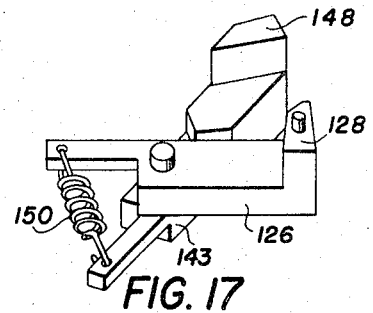
Figure 14:
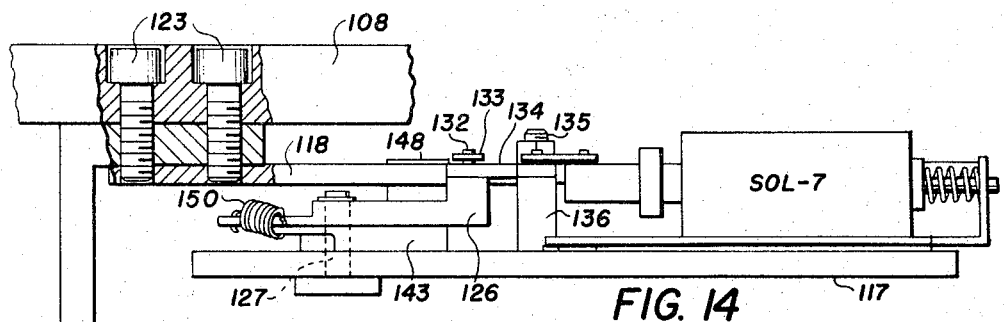
FIG. 14 is a side view of the indexing device of FIG. 13.
Figure 18:
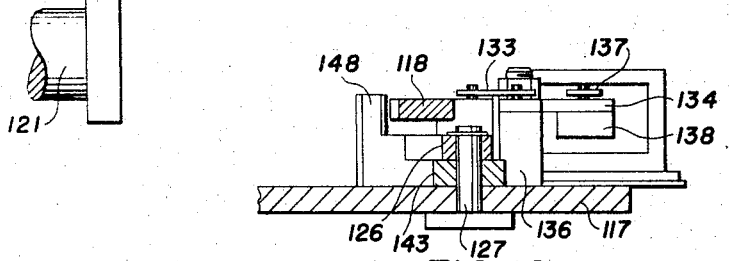
FIG. 18 is an end sectional view of the indexing device taken along the line 18—18 in FIG. 13.

A second latching lever 143 is also pivotally mounted on the pivot pin 127 immediately below the lever 126 and, as shown in FIG. 15, is formed with step portions along its longitudinal axis. The lowermost step 144 is provided with an opening through which the pivot pin 127 extends and includes an extension 145 projecting radially from the pivot 127. The lever 143 is adapted for limited pivotal movement about the pivot pin 127, rotating upon the top surface of the platform 117 during this action. The limited pivotal movement of the lever 126 is performed utilizing the upper surface of the portion 144 as a bearing surface. The intermediate step 146 on the lever 143 has a thickness equal to the thickness of the lever 126 which when mounted upon the pin 127 rides upon and rotates relative to the portion 144.

The step 146 is formed with a bearing surface 147 which is adapted to contact one edge of the lever 126 when the same is in the position shown in FIG. 13, wherein the latch element 128 is in one of the notches 124. The bearing surface 147 limits the extent of the pivotal movement in one direction of rotation of one latching lever to the other; for example, as shown in FIG. 13, with the bearing surface 147 in contact with the lever 126, the lever 143 is held against clockwise rotation. The third and uppermost step 148 formed on the lever 143 serves as a latching element for that lever similar to the latch element 128 and is adapted to cooperate with each tooth 125 on the index rod 118. With both latching levers 126, 143 located below the rod 118, the latch elements 128, 148 are in the plane of the index rod.

A coil spring 150 is connected at its ends to one end of the lever 126 and the outer extremity of the extension 145, both connections being on the same side of the pivot pin 127. This spring normally biases the levers in their respective positions shown in FIG. 13 wherein the bearing surface 147 is in engagement with the adjacent edge of the lever 126. When the solenoid SOL-7 is de-energized, the spring 150 forces the plunger 138 to the left, as viewed in FIG. 13, and rotates the crank 134 counterclockwise to force the latch element 128 into a locking engagement with one of the notches 124.

During a complete indexing cycle performed by the above-prescribed structure, that is, in imparting movement to the plate 108 for indexing the microfiche one row, the latching elements 128 and 148 alternate in their cooperative engagement with their respective cooperating edges on the indexing rod 118. In performing an indexing operation, when the latching element 128 is in a notch 124, the latching element 148 is out of engagement with its cooperating step 125. Conversely, in the event that the latching element 148 is in engagement with a tooth 125, the latching element 128 is out of the notch 124.

In describing the operation of the indexing mechanism illustrated in FIGS. 13 to 21, it will be assumed that the microfiche is positioned as shown in FIG. 9; that is, row A of the microimages is in position for scanning. With this positioning of the microfiche and its associated carriage 100, the indexing bar 118 will be in the position illustrated in FIG. 13; that is, the first notch 124 will be in cooperative relationship with the latching element 128, and the element 148 is clear of any tooth 125. It will also be assumed that the last microimage in the row, namely the microimage numbered "16," has been scanned; and the apparatus is in condition for being indexed in order to place the first microimage of row B in the scanning position. In order to commence indexing, the solenoid SOL-7 is energized, by a circuit that will be described hereinafter, in order to withdraw the latch element 128 from the first notch 124. The positioning of the parts after this withdrawal of the element 128 is illustrated in FIG. 19 wherein the bell crank 134 has pivoted in a counterclockwise direction for rotating the lever 126 to the position shown. During this action, the lever 143 starts to rotate in a clockwise direction by reason of the force produced by the coil spring 150. When the lever 126 rotates in a clockwise direction, this rotation of the lever 143 tends to draw the element 148 downwardly. In moving the latching element 148 from the position shown in FIG. 13 to its position shown in FIG. 19, the extreme tip 151 of the latching element 148 engages the extreme upper tip of the tooth 125 which prevents further rotation of the lever 143 and downward movement of the latching element 148. The lever 126 continues its clockwise rotation until the parts assume the position as shown in FIG. 19. The indexing bar 118 is now in condition for being moved in either direction.

When the linear actuator 120 is energized, it moves the drive shaft 121 to the left as viewed in FIGS. 12 and 13, drawing with it the indexing rod 118 until the extreme tip 151 and the bearing surface 152 for the latching element 148 slides down the tooth 125 or to the position shown in FIG. 20. As the drive rod 121 is moving to the left, it imparts a transverse movement to the plate 108 and consequently the microfiche carriage 100. As previously stated, the distance or length of one of the teeth 125 is the distance that a particular microfiche must move in order to move each row of microimages past a predetermined fixed point. When the latching element 148 is positioned such that the extreme end 151 is in engagement with the lower point of a tooth 125, further movement of the microfiche carriage is prevented. As will be described in a later section, the stator LM-1 of the linear actuator 120 will be energized at the same time that the latch element 148 is firmly in place against a tooth 125.

During indexing movement of the index rod 118, the parts of the transverse indexing mechanism 116 is shown in FIG. 20. After indexing has been completed, the solenoid SOL-7 is de-energized to permit the spring 140 to return the bell crank 134 into its original position, illustrated in FIG. 13. During this action, as shown in FIG. 21, the bearing surface 131 will engage a corner of a notch 124 and guide the latch element 128 into proper alignment relative to the notch so that further action by the spring 150 will insure that the latch element will firmly fit within the notch. As the latch element 128 assumes its final position in a notch, the edge of the lever 126 will engage the bearing surface 147 on the lever 143 and will rotate this lever in a counterclockwise direction in order to move the latching element 148 completely out of engagement with any of the teeth 125.

In a typical indexing cycle of operation, the first stage of movement of the index rod 118, that is, when under control of the latching element 148, is movement of the microfiche in relatively course or close approximation. In other words, with the parts positioned as shown in FIG. 20, the stator LM-1 de-energized and the index rod 118 apparently fixed, it is not until the latching element 128 has been moved and secured into a notch 124, as viewed in FIG. 13, that the indexing rod 118 is in an accurate and precise location. In moving from the position shown in FIG. 20 to the position shown in FIG. 13, the latching element 128 may produce a slight movement of the index rod 118 in order to locate this rod in a predetermined, precise position. The bearing surface 131 is provided for insuring that the latch element 128 will not engage the index rod 118 in such a way as to damage or impair progress of the latching element in its move to final positioning within notch 124. In the event that the index rod 118 is misaligned a considerable distance during the first stage of indexing by the latching element 148, the bearing surface will always engage one corner of the notch 124 for properly locating the latching element 128 relative to a notch 124 which action will require movement of the index rod 118 to its final desired position.

The longitudinal indexing mechanism 115 is similar to the transverse indexing mechanism 116, differing in the provision of a bell crank such as the bell crank 134 and the links pivotally mounted on the legs of a bell crank. As shown in FIG. 9, the indexing mechanism 115 comprises an indexing rod 155, a longitudinal escapement solenoid SOL-6, an escapement mechanism including latching levers 156, 157, a linear induction motor 159 having a stator LM-2, and a drive rod 159 for the induction motor. The solenoid SOL-6 is secured to a plate 160 suspended by suitable spacer posts 161 from a raised horizontally positioned beam 162 secured at its ends to the base plate 15 by vertically arranged supports 163. The beam 162 is secured above the support plate 108 and the microfiche carriage in order to permit these members to move thereunder during indexing of the microfiche carriage in its two directions of movement.

The stator LM-2 for the induction motor 158 is also secured to and below the beam 162 for maintaining the stator in a fixed position. As shown in FIG. 9, the indexing rod 155 and the drive rod 159 extend longitudinally relative to the microfiche and its carriage and are spaced in parallel in a plane above the carriage. A suitable bracket 164 connects the free ends of the indexing rod and the drive rod in order to support one end of the rod 155 and to maintain the spacing a parallelism between these rods.

The other end of the indexing rod 155 is connected to the upper edge of a vertically extending movable plate 165 for support thereby. This plate is arranged on a lower edge thereof to which is a roller 166 secured for rotation in a horizontal plane. The roller 166 is adapted to ride on either side of a groove 167 formed along the upper edge of a plate 168 that is made movable with the microfiche carriage. The longitudinal axis of the groove 167 is arranged in a plane parallel to the plane of the microfiche carriage 100 and is spaced from the carriage by connecting members 170 secured between the end member 103 of the carriage and the plate 168. With this arrangement, the groove 167 is horizontally oriented and extends in a transverse direction relative to the microfiche 40 and is movable with the carriage 100 in both of its indexing movements.

During indexing movement of the microfiche carriage in its longitudinal path, when the index rod 155 will be moved upwardly, as viewed in FIG. 9, carrying with it the movable plate 165, the plate 168 and the groove 167 will also be driven in this direction. During indexing of the microfiche carriage in the transverse direction, the track 167 will be moved along its longitudinal axis and, by virtue of the roller 166, will slide relative to the movable plate 165 which will be held fixed against movement in this direction by means of its connection to the index rod 155.

In the longitudinal indexing mechanism 115, the latching lever 156 is the same as the latching lever 126 and includes a latching element 171 adapted to cooperate with notches 172 formed in one edge of the indexing rod 155. On the other edge of the rod 155, teeth 173 are formed and adapted for cooperation with a latching element 174 provided on the lever 157. A link 175 is pivotally connected between the lever 156 and the plunger 176 for the solenoid SOL-6 for imparting rotation of the levers 156 and 157. A coil spring 177 is held in compression between the outer ends of these levers to perform the same function as the spring 150 for the escapement mechanism 119 and normally urges the latching element 171 into one of the notches 172.

The operation of the indexing mechanism for longitudinal movement of the microfiche carriage is identical to the operation of the transverse indexing mechanism. In this operation, when the SOL-6 is energized to retract the plunger 176, the lever 156 is rotated in a counterclockwise direction which tends to impart counterclockwise rotation of the lever 157 to cause the latch element 174 to engage and be held against further rotation by the extreme tip of one of the teeth 173. In accordance with the electrical program sequence, the stator LM-2 will be energized to actuate the drive rod 159 upwardly, as viewed in FIG. 9, resulting in sliding movement of the latching element 174, upon a tooth 173 until the same engages the next succeeding tooth.

This movement of the drive rod and the indexing rod 155 imparts movement to the movable plate 165 and, in the longitudinal direction for the microfiche carriage, consequently the plate 168, by virtue of the roller 166 connecting these elements. Movement of the plate 168 will produce movement of the microfiche carriage in a longitudinal path. The spacing between the notches 172 is equal to the width of a microimage on the microfiche, and each indexing movement of the index rod 155 will shift the microfiche from column to column. For the particular microfiche described, there are sixteen notches 172 and sixteen teeth 173 in order to provide sixteen indexing movements in a longitudinal path, one for each of the columns of the microfiche.

When the solenoid SOL-6 is de-energized, the spring 177 will force the latching element 171 into engagement with the next succeeding notch, and the microfiche carriage will be maintained in a fixed position until the particular microimage that is disposed for scanning has been scanned.

As previously stated, during the description of the transverse indexing mechanism 116, the scanning platform 117 is adapted for reciprocable movement to produce scanning of the microfiche. This reciprocable movement of the platform is in a path transverse to the microfiche, in other words, parallel path that occurs when the indexing movement of the microfiche is in a transverse direction. During automatic operation of the xerographic machine, the scanning platform 117 moves continuously in a reciprocal path the length of a microimage. In one direction of this movement, the scanning movement, the platform 117 is driven by a drive mechanism, and in the other direction of movement, the return stroke, the platform completes its reciprocatory cycle under control of a spring which returns the platform to its start-of-scan position.

Figure 11:
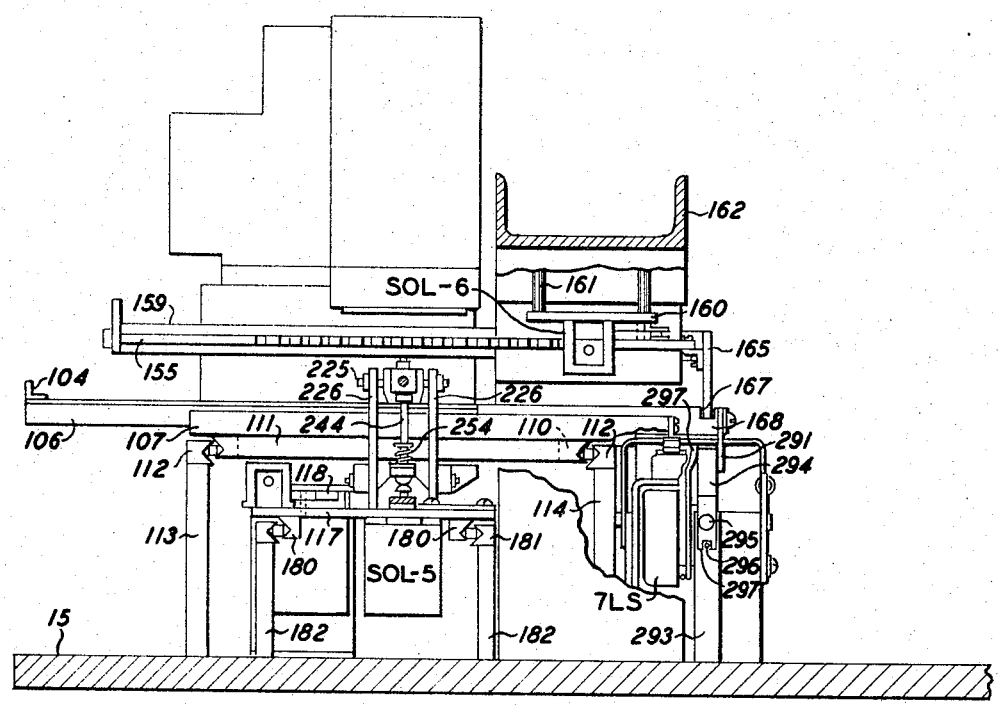

In FIG. 11, the platform 117 is shown as including inner races 180 of a linear ball slide suspension mechanism having outer races 181 in cooperative relation to the inner races. The outer races are connected in parallel upon the upper races of vertically extending support plates 182 secured to the base plate 15. The slide mechanism 180, 181 support the platform 117 for sliding movement in either direction and also supports the slide mechanism 110, 111 and the slide mechanism 106, 107 in addition to all the structure with which these slide mechanisms are associated. As the platform 117 moves, it carries therewith the solenoid SOL-7, the escapement mechanism for the transverse indexing mechanism 116, the plate 108, the drive rod 121, and the microfiche carriage 100.

For driving the scanning platform 117 during the scanning operation, there is provided a driving arrangement for moving the microfiche carriage 100 at a predetermined, relatively slow speed during the "scan stroke," and at a relatively higher speed during the "return stroke" of the carriage. For this purpose, there is provided a constant speed, synchronous motor M10 that is suitably secured to the base plate 15 of the machine and is provided with a drive shaft 183 having a roller 184 to effect a predetermined drive rate. Associated with the roller 184 is a flat drive rod 185 which is of substantially rectangular cross-section and is secured to the rear edge of the scanning platform 117. In the arrangement employed, as illustrated in FIG. 10, the drive rod 185 is spaced slightly from the drive roller and rests upon an associated pinch roller 186 which is mounted on a substantially horizontal bar member 187 pivotally mounted on a pin 188.

In operation, the motor M10 rotates continuously but is effective to drive the platform 117 only during the scanning stroke for the microfiche carriage when there is engagement between the drive rod 185 and its respective drive roller 184. To effect engagement of the drive rod and the drive roller, there is provided a scan solenoid SOL-4 mounted on the base plate 15 and having its armature or plunger 190 connected to one end of a lever 191 pivotally mounted near its other end on a pin 192 which is secured to a vertically extending support plate 193 mounted on the plate 15. At the extreme end of the lever 191 adjacent the pivot pin 192, there is provided an adjustable screw 194 that is set substantially in engagement with the lower face of the bar member 187. When the microfiche carriage is to be operated, the solenoid SOL-4 is energized, as described below, to rotate the lever 191 clockwise and drive the bar member 187 clockwise to cause the roller 186 to force the drive rod 185 into frictional engagement with the drive roller 184.

A coil spring 195 is connected at its ends to the plunger 190 and to suitable fixed structure on the machine frame for normally biasing the lever 191 in a counterclockwise direction in order to hold the drive rod 185 away from the drive roller 184.

For driving the microfiche carriage 100 during the return stroke of the scanning operating cycle, there is provided a spring 196 connected at one end to a bracket 197 secured to the platform 117 and at the other end to one edge of the support plate 113. Since the support plate 113 is held in a fixed position, during the scan stroke, the tension of the spring 196 will increase as the platform 117 moves away from the support 113. Upon release of the drive rod 185 from the influence of the drive roller 184 occurring when the solenoid SOL–4 is de-energized, the spring 196 will drive the platform 117 to the left, as viewed in FIG. 12, and this drive will return the platform to a start of scan position at a higher speed that is developed during the scan stroke thereby minimizing the time period for a scanning cycle of operation.

In order to define the limits precisely for the reciprocatory motions of the scanning platform 117, there is provided in the electrical circuit for the microfiche handling mechanism 12, a pair of limit switches which are adapted to be actuated when the platform reaches a predetermined position during each of its strokes of movement. There is also provided a mechanical mechanism for insuring precise positioning of the platform at both ends of its travel. As shown in FIGS. 9 and 10, the platform 117 has secured thereon along one edge a plate 198 which projects outwardly in the same direction as the drive rod 185. The plate 198 reciprocates along with the platform 117 and has an outer edge 200 (see FIG. 22) which is adapted to engage either one of two notches 201, 202, formed in a block 203 pivotally mounted for rotation in a vertical plane by a pivot 204 secured to the support plate 193.

Figure 22:
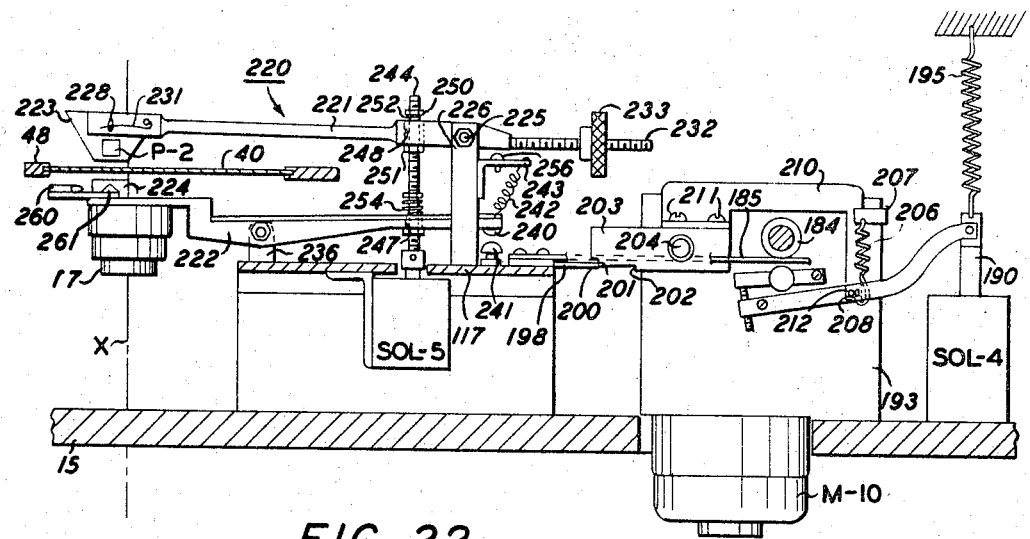
FIG. 22 is an elevational view, as seen from the front of the machien, with parts broken away, of the microfiche carriage drive system in one position of operation.

During reciprocatory movement of the plate 198, the edge 200 will remove in the direction defined by the positioning of the notches 201, 202 formed along the lower edge of the block 203. As shown in FIG. 22, the edge 200 is in engagement with the notch 201 which prevents movement of the scanning platform 117 in the direction whereby scanning of the microfiche is attained. In order to release this restriction to the edge 200, means are provided for rotating the block 203 in a clockwise direction which means is coordinated with the energization of the solenoid SOL–4 to cause scanning movement for the platform 117.

This rotation of the block 203 is relatviely small, being sufficient only to disengage the edge 200 from the notch 201 and to permit movement of the plate 198 toward the second notch 202 positioned in the line of travel for the plate 198. In actual practice, the solenoid SOL–4 is de-energized slightly before the edge 200 reaches the notch 202 for terminating scanning movement of the platform 117 at about the time that the edge 200 is in position to engage the notch 202. In this manner, sudden jarring of the mechanical parts is minimized.

Rotation of the block 203 is produced by actuation of the lever 191 when the solenoid SOL–4 is energized. Normally, the block is held in the position shown in FIG. 22 by means of a spring 206 connected between a bracket 207 mounted on the support plate 193 and a lug 208 formed on an extension plate 210 which is secured to the block 203 by suitable screws 211 or supports the lug. The spring 206 normally biases the lug 208 upwardly thereby forcing the notch 201 into engagement with the edge 200 of the plate 198.

The lever 191 is formed with a projection 212 which is adapted to engage the upper surface of the lug 208 during clockwise rotation of the lever 191 and forcing the lug downwardly against the tension produced by the spring 206. This action will rotate the block 203 in a clockwise direction for releasing the notch 201 relative to the edge 200. When the solenoid SOL–4 is de-energized and the lever 191 is forced in a counterclockwise direction by the spring 195, the projection 212 is moved upwardly allowing the lug 208 to follow the same.

*Microfiche alignment clamping mechanism*

In the field of producing enlarged copies of information from mircofilm regardless of form, that is, whether the microimages are on reels, aperture cards or on microfiche, one of the most important problems to which great attention must be applied during reproduction is the maintenance of precise alignment for each of the microimages relative to the particular scanning mechanism utilized and to the imaging devices which may employ during actual reproduction. This problem becomes more acute as the magnification requirements increase. For example, a 3× magnification of reproductions to microimage size requires fairly good alignment. For magnifications on the order of 16×, this alignment is critical; for 50× magnification, alignment is extremely critical; and as the magnification increases beyond 50×, it will be apparent that the alignment problem increases manyfold.

The problem of alignment in the use of microimages is not restricted to the lateral positioning of a microimage relative to the optical axis of a projection system for the reproducing apparatus. There is also alignment problems regarding the precise location of the plane of the microimage along the optical axis. As previously described, the microfiche holder 48 is particularly adapted for precisely locating the reference edges of a microfiche in the microfiche carriage in order to present the leading and side edges of a microimage precisely relative to the projection optical axis indicated by the letter X in FIG. 10 which in turn insures that during the reproduction stage, the image on the microimage will be centered or in correct alignment relative to the copy sheet produced by the reproduction apparauts. In accomplishing this lateral alignment, the microfiche holder is supported and indexed and scanned by mechanisms provided in the microfiche handling mechanism 12 that are in themselves precisely located and adapted to produce motion of a precise nature.

In the production of original-size reproductions from microimages, alignment in an axial path, that is, alignment in or along the optical axis of the magnification and projection system for the apparatus, is also very critical. As the size of the microimages relative to original-size reproduction decreases, the range of tolerable misalignment relative to the focal plane for any particular optical system used to magnify and project the microimage decreases, in fact, there is practically little or no range of tolerance allowable. For high magnification requirements, it has been found that the thickness of a microfiche, which may be on the order to .005 of an inch, will be sufficient to cause poor quality in the finished reproduction copy if the thickness places the image in misalignment. This characteristic requires an operator to adjust his projection system depending upon which side of the microfilm the emulsion for the microimage is formed. For example, if a particular optical system is arranged to handle and project with fine quality reproduction, a microfiche wherein the image emulsion is on the lower surface of the microfiche, any attempt to invert the microfiche in order to present the emulsion on the upper side will result in the production of blurred copies.

Figure 23:
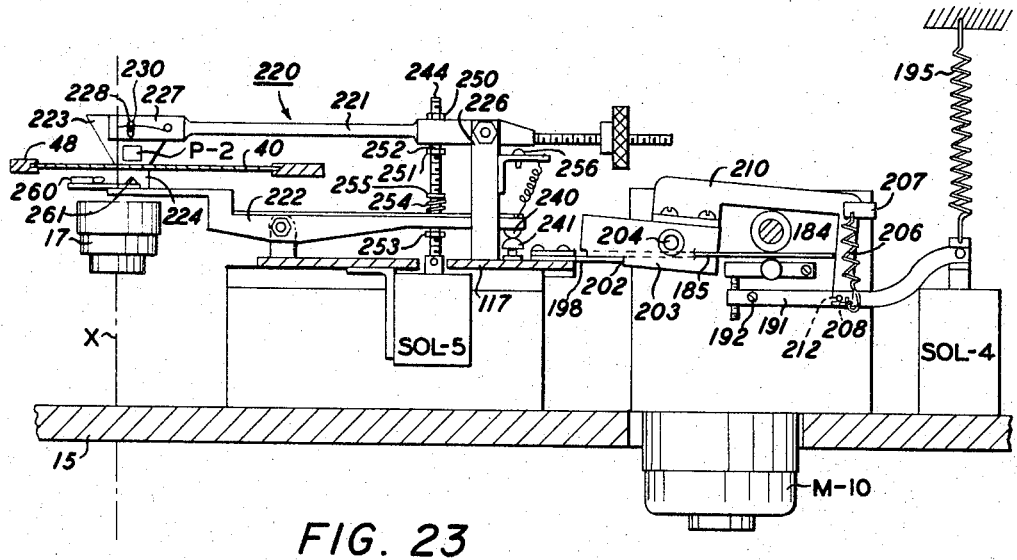
FIG. 23 is a view similar to FIG. 22, showing the carriage and the microfiche clamping mechanism in another position of operation.

In order to overcome the obstacles discussed above in regard to the alignment of a microfiche along the magnification and projection axis and for other characteristics for insuring good imaging of microimages, the microfiche handling mechanism 12 is provided with an alignment clamping device generally indicated by the reference 220. As shown in FIGS. 10, 22 and 23, the alignment clamping mechanism includes an upper clamping lever 221, a lower clamping lever 222, an upper clamping element 223 and a lower clamping element 224. The lever arrangement is such that the clamping elements 223, 224 will always be located one on either side of the microfiche 40, that is, the upper clamping element 223 will remain vertically above the microfiche when in a horizontal plane and the lower clamping element 224 will always remain vertically below the plane of the microfiche.

The upper clamping lever 221 is pivoted near one end by a pair of pivot pins 225 mounted one on each of a pair of upstanding posts 226 secured to the scanning platform 117. One end of the lever 221 is formed with a bifurcated portion 227 (see FIG. 9) having its arms arranged in a horizontal plane and between which the clamping element 223 is mounted for limited pivotal movement about a horizontal axis defined by a pair of pivot pins 228 secured to the sides of the clamping element and extending through suitable apertures 230 formed in the arms of the bifurcated portion 227. The apertures 230 are slightly elongated in a vertical direction in order to permit limited rocking movement of the clamping element 223 along the axis of the lever 221 as well as the limited pivotal movement about the axis defined by the pins 228. A hair spring 231 is provided on each of the arms of the bifurcated portion and engageable with each of the pins 228 for normally maintaining the clamping element 223 in its lowermost position and to provide an override mechanism for purposes to be described below. At the other end of the lever 221, a threaded portion 232 extending axially of the lever is provided for adjustably supporting counter weights 233 to the rocking movement of the lever.

The lower lever 222 comprises a bifurcated portion having legs 234, 235, the outer ends of which rigidly support the clamping elements 224 (see FIG. 12). A pivot post 236 secured to the scanning platform 117 extends upwardly therefrom between the arms 234 and 235 for pivotally supporting the lever 222. At the end of the lever 222 remote from the clamping element 224, there is secured a stop button 240 adapted for cooperation with a stop button 241 secured to the top surface of the scanning platform 117 for limiting the pivotal movement of the lever 222 in the direction of the upward swing of the clamping element 224. A coil spring 242 is connected in tension between a bracket 243 mounted on the pivot post 226 and the end of the lever 222 to which the stop 240 is secured for maintaining a counterclockwise rotative force on the lever to insure that the lower clamping element 222 is normally in its lowermost position.

Normally, the alignment clamping mechanism is in the position shown in FIG. 22 wherein the clamping elements 223 and 224 are at maximum separation or in their nonclamping position relative to the microfiche 40. These are the positions that the clamping structure assumes when the microfiche handling mechanism 12 is not in operation and before the microfiche holder 48 has been applied to the microfiche carriage. The slight separation of the upper and lower clamping elements is sufficient to permit passage of the end brace 54 of the microfiche holder 48 when the same is completely inserted in the carriage support structure. Immediately prior to scanning by the scanning mechanism, the parts of the alignment clamping mechanism are in their positions as shown in FIG. 10. The position of the parts shown in FIG. 23 are those that would be assumed at the end of the scan stroke for the scanning mechanism.

In order to produce clamping and unclamping action by the clamping elements 223 and 224, there is provided an actuating device in the form of a clamping solenoid SOL–5 secured to and below the platform 117 and an actuating mechanism for producing sequential rotation of the levers 221 and 222. The actuating mechanism associated with the solenoid SOL–5 comprises essentially of an actuating rod 244 secured to the plunger 245 for the solenoid in such a way as to permit limited rocking movement of the rod about an axis generally normal to the axis of the rod. For this purpose, the plunger 245 may be formed with spaced lugs through which a pivot pin 246 may project for pivotally mounting the lower end of the rod 244.

The rod 244 extends vertically through an aperture 247 formed in the lever 222 at a point between the stops 240, 241 and the pivotal axis 237 for the lever, and through an aperture 248 formed in the lever 221 at a point between the pivot 225 therefor and the upper clamping element 223. In order to impart pivotal movement to the upper lever 221, the actuating rod is formed with threads and associated with these threads are a pair of threaded elements or nuts 250, 251. These nuts are spaced from each other a distance slightly greater than the thickness of the lever 221 at that portion thereof through which the actuating rod extends. This provides a slight spacing between one of the nuts and the adjacent side of the lever, depending upon which position the lever occupies. In FIGS. 10 and 23, wherein the lever 221 has been rotated to provide clamping action by the clamping element 223, the spacing is between the lower nut 251 and the lever 221. In FIG. 22, wherein the clamps are open and the element 223 is in its uppermost position, the spacing 252 exists between the upper nut 250 and the adjacent side of the lever 221.

The lower lever 222 is arranged to be under a relatively strong spring bias relative to the actuating rod 244. Below the lever 222, a nut 253 is provided on the actuating rod and always remains in engagement with this nut by a coil spring 254 held in compression between the upper surface of the lever 222, and a fixed washer 255 fixed to the actuating rod a slight distance above the lever. The lever is adapted to become disengaged from the nut 253 and to compress the spring 254 during actuation or energization of the solenoid SOL–5 as will be presently described.

As previously stated, both clamping elements 223 and 224 are normally spaced from each other, and consequently the microfiche 40, in order to permit insertion of the microfiche holder into the carriage 100. During the normal sequential operation of the reproduction apparatus, as will be described hereinafter during description of the electrical circuit for the present apparatus, both solenoids SOL–4 and SOL–5 are energized simultaneously. Energization of the solenoid SOL–5 lowers the actuating rod 244. This action initially produces rotation of the lower lever 222 in a clockwise direction since lowering of the rod also immediately lowers the washer 255 and the spring 254 for producing rotation of this lever. This rotation continues until the stop 240 engages the stop 241 to prevent further rotation of the lever 222 and thereby establish a precise plane of location for the upper surface of the clamping element 224. This plane has been adjusted to coincide exactly with the plane of the lower surface for the microfiche 40 for precisely locating the plane of the microfiche along the optical axis for the projection lens 17 and which will be discussed more fully hereinafter.

During the initial rotation of the lever 222, the lever 221 has remained stationary because this stage of actuation of the actuating rod merely absorbs the spacing 252 between the upper nut 250 and the adjacent surface of the lever 221. At the time that the lower clamp element 224 has assumed its final position, the upper nut 250 will engage the lever 221 to produce rotation of this lever in a counterclockwise direction in order to lower the upper clamping element 223 upon the microfiche upper surface. The upper clamping element 223 engages the microfiche and remains stationary even though the lever 221 may continue the rotation slightly by the provision of the override mechanism comprising the pivot pins 228, the apertures 230 and the hair springs 231. This pivotal movement of the upper clamping element 223 and any possible rocking motion produced by this element along an axis parallel to the lever 221 will help maintain the alignment of the microfiche in the plane defined by the lower clamping element 224.

With the solenoid SOL–4 also energizes the scanning platform 117 will be driven for the scanning stroke of the scanning apparatus as previously described. In moving to the right as viewed in FIG. 10, the scanning platform carries with it the solenoid SOL–5, both levers 221 and 222, clamping elements 223 and 224, the microfiche 40 and holder 48 as well as all of the supporting or incident structure relating to the alignment clamping mechanism. At the end of scan, the solenoid SOL-5 is de-energized along with the solenoid SOL-4 in order to produce unclamping of the clamping elements.

When the solenoid SOL-5 is deenergized, the actuating rod 244 moves upwardly which action raises the washer 255 to permit lessening of the compressive force produced by the spring 254 and movement of the nut 251 upwardly until the same traverses the spacing 252 that existed between this nut and the adjacent surface of the lever 221, and engages this lever to permit rotation thereof in the clockwise direction for raising the upper clamping element 223 out of engagement with the microfiche. This action occurs while the spring 254 is lessened in compression and before the stops 240, 241 are disengaged in order to insure that the lever 222 undergoes its pivoting action after the upper lever 221 has performed its rotative movement. As the actuating rod 244 continues its upward movement, the nut 253 engages the lower surface of the lever 222 for driving the same in a counterclockwise direction for removing the clamping element 224 from the lower surface of the microfiche. A stop 256 secured to the upper surface of the bracket 243 is adapted to engage the lever 221 at a point intermediate the pivot therefor 225 and the counter weight 233 for limiting the clockwise rotation of the lever 221, in the event that the positioning of the rod 244 is carried over its normal or its desired position. The counter weights 233 are utilized to assist the strength of the spring 242 which would normally tend to rotate the lever 222 in a counterclockwise direction and force the rod and the nut 251 beyond its normal position.

From the foregoing description of the alignment clamping mechanism 220 it will be apparent that all of the microimages on the microfiche card 40 will be maintained at a precise plane relative to the axis of the projection system, generally indicated by the letter X and also be maintained against lateral movement relative to this axis by the supporting structure for holding the microfiche carriage 100. The various structural elements, namely, the nuts 250, 251, the washer 255 and the nut 253 may be adjusted in order to precisely locate the planes of the fiche engaging surfaces of the clamping elements 223 and 224 in order to insure exact positioning of a microimage relative to the focal plane of the projection system. The clamping elements 223 and 224, themselves, are structurally supported in such a manner as to eliminate any adverse effect that these elements may have upon the delicate images of the fiche. Throughout the complete operating cycle for scanning and clamping, the clamping elements are prevented from sliding upon the microfiche, engaging the same only from directions that are normal to the plane of the fiche.

Associated with the alignment clamping mechanism 220 is a last frame detecting circuit which detects the last microimage on a microfiche which is only partially supplied with the microimages. In the description of the microfiche illustrated in FIG. 4, it was indicated that 96 microimages arranged in six rows and sixteen columns was typical of a microfiche. While it may be ideal for economy purposes to untilize the full size of a microfiche, it is generally the case, however, that something less than 96 frames are used. For a microfiche having less than a full complement of frames, the frames are arranged in the numerical order discussed in the description of the FIG. 4 microfiche; that is, row A is completely filled before row B is used, and so on. For a fifty-frame microfiche, rows A, B and C would be completely filled, and row D would include the remaining two frames in the first two positions in that row. The remaining portions of row D and all of rows E and F would comprise clear film base.

The last frame detecting circuit is adapted to sense the presence, or ratther the absence of a microimage in the third position of row D while the last frame in the second position is being scanned. This circuit includes a photocell P-2 mounted on the upper clamping element 223, a light source 260 and a reflective surface 261 mounted on the leg 235 of the lower clamping lever 222, see FIGS. 10 and 12. The source 260 is continuously energized, and some of its rays are reflected by the surface 261 upwardly through the microfiche 40 and onto the photocell P-2. Normally, when the microimages intercept the light rays between the source 260 and the photocell, the resultant effect on the photocell does not produce circuit changes for the machine operation. However, in the event that a clear film area is positioned between the source and photocell, the machine circuit will be affected in a manner simulating the condition therein which will occur when the last frame of the microfiche is being scanned. Details of the circuit will be described in the following description of machine operation.

*Optical projection system*

The optical projection system for the microfiche reproduction apparatus is used to form an image of each of the microimages comprising the microfiche while the carriage 100 moves through the scan stroke at a magnification ratio of approximately 16×, onto the sensitized surface of the xerographic drum.

The light source portion of the optical projection system is used to illuminate each of the microimages to be copied and includes a lamp housing 270 which encloses a 650 watt tungsten filament lamp LMP-2; a biconvex lens 271; a mirror 272 for directing light rays collimated by the lens 271 onto a condenser lens 273. As shown in FIG. 24, the light rays converging from the lens 273 are directed into the upper clamping element 223 and onto the microfiche 40. In FIG. 24, the clamping elements 223 and 224 are shown in their clamping position relative to the microfiche and are arranged relative to the fixed optical axis X at the "Start of Scan" position.

As previously stated, the upper surface of the lower clamping element 224 establishes the precise plane which the microfiche will assume during a scanning operation; and, for purposes of description, a microimage indicated by the reference letter S is shown in the position just prior to scanning. The microimage S is separated from other microimages by suitable spacings 274 on either end of the microimage. The spacings which are provided when the microfiche is manufactured correspond to the spacings occupied by the lines 46 on the microfiche as shown in FIG. 4.

In any relative setting of the microfiche clamping mechanism 220 and the microfiche carriage with reference to the optical axis X, it is arranged that the optical axis be slightly beyond the extreme right-hand edge of each of the microfilm images, as viewed from the front of the machine or as shown in FIGS. 2 and 24, when the microfiche carriage is in its "start of scan" position. With the optical axis X for the projection system being stationary, the clamping elements 223 and 224 and the microfiche 40 are moved in the direction illustrated by the arrow during scanning movement.

As previously stated, the vertical alignment of the openings or optical windows provided by the clamping elements 223 and 224 are offset relative to one another in two directions in the horizontal plane. In FIG. 25, the opening for the upper clamping element 223 is shown superimposed over the opening formed in the lower clamping element 224 resulting in a window area 275 through which the light rays from the projection system are adapted to extend. In effect, the window 275 serves as the optical opening or aperture for permitting light to reach each of the microimages individually, and this window is defined by two side edges of the lower clamping element 224 and its other two sides by the side edges of the upper clamping element 223. The upper clamping element 223 is formed with a rectangular funnel shape converging downwardly toward the microfiche and thereby blocks the light rays from the source from reaching the microimages adjacent the one being scanned.

As to relative size, the area of the window or aperture 275 is slightly smaller than the areas of the optical openings formed in the clamping elements since the length and width of the window 275 is proportionally reduced. With this arrangement, the window areas in the clamping elements may be made slightly larger than the area of a typical microimage and the area of the window or aperture 275 made to correspond to the exact area defined by the lines 46 in FIG. 4. Each of the clamping elements may be adjusted by means of manipulation of the respective bearings 237 and 225 to vary the area of the window 275 in the event that the content or size of the microimages of a particular microfiche vary from the standard sized image or other sizes that may become standard.

For purposes of scanning, the edge 276 on the lower element 224 defines one longitudinal end for the optical window 275, and the edge 277 on the upper element 223 defines the other longitudinal end for the aperture or window. The spacing between the edges 276, 277 defines the length of a standard microimage and, as previously stated, this dimension may be varied by manipulation of the respective mounting bearings for the clamping elements.

In FIG. 24, the objective lens 17 is shown mounted within a housing 278 suitably secured to the base plate 15. The objective lens 17 is provided with a stationary disc 280 formed with a slot 281 arranged centrally of the objective lens in axial alignment with the optical axis X and with its longitudinal axis transverse to the optical window 275. The slot 281 when positioned within the light beam R is adapted to permit some light rays to reach the objective lens 17 for imaging the microimage upon the drum surface 20. As shown in FIG. 28, the axial alignment of the variable slit 18, the objective lens 17, the slot 281 are such that the variable slit 18 is focused upon the microimage on the microfiche 40.

In effect then, when the slot 281 is within the rays of the beam R during scanning of the microfiche, the slot 281 masks the image light rays from the particular microimage being scanned. In FIG. 26 the light beam R is shown projecting through the optical window 275 during scanning of a microimage, and the slot 281 will limit the image light rays which are able to reach the slit 18, and consequently the drum surface 20 as the window 275 and the microfiche is moved from right to left as viewed in FIG. 26.

In the start of scan position, the slot 281 is arranged as shown in FIG. 24 with the edges thereof out of view relative to the light beam R. This is generally accomplished by the position of one edge 282 of the slot in vertical alignment with the edge 276 of the lower clamping element 224. In this position of the parts, the xerographic drum 20 is not exposed by the light source within the lamp housing. The funnel shaped upper clamping element prevents light rays from the light source from reaching the objective lens 17 and the drum surface, and only that light which is allowed to project through the slot 281 reaches this surface.

When the scanning commences and the microfiche 40, together with the clamping elements, are moved in the direction of the arrow and the edge 276 is moved out of alignment with the edge 282, light rays from the microimage is permitted to reach the drum surface to cause exposure thereof in the conventional manner. As the microfiche 40 is moved, it is scanned by the slit 18; and this continues throughout the length of the microfiche or the window 275 until the other edge of the slot 281 is in vertical alignment with the edge 277 of the upper clamping element whereupon the slot 281 is no longer available to permit the projection of the light rays to the drum surface.

In order to minimize loss of light intensity as the imaging rays of a microimage is presented to the xerographic drum, an air-tight housing 283 is provided between the base plate 15 and the variable slit assembly 18. The housing 283 is of sufficient length to traverse the length of the drum 20 and of a width that will not interfere with the light rays projecting onto the drum surface. Since the imaging rays are fairly confined (see FIG. 28) the width of the housing 283 is relatively small and requires little room in the machine.

*Indexing programming*

As previously stated, the microfiche carriage 100 supporting the microfiche holder 48 is adapted for three independent movements; one in the transverse direction or from left to right as viewed in FIG. 9 for indexing the microfiche from one row to another; one in the longitudinal direction or from bottom to top, as viewed in FIG. 9, for indexing the microfiche from one column to another column; and in a scanning movement wherein the microfiche is moved from left to right, as viewed in FIG. 9, for scanning each of the microimages as they are arranged in a particular row and column of the microfiche. In order to control these three individual movements, the microfiche handling mechanism 12 is provided with limit switches that are adapted for actuation when the microfiche holder arrives at the limits of its travel in each of the specific directions that the microfiche is conveyed. There are other electrical components to be described hereinafter which also integrate in the total operation of indexing in two directions and scanning in order to accomplish complete reproduction of the entire microfiche.

In FIGS. 30 through 33 these limit switches are shown in relation to the microfiche holder 48 for certain positions of operation. In order to facilitate illustrations of the cooperative relationships between the microfiche holder and the switches, other structure not pertinent to the illustrations of these operations have been purposely left out. However, these switches are shown in one or more of the other figures in the drawings in order to maintain complete illustration of the structural arrangement of the microfiche handling mechanism.

In FIG. 30 the microfiche holder is shown arranged such that the microimage numbered 5 is in a "start of scan" position relative to the alignment clamping mechanism 220 wherein the light line made available by the slot 281 is positioned for the start of scanning. In this location of the microfiche holder, that is at the "start of scan" position, a switch 18LS mounted on the frame plate 15 actuated to one operative condition for the electrical circuit in the machine to be described hereinafter. This switch comprises a normally open switch 18LSA and a normally closed switch 18LSB, one of which is closed while the other is open when the switch is actuated. The switch 18LSA has been designated the "scan home" switch which is closed when the microfiche is positioned just prior to or at "start of scan" position for any of the microimages on the microfiche. In this position of the microfiche, the bracket 197 secured to the scanning platform 117 is out of engagement with the actuator for the resulting in the closing of the switch 18LSA and opening of the switch 18LSB.

The scanning platform 117 also supports a switch contacting actuator 285 secured by suitable screws on the platform. The actuator 285 is adapted to engage a cam 286 secured to a lever 287 pivoted by a pin 288 to a support and having a projection 290 engageable with the actuator for a limit switch 5LS suitably mounted on the vertical support 163 (see FIG. 12). In FIG. 30, the actuator 285 is shown in the "start of scan" position, which normally maintains the switch 5LS in an open position. When the platform 117 is moved during scanning for a distance approximately 20 percent of the scanning stroke, the actuator 285 engages the point of the cam 286 thereby producing clockwise rotation of the lever 287 which in turn causes actuation of the switch 5LS to a closed position. This actuation is momentary since the actuator 285 moves past the point of the cam 286 allowing the switch 5LS to revert back to its open position, as shown in FIG. 31. However, during this momentray actuation of the limit switch 5LS, as will be described hereinafter, certain circuit elements will be energized for specific functioning of the xerographic machine and, once energized, no longer need continued closure of the switch 5LS.

In FIG. 31, the No. 5 microimage is shown at the "end of scan" position wherein the slot 281 is at the other end of its relationship with the microimage, the actuator 286 has been moved beyond the cam 286; and the bracket 196 has actuated the actuator for the switch 18LS for permitting closing of the switch 18LSA and opening of the switch 18LSB. During scanning of the microimage No. 5, the microfiche holder 48 would have moved from the position illustrated in FIG. 30 to the position illustrated in FIG. 31 and back to the position of FIG. 30 in order to complete both strokes of the scanning operation for the machine. During this complete cycle of a scanning operation, only the switches 18LSA, 18LSB, and 5LSA are actuated by the moving structure that is related to the scanning operation.

Figure 32:
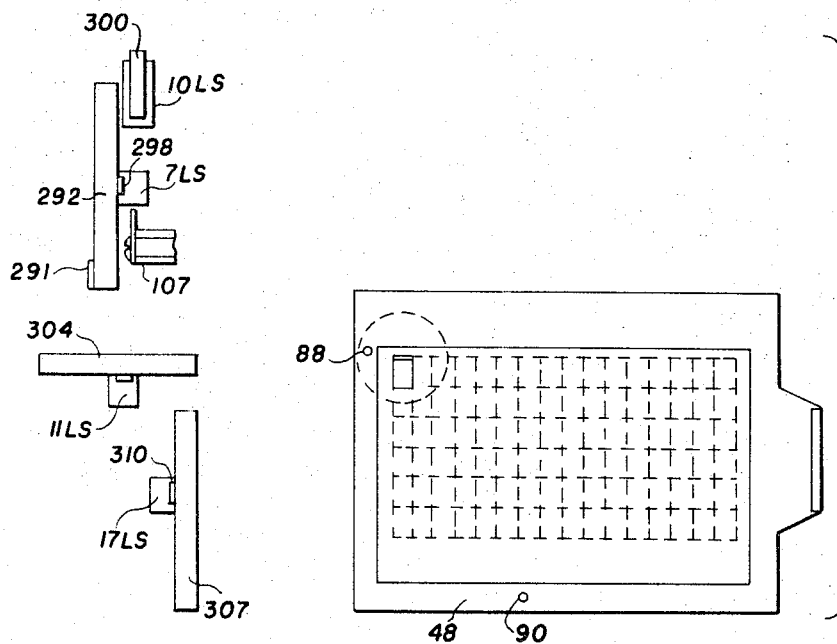

In FIG. 32, the microfiche holder 48 is shown in the position just prior to the scanning of the first microimage in row F or the last row of the microfiche. In this position of the holder 48 or for any position wherein a microimage in column 1 of the microfiche is between the clamping elements of the clamping mechanism 220, that is, the microimages numbered 1, 17, 33, 49, 65 or 81 are in scanning position, a longitudinal home switch 7LS will be actuated to a closed position. This closing of the switch will be accomplished by means of the engagement of a tab 291 secured at one corner of the track 168 with a switch actuating mechanism. The actuating mechanism comprises a switch bar 292 pivotally mounted on an upright plate 293 secured to the base plate 15 which also supports the switch 7LS (see FIG. 29). The switch bar 292 is U-shaped with the bight portion arranged parallel to the columns in the microfiche and its arms 294 depending therefrom. The arms 294 are pivotally mounted on the plate 293 by a pair of pivot pins 295 arranged horizontally at the upper edge of the plate.

As viewed in FIG. 11, the switch bar 292 is adapted for rocking movement about the pivot pins 295 and is releasably held in a vertical plane by means of spring biased lock elements 296 mounted within the plate 293 and adapted to project outwardly under spring pressure from the plate 293 when notches 297 formed on the lower ends of the arms 293 are brought into alignment with the elements 296. When rotated in either direction, the notched portions of the arms 294 engage the locked elements 296 forcing the same inwardly, thereby overcoming the locking engagement provided by the lock element and its respective notch. When the switch bar 292 is actuated toward the vertical such that the notches 297 are in alignment with the lock elements 296, the latter will project outwardly within the notch for releasably retaining the switch bar 292 in its vertical position.

In actual practice, the switch bar 292 pivots or rotates a very small distance and serves to actuate an actuator element 298 for the switch 7LS. The length of the horizontal light portion of the switch bar 292 is of such length as to enable the switch 7LS to be actuated for any position of the microfiche holder when in position to scan the first microimage of each row of the microfiche. As the microfiche holder is moved from row to row, the tab 291 is adapted to engage the switch bar for actuating the switch 7LS when the holder is in the "home" position which event occurs when the first microimage of each row is in the scan position.

As shown in FIG. 30, the tab 291 is positioned away from the switch bar 292 since the microimage No. 5 is in the scan position. In FIG. 32, the tab 291 is shown in engagement with the switch bar 292 since the microimage No. 81 is in the scan position.

The microfiche handling apparatus 12 is also provided with a second "home" switch 10LS comprising a normally open contact 10LSA and a normally closed contact 10LSB. The contact 10LSA is actuated to a closed position when the microfiche holder reaches its "end of scan" position for any of the first 16 microimages or the entire row A. The switch 10LS is mounted on an upstanding plate 299 secured to the base plate 15 and includes an actuator 300. In FIG. 30 with the microimage No. 5 in the "begin of scan" position, the transverse home switch 10LSA is in an open position; and in FIG. 31 at the "end of scan" for this microimage, the switch 10LSA is actuated in a closed position by a tab 301 secured to one edge of the outer race 107 and engageable with the actuator 300 for the switch. When the race has been indexed to position the microfiche out of row A, the tab 301 is moved out of engagement with the actuator to permit opening of the switch 10LSA. In FIG. 32 it is noted that the tab 301 has been moved out of contact with the switch actuator 300 with the microfiche in the position for the scanning of the microimages of row F.

In further controlling the programming for the microfiche 40, depending upon the position of the microfiche, and in order to condition the same for further automatic operation, the microfiche handling apparatus 12 is provided with a pair of switches actuable when the last microimage on the microfiche has been positioned in a scanning position for controlling operation of a microfiche counting mechanism and bring the microfiche back to its original start position wherein the microimage No. 1 is in scanning position either to commence reproduction of the microfiche or to allow removal therefrom from the machine. The first of these switches, indicated as 11LS and designated the end transverse switch, is mounted on an upstanding plate 302 and has an actuator 303 adapted to be moved for actuating a switch by a switch bar 304 pivotally mounted on the plate 302 by suitable pins 305 secured at the lower ends of the arms for the switch bar. The switch bar 304 and its associated structure is exactly the same as the previously described switch bar 292 and its associated structure. The switch bar 292 is adapted to be rotated by the tab 88 secured to the microfiche holder 48. As previously described, the tab 88 is located adjacent the reference corner 45 for the microfiche in alignment with the line 42 thereof.

The other switch that actuated when the microfiche is in a position for permitting scanning of the last microimage thereof is labeled 17LS and designated the end longitudinal switch. This swtich is secured to a vertically extending plate 306 secured to the base plate 15 and adapted to pivotally support a switch bar 307 pivotally mounted on pins 308. Since the switch bar 307, its associated structure and the operation thereof are exactly the same as the switch bar 292, its associated structure and operation, further details thereof will not be necessary. When pivoted, the switch bar 307 is adapted to actuate an actuator 310 for the switch 17LS which actuation is produced by the tab 90 secured to the lower surface of the microfiche holder 48. The function of the switches 11LS and 17LS is to condition the microfiche handling mechanism circuit for returning the microfiche to its original starting position, that is, the position wherein the microimage No. 1 is in the "ready to scan" position. In order to accomplish this, as will be described hereinafter in the description of the electrical circuit, both switches must be actuated to a closed position.

During normal reproduction wherein the microfiche is indexed to place each of the microimages in a scan position, either one of the switches 11LS or 17LS, but not both, will be actuated to a closed position. However, in order to terminate operation of the machine and permit returning of the microfiche to its original starting position, both switches must be in the closed positions at the same time. In FIG. 30, wherein the microimage No. 5 is in the scan position, neither of the switches 11LS or 17LS will be actuated, in fact, during indexing of the microfiche for the microimages contained in rows A, B, C, D and E and in the columns numbered 1 through 15, neither of the switches 11LS or 17LS will be actuated.

Figure 33:
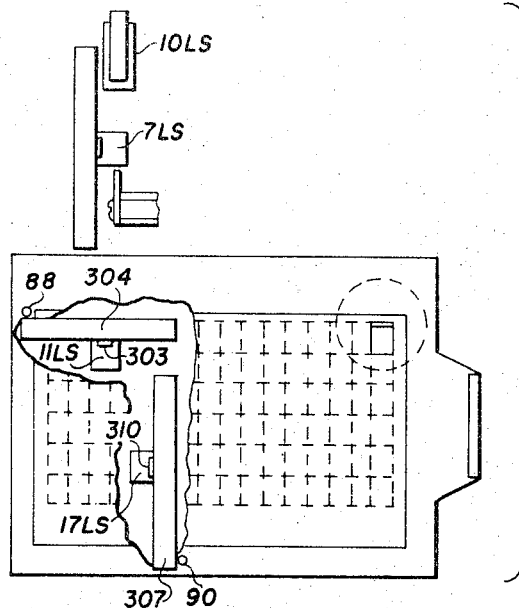

In FIG. 32 wherein the microimage No. 81 is in the scan position, the tab 88 is of sufficient distance from the actuator bar 304 to prevent contact therewith. When the microfiche is indexed to any of the microimages in the sixteenth column, the tab 90 will engage the actuator bar 307. However, the electrical circuit for the apparatus will not be affected thereby. In FIG. 33 wherein the last microimage No. 96 is in position for scanning, the tab 88 has been moved to engage the switch bar 304 for actuating the switch 11LS to a closed position. Similarly, the tab 90 has been moved into contact with the switch bar 307 for actuating the switch 117LS to a closed position.

In effect then, in order to establish closing of both switches at the same time, the microfiche must have been indexed to the last row and the last column thereof, such position being illustrated in FIG. 33. In the event that the microfiche 40 is provided with only 5 rows of microimages, that is, rows A through E, the tab 88 should be moved downwardly as viewed in FIG. 30 a distance equal to the length of a microimage. This will align the tab 88 with the outermost line connecting the microimages in the E row. In the event that the microfiche contains something less than 16 columns, the tab 90 should be moved a distance equal to the width of a microimage for each column less than 16.

It is preferable that for a microfiche having something less than six rows and/or sixteen columns that special holders 48 be provided wherein the tabs 88, 90 will be prearranged corresponding to the microfiche that that holder will be adapted to support. In the event that a single style of holder 48 is desirable, the lower surface thereof may be provided with predrilled apertures extending in a line and spaced from each other in that line the length of a microimage for actuating the switch 11LS, and in the other line the width of a microimage for actuating the switch 17LS. In order to accommodate microfiche of different number of microimages, an operator need only insert pins corresponding to the tabs 88 and 90 within the proper apertures for establishing the end transverse and end longitudinal switch actuation.

The xerographic machine that may be utilized for producing xerographic reproductions is generally of the type disclosed in the patent to Mayo et al., Patent No. 3,062,109. In the patented machine there is incorporated a programmer of the type disclosed in the patent to Eichler et al., Patent No. 3,090,616. The programmer described in the above-referred to patents consists of two rotatable clutch elements having cam risers thereon to activate both a paper feed mechanism and a paper pick-off mechanism of the xerographic machine. As one clutch element is rotating and programming the various steps still required to produce the finished reproduction of a first copy, the machine is free to start on a second cycle using the second clutch element to activate the processes required to complete the reproduction of a second copy. By the time the machine is set to scan a third copy, the first clutch element has completed its programming operation and is ready to control the cycling program for a third copy. In the present invention, the programmer includes a third switch to be actuated by the clutch elements in proper sequence with the other switches actuated by the programmer in cooperation with the microfiche handling mechanism 16.

It should be pointed out at this time that the terms first, second and third copy refer figuratively to any sequence of copies of the same or different microimages on the microfiche card. Specifically, the programmer comprises three subassemblies: namely, a clutch assembly 320, a clutch release mechanism 321, and a microswitch assembly 322, shown in detail in FIGS. 34 to 36, inclusive.

The above-described assemblies are supported by frame plates 323 and 324 which optionally, as shown, may be formed as an integral element of the xerographic machine frame proper, or alternatively may be formed as a separate unit for mounting to the xerographic machine.

The clutch assembly includes a pulley 325 mounted on the outer end of a programmer shaft SH–1 that is journaled in suitable bearings 326 provided in the frame plates 323 and 324; the pulley 325, which is a drive pulley, being connected to a pulley on the drum shaft SH–2 by a suitable belt (not shown) adapted to drive the drum shaft at a constant speed relative to the speed of shaft SH–1. When applied to the shaft SH–1, the inner end of pulley 325 abuts a thrust bearing 326 inserted in the outer surface of frame plate 323; a set screw 327 being provided whereby the pulley may be clamped tightly to the shaft and against said thrust bearing thereby limiting axial movement of the shaft in one direction. To limit axial movement of the shaft in the opposite direction, there is provided a snap ring 328 secured in a suitable groove formed on the shaft, a snap ring being positioned to abut against a thrust washer 330 positioned against the inner surface of the frame plate 323. The programmer shaft SH–1 is driven by means of a pulley 331 secured thereto inboard of the frame plates 323 and 324, the pulley being operatively connected to a main drive motor M1 in a conventional manner by a suitable belt (not shown).

The clutch element 332 of the clutch assembly proper is mounted by its hub on shaft SH–1, and is secured against rotation relative to the shaft by engagement of a radial screw 333 carried by the shaft with a recess provided in the end of the hub of said clutch element. A second clutch element 334, which is complementary to clutch 332 is fixedly secured on shaft SH–1 by a set screw 335. The complementary clutch elements 332 and 334 therefore turn with shaft SH–1 whenever it is rotated. A third and a fourth clutch element 336 and 337, respectively, which are described in greater detail hereinafter, coact with the complementary clutch elements and are free for relative rotation with respect to the shaft under conditions of clutch slippage, clutch elements 336 and 337 being held apart in spaced relation to each other by a bearing element 338 mounted on shaft SH–1.

The complementary clutch elements 332 and 334 are of the annular plate type having inwardly facing frictional surfaces 340 made of suitable material such as cork, secured as by gluing to the annular undercut portions of the inward faces of clutch elements.

In order to provide means for applying the required pressure to the coacting clutch elements to meet operational conditions, a compression spring 341 is applied around the shaft between clutch element 332 and the thrust washer 330, the latter abutting a second thrust washer 342 positioned adjacent frame 324. The force of spring 341 should be sufficient to permit the clutch elements 336 and 337, when free to rotate, to be driven by the clutch elements 332 and 334, respectively, while still permitting the clutch elements to slip relative to each other when clutch elements 336 and 337 are secured to prevent their rotation.

The clutch elements 336 and 337 are essentially flat discs provided on their outer peripheral surfaces with cam risers 343 and 344, respectively, adapted to be engaged by suitable holding means described in detail hereinafter, whereby the clutch elements may be retained against rotative movement until released by the holding means, the cam risers also being adapted, when the clutch elements are rotating, to actuate a microswitch 3LS also described hereinafter. The clutch elements 336 and 337 are also provided with an inwardly projecting cam pin 345 that is secured to these clutch elements as by peening over the end of the cam pin passing through the clutch elements, the cam pin being adapted to actuate a second microswitch 4LS, described hereinafter.

Figure 35:
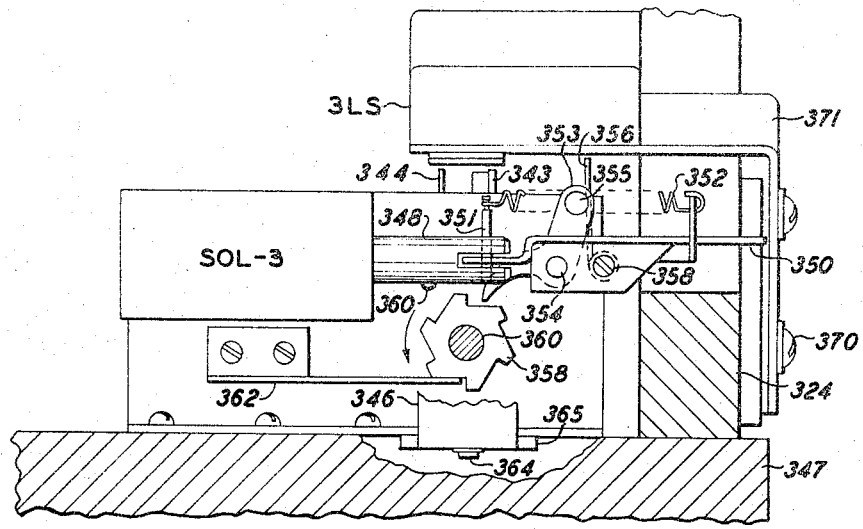
FIG. 35 is a rear view of the programmer with parts broken away to show details of the structure.

The clutch release mechanism generally designated 321 includes base panel 346 by means of which the operating elements of the clutch release mechanism may be supported to a frame element, in this case, the base 347. The base panel 346 has attached in one corner thereof on one of its upstanding legs the normally de-energized programmer released solenoid SOL-3 having a plunger 348. As seen in FIG. 35, the plunger is notched to receive one end of a slide 350, the other end of the slide being guided in a suitable notch formed in an inturned leg member of the base panel. The slide 350 is secured to the plunger of the solenoid by means of a pin 351 which also secures one end of a spring 352, the opposite end of the spring being secured to the inturned leg member of the base panel 346, whereby the plunger is normally maintained in an extended position by the spring, it being noted that the spring should be of sufficient tension to normally maintain the plunger extended while still permitting the plunger to be retracted when the solenoid SOL-3 is operated.

The slide 350 has a depending leg to which a pawl 353 is pivotally secured intermediate its ends by a pin 354. At one end of the pawl 353 is positioned a pin 355 which engages a spring 356 positioned and secured by means of a screw 357 to the same leg of the slide to which the pawl is mounted whereby the pawl is normally biased into engagement with a ratchet 358 mounted on spindle 360 journaled in the upstanding legs of the base panel 346. During each indexing stroke, the pawl is guided near the end of its stroke by pawl guide 361 to further insure contact of the pawl with a tooth of the ratchet. A flat spring 362 element is secured to the base panel 346, the end of the spring being positioned to prevent clockwise rotation of the ratchet as illustrated in FIG. 35.

Figure 36:
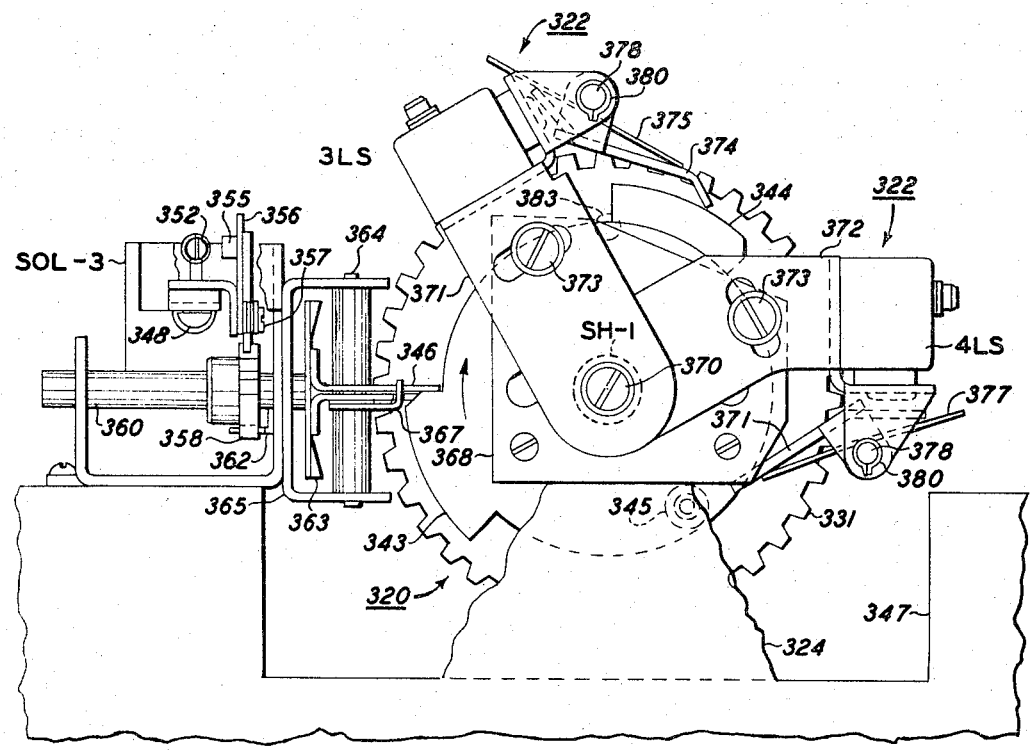
FIG. 36 is a left-hand view of the programmer.

As seen in FIG. 36, the spindle 360 also has affixed thereto a circular cam plate 363 having angular cam faces formed thereon. Mounted at right angles to the spindle is a latch shaft 364 journaled in lateral side plates of a U-shaped bracket 365 mounted on base panel 346, the shaft supporting a pair of complementary latch arms 366 normally biased into contact position to engage the cam risers of the clutch elements 336 and 337 by means of springs 367.

The microswitch assembly 322 consists of a mounting plate 368 secured to frame plate 324 so that the pivotal pin 370 threadedly engaged into the mounting plate 368 is concentric with the axis of the shaft SH-1. A pair of microswitch brackets 371 and 372 are pivotally secured by pin 370 and are adjustably secured to the support plate by means such as screws 373 which are threaded into the support plate and project through slots provided in the microswitch brackets. The microswitch brackets 371 and 372 support microswitches 3LS and 4LS, respectively. The microswitch 3LS is actuated by a lever 374 spring biased by spring 375 in contacting relationship with either of the clutch elements 336 and 337 whereby as either of these clutch elements are rotated, the lever will be actuated by the raised cam surfaces thereon. The microswitch 4LS is similarly operated by means of a lever 376 also biased into normally noncontacting position by means of spring 377, the operation of the microswitch being effected by the cam pin 345 in clutch elements 336 and 337 as they are rotated.

The lever 374 and the lever 376 are pivotally mounted to the microswitch brackets 371 and 372, respectively, by means of pins 378 held in place on the brackets by snap rings 380.

Solenoid SOL-3 of the clutch release mechanism and the microswitches 3LS and 4LS of the microswitch assembly are connected to a suitable electrical circuit, described hereinafter, the microswitches 3LS and 4LS controlling respectively the operation of the solenoid SOL-1 of the paper feed mechanism 23 and the solenoid SOL-2 of the paper pick-off mechanism 26.

A third microswitch is also actuated by rotation of the clutch element 336 in a predetermined sequence relative to the actuation of the switches 3LS and 4LS. The third switch, 6LS, is the end-of-scan switch for the microfiche handling mechanism and is mounted by a bracket 381 to the base plate 347. Actuation of the switch is accomplished by a lever 382 pivotally mounted on the frame of the switch 6LS and having a wheel 383 adapted for camming by the cam pipe 345 on the clutch element 336. The wheel 383 is located above the shaft HS-1, as viewed in FIG. 36, in order to accomplish proper sequencing of the actuation of the switch 6LS relative to switches 3LS and 4LS. It will be noted that the cam pin 345 will engage the cam wheel 383 at approximately one-third of a revolution of the shaft SH-1 before it engages the lever 371 for the proper pick-off switch 4LS.

In the operation of the programmer, the clutch elements 332 and 334 are constantly rotated during the operation of the xerographic machine since they are fixed to programmer shaft SH-1 driven by main drive motor M1. The clutch elements 336 and 337, loosely mounted on shaft SH-1 so that they are free for relative rotation with respect to said shaft under conditions of clutch slippage, are prevented from normally rotating with said shaft SH-1 by means of the latch arm 366 adapted to engage the leading edge of the cam risers of the clutch elements 336 and 337.

As solenoid SOL-3 is energized, the plunger 348 forces the pawl 353, by engagement with the ratchet 358, to index the cam plate 363 to force a latch arm temporarily out of engagement with a cam riser of a clutch element 336 or 337 to release it for rotation with shaft SH-1 by means of its respective coacting clutch element 332 or 334. Once a clutch element 336 or 337 has been released for rotation, it only rotates through one revolution, its motion again being arrested by a latch arm 366 biased back into a clutch element engaging position by spring 367. During this single revolution, the cam riser of the rotated clutch element 336 or 337 first trips microswitch 3LS, then the cam pin 345 thereon trips the microswitch 6LS and finally the microswitch 4LS.

*Machine operation*

With the details of the apparatus thus described when used in conjunction with continuously operative xerographic printing apparatus, continuous xerographic reproductions are produced from the microimages on the microfiche 40 in approximately 15 seconds for each image. Since the present invention is not concerned with the specific xerographic processing apparatus except for the cooperative relationship therewith, a detailed description of a processing apparatus is not necessary. A preferred xerographic processing apparatus, with some modification, that may be utilized for reproducing the microimages on the microfiche is disclosed in the Patent No. 3,062,109, to Mayo et al. The following description for the operation of the apparatus so far described and the electrical circuit for this apparatus will include the processing components that are described in the foregoing cited patent.

Figure 3:
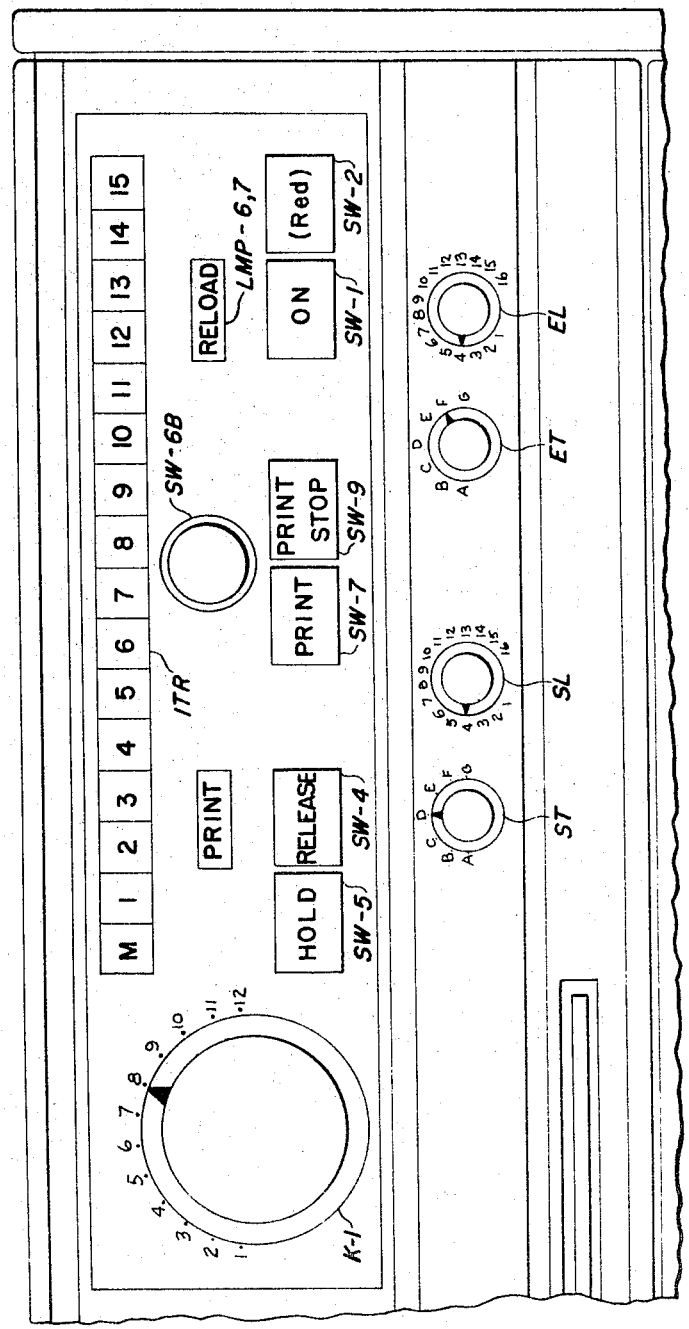
FIG. 3 is a view of the control panel for the machine mounted in the control section thereof.
Figure 38:
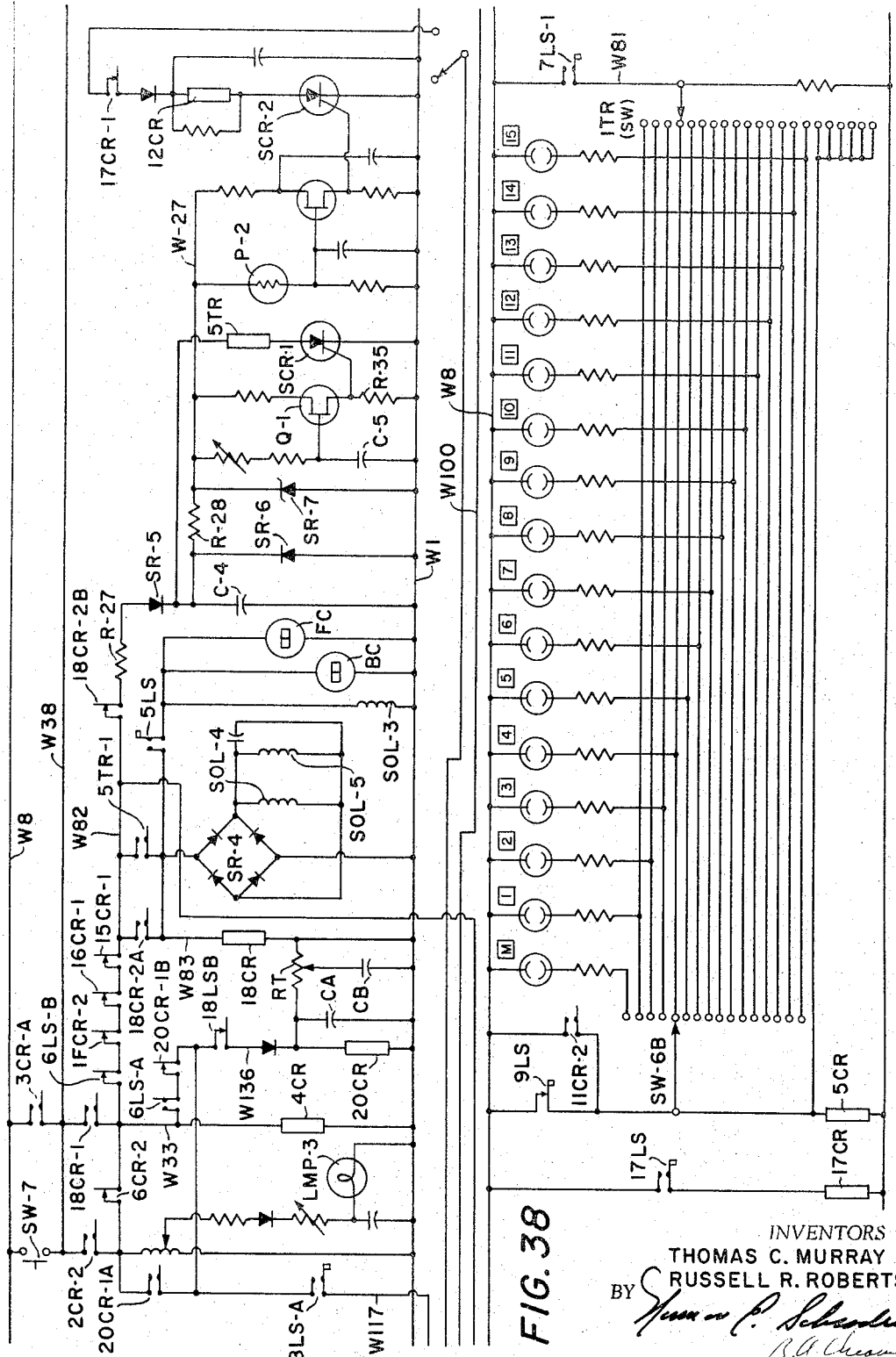

A clearer understanding of the operation of the apparatus described above and of the electrical circuit controlling the various elements can best be obtained by reference to the schematic wiring diagrams of FIGS. 37, 38 and 39 and the main operator actuable switches and signal lights of the electrical circuit being illustrated in the drawing of the control panel as shown in FIG. 3.

On the control panel the "On" control switch SW-1 is used initially to start and ready the machine for automatic printing operation. Once actuated, the machine will assume a "Stand by" condition wherein all the functions of the machine are off except that the fuser heater and an exhaust fan will continue to operate. The "Print" control switch SW-7 is used to commence scanning of the microimage No. 1 and subsequent automatic indexing and scanning of the other microimages when the microfiche is properly in position in the microfiche handling mechanism. This switch can be actuated at any time when the machine is in the "Stand by" condition. The "Print Stop" control switch SW-9 is used to shut off the projector lamp, the microfiche handling mechanism and also to initiate shutdown of the xerographic processing components. When actuated, the machine will go into "Shutdown" immediately. The microfiche holder 48 will then revert to its initial position, and the machine will revert to the "Shutdown" condition. The "Off" control switch SW-2 is used to stop the entire machine immediately in the event that an emergency requires this action, or from the "Stand by" condition at the end of a day. The "Copy Selector" control SW-6B is a rotary selector switch with knob for preselecting the number of runs to be made for the entire microfiche card for a range of one to fifteen copies or for multiple copies when the position "M" is utilized. This control is also used to shut down the machine automatically when the preselected number of runs has been attained.

The "Reload" lamps LMP-6 and LMP-7 will be illuminated when the paper supply drops below a predetermined number, such for example, twenty sheets. When this occurs, the machine will automatically revert to the "Stand by" condition and cannot be started until the paper supply is replenished. For a single run of the microimages on a microfiche, the operator turns the selector knob SW-6B to the numeral "1" and depresses the "Print" control SW-7. The microfiche handling mechanism will scan and print each microimage of the microfiche and deliver prints to an output tray. At the completion of the final scan cycle, the indexing mechanism will automatically return the microfiche back to its original position and will automatically shut down the xerographic machine when the last print is delivered. The machine will then revert to 50-second "Shutdown" condition ready for the same or another microfiche to be printed.

Before the xerographic machine may be actuated, all of the cabinet doors must be closed in order to close the door interlock switches 1LS, 2LS, 19LS and 20LS. This provision is made not only from a standpoint of safety but also to cause proper circulation of air through the machine by means of a pair of fans, not shown, driven by fan motors M4, M5. In addition to these interlock switches, a drum interlock switch 14LS, which may be located behind the drum 20, should be closed by installing the drum. A developer housing interlock switch 13LS is also closed by securing the developer housing in its proper operating position.

Assuming that the paper tray is provided with sufficient paper and that the microfiche holder has been properly placed in the microfiche carriage in order to open the normally closed "frame in position" limit switch 9LS to open the circuit to the shutdown relay 5CR and that the proper number of copy runs have been selected with the selector switch SW-6, the first operation on starting the machine is for the operator to press the "On" button SW-1. This will supply 115 volts at 60 cycles to the main wires W1 and W2 and will energize the relay 1CR through the closed contacts SW-1, 14LS, 3TR-1, SW-2, 20LS, 19LS, 1LS, 2LS, 13LS and the relay contact 9CR-1. This energizes the main power relay 1CR which will remain energized through its own holding contact 1CR-3, and will close the contacts 1CR-2 and 1CR-3. The closing of the contact 1CR-1 provides power to the rest of the system by way of the wire W8, and closing the contact 1CR-2 provides power to the primary coil of a transformer T-2 having a plurality of secondary coils and switches, one of which supplies energy to the main fuser heating element R-1, another for the timer relay 2TR and the missdetector relay 8CR. The closing of the contact 1CR-3 retains energization of the relay 1CR through the normally closed "Off" switch SW-2 and the "On" switch SW-1 which is held in only momentarily and may be released. All of the functioning devices in the machine are now in condition for energization through the closed contact 1CR-1 which operation may be interrupted in the event that the "Off" switch SW-2 or any of the switch contacts in series therewith are opened.

The missdetector apparatus which is not shown in the drawings, except schematically in the electrical diagram in FIG. 37, includes a photocell P-1 located adjacent the paper sheet pick-off mechanism 26. The photocell is adapted to sense the presence or absence of a sheet of paper at some point during rotation of the drum 20, which point is located after a sheet should have been picked off the drum. The presence of a sheet on a drum causes an increase in the light falling on the photocell thereby decreasing the resistance of the photocell and causing an increase in the current through the relay 8CR. With this increased current, the relay 8CR is energized to cause opening of the normally closed contact 8CR-1, which opens the short circuit around the relay 9CR and allows the relay 9CR to energize through the resistor R-3. With the relay 9CR energized, the normally closed relay contact 9CR-1 is opened to cause deenergizing of the main power relay 1CR and complete power interruption to the circuit. In addition, the contact 9CR-2A closes to lock the coil of the relay 9CR through the drum interlock switch 14LS and also causes opening of the contact 9CR-2B for preventing the renewal of the short circuit around the coil of the relay 9CR when the contact 9CR-1 again closes.

The missdetector mechanism is reset by removing the drum to release the switch 14LS for removing power from the coil of the relay 9CR in order to permit closing of the normally closed contact 9CR-1.

With the main relay contact 1CR-1 closed, power is applied to the main circuit wire W8 for supplying power to the document lamp blower motor M6; the document lamp LMP-2 interrupted, however, until scanning commences by a normally open contact 4RC-1; the discharge lamp LMP-1; the corotron power supply PS-1; the missdetector lamp LMP-24; the paper pick-off solenoid SOL-2 through the normally open limit switch 4LS; the main drive motor M1; the xerographic toner brush motor M2; the brush exhaust fan motor M3; the 70-second timer 4TR; the intake motors M4 and M5; the exhaust motor M7; the microfiche scan motor M10; and the pressurizing blowers M8 and M9.

As shown in FIG. 3, the control panel for the machine is provided with a document lamp knob K-1 which is adapted to position a pointer to any one of a plurality of numerals for varying the supply of voltage to the document lamp LMP-2; the knob K-1 is connected to the secondary of a transformer T-1 for controlling this voltage which controls the intensity of the projection lamp in accordance with the density of the microfilm utilized in the microfiche card. Any suitable arrangement of the numerals utilized with the document lamp intensity knob may be utilized. For example, clockwise rotation of the knob may increase the intensity of the lamp, while on the other hand, counterclockwise rotation of the knob may produce a lowering of this lamp intensity.

After a period of twenty seconds has elapsed for the time delay relay 2TR to be activated, it closes its normally open contact 2TR-1 for energizing the relays 2CR and 7CR. The twenty-second time delay is utilized to permit preheating of the fuser element R-1 before the machine can start to make copies. Energization of the relay 2CR opens the normally closed contact 2CR-1 to the time delay relay 2TR for taking this component out of the circuit. With the relay 7CR energized, its holding contact 7CR-2A closes in order to maintain the relays 2CR and 7CR energized after the contact 2TR-1 opens.

In this condition, the machine is ready for operation which will be accomplished when the "Print" button SW-7 is closed.

Before depressing this button, however, the operator should select the number of copy runs to be made of the microfiche card and also to determine whether the entire microfiche or certain portions thereof are to be reproduced. In order to simplify the description of the operation of the machine, the random frame selection circuit will be described in the closing paragraphs of this description. It will be assumed that the machine is in condition to commence the scanning of the microimage frame No. 1, that indexing of the entire microfiche will occur, and that four reproductions of the contents of the microfiche have been preselected with the selector switch SW–6.

Assuming then that the machine is in condition for reproducing a full microfiche card, operation commences when the "Print" switch SW–7 is closed by the operator. Closing of this switch causes energization of the relay 3CR through the wire W38 and a normally closed relay contact 5CR–1. As soon as the relay 3CR becomes energized, it remains in this condition by its holding contact 3CR–A which closes immediately upon the closure of the switch SW–7. Closing of the contact 3CR–A provides electrical power to the wire W33 through the contact 2CR–2 which is closed when the relay 2CR was energized, and the normally closed contact 6CR–2. This circuit provides electrical power for a relay 4CR which, upon energization, closes the contact 4CR–1 for producing energization of the document lamp LMP–2. Closing of the contact 3CR–A also provides electrical power to the wire W82, through the normally closed "end of scan" switch 6LS–B, the random frame relay contact 1RFCR–2, and the normally closed contacts 16CR–1 and 15CR–1.

With the wire W82 energized, a timer circuit including the timer 5TR will be energized as well as a photocontrol circuit utilized for detecting the last frame in the microfiche. The timer relay 5TR will become energized through a circuit which includes a normally closed contact 18CR–2B, resistor R–27, a selenium rectifier SR–5 and a wire W18. However, the timer relay 5TR does not become energized since it is connected in series with a normally nonconducting silicon controlled rectifier SCR–1. In order to produce energization of the timer relay, the wire W82 is connected to a timing circuit which includes a capacitor C–5, a network comprising a capacitor C–4, a resistor R–28, a diode SR–6 and a zener diode SR–7 and a unijunction device Q–1. The capacitor C–4 filters out the rectified signal produced with the rectifier SR–5, and the devices SR–6 and SR–7 maintain constant voltage in the circuit. As the capacitor C–5 begins to assume the charge, the charging voltage from the wire W82 also brings the base of the unijunction Q–1 up to a predetermined potential wherein it will suddenly conduct to provide a sharp rise in voltage across the resistor R–35 which sends a pulse to the rectifier SCR–1. When influenced by this pulse, the rectifier SCR–1 will automatically flip "On" to a conducting condition and thereby maintain energization of the timer relay 5TR.

Energization of the relay 5TR produces closing of its contact 5TR–1 for applying electrical power to the wire W83. This electrical power produces energization of the relay 18CR which becomes locked in through its own contact 18CR–2A. When the relay 18CR is energized, the contact 18CR–2B is opened for de-energizing the timer circuit just described. This timer circuit remains de-energized until the completion of the scanning of the microimage No. 1 which commences when the wire W83 became energized. When the wire W83 became energized with the locking in of the contact 18CR–2A, the D.C. bridge circuit SR–4 became energized for commencing the scanning of the microimage No. 1.

With the bridge circuit energized, the solenoid SOL–4 becomes energized to produce a force upon the pinch roller 186 relative to the drive rod 185 for forcing the latter against the drive roller 184. Simultaneously with this action, the clamping solenoid SOL–5 is energized for activating the microfiche alignment clamping mechanism 220. The microfiche and the clamping mechanism are moved for the scanning operation relative to the projection optical axis X, as previously described. When approximately 20 percent of the scanning stroke has been accomplished, the program start limit switch 5LS is closed momentarily by the engagement of the element 285 upon the switch actuating member 287. When the switch 5LS is actuated to its closed position, the programmer release solenoid SOL–3 is energized along with the billing counter BC and a frame counter FC. With the solenoid SOL–3 energized, the programmer which comprises the clutch assembly 320, the clutch release mechanism 321 and the microswitch assembly 322 is connected to the main drive for the xerographic apparatus.

As previously stated, this programmer controls the point at which sheet paper is fed to the drum 20, the pick-off mechanism 26, and the actuation of the end of scan limit switch 6LS which is actuated when the scanning of a microimage has been completed. The limit switch 6LS has two contacts, one of which is opened and the other one closed when actuated. At the end of a scan stroke when the switch 6LS is actuated, the normally open contact 6LS–A closes to complete the circuit through the wire W136 and the normally closed contacts 20CR–1B and 18LS–B to a RC timer network comprising a variable resistor RT and two capacitors CA and CB. In addition, the relay 20CR is energized and locked in by its contact 20CR–1A which closes when the relay is energized. This energization of the relay 20CR will also open the contact 20CR–1B; however, the RC circuit will produce a slight delay in the de-energization of the relay 20CR in order to allow the contact 20CR–1A to remain closed for maintaining the relay 20CR in its energized position, until and slightly after the microfiche carriage 100 completes its return stroke.

Actuation of the switch 6LS also causes opening of the normally closed contact 6LS–B which breaks the power connection to the wire W82 which in turn causes de-energization of the relay 18CR. With the relay 18CR de-energized, power to the selenium rectifier SR–4 is cut off for releasing the scan solenoid SOL–4 and the clamp solenoid SOL–5. This will allow the microfiche carriage 100 to begin the return stroke to its home position at the same time that the alignment clamping mechanism 220 releases its engagement with the microfiche. Once the microfiche carriage reaches the home position, the limit switch 18LS is actuated.

The sequence of operation that can occur when the switch 18LS is actuated may be any one of three different modes, depending on whether the microfiche is at the end of a row, at the end of a column, or at the begin of scan position for a microfiche frame that is not at the end of a row or column. For the present, it will be assumed that the microfiche carriage has just scanned a microimage that is not at the end of a row or at the end of a column. In this situation, when the limit switch 18LS is actuated, its normally open scan "home" contact 18LS–A is closed to provide electrical power to the longitudinal escapement solenoid SOL–6 by way of the wire W117 and the normally closed contact 2FCR–1. When the wire W117 is energized, it also energizes the relay 16CR, closing 16CR–2 for providing electrical energy to the wire W113 and down through the normally closed contact 13CR–3B to the indexing coil for the linear motor LM–2. This will index the microfiche carriage 100 one frame since the solenoid SOL–6, when energized, releases the latching element 128 from a notch 124 to allow the linear motor to drive the index rod 118 for indexing the carriage.

As previously stated, when the scan home position switch 18LS was actuated by the movement of the scanning platform 117 to the home position, the relay 20CR was energized and remained so for a short period of time as determined by the RC timing circuit. During this delay, the microfiche carriage was indexed longitudinally the one frame previously described. Once the RC circuit has timed out, the relay 20CR will became de-energized for de-energizing the wire W117 which is on longer necessary since the indexing function has been completed. With the wire W117 de-energized, the longitudinal escapement solenoid SOL-6 drops out. This releases the longitudinal indexing mechanism 115 back into its position to lock the carriage in the succeeding frame. When the wire W117 became de-energized, it also dropped out the relay 16CR which cut the electrical power to the linear actuator LM-2.

The actuation of the limit switch 6LS by means of the programmer shaft SH-1 was only a momentary actuation, and this switch will revert back to its original condition before actuation. In this original condition, the contact 6LS-B is closed which will provide electrical power to the wire W82 for commencing the timing function for the beginning of the next scan by the timing circuit comprising the timer relay 5TR. The charging of the capacitor C-5 when the contact 6LS-B closes is performed as the microfiche carriage is returning to the begin-of-scan position so as to be in condition to permit energization of the timer relay 5TR at the line the carriage reaches the begin-of-scan position. The next indexing function will occur in the same manner as previously described for the first scan, that is, first the timing determination and then the energization of the linear actuator circuit to the indexing coil for the linear actuator LM-2. This operation continues, that is, use of the timing function to energize relay 5TR, scanning of the microimage, successive indexing of the microfiche carriage until the microfiche carriage arrives at the last frame of the row. Upon this occurrence, the microfiche carriage must be indexed into another row by the transverse indexing mechanism row and also to be moved from the sixteenth column at the end of the row back to the first column in order to commence scanning of the first microimage in the next row.

In moving to the last microimage frame in the sixteenth column, the pin 90 in the microfiche holder 48 actuated the end longitudinal switch 17LS. At the end of scanning for this microimage, the end of scan switch 6LS was tripped during rotation of the clutch element 336. These conditions of the switches will provide energization for both of the linear actuators LM-1 and LM-2 in order to provide indexing of the microfiche carriage in two directions.

When the end-of-scan switch 6LS is actuated, the previously described action takes place: The contact 6LS-A is closed to provide electrical power to the relay 20CR for closing the contact 20CR-1A for conditioning the circuit which includes the scan home switch 18LS-A for receiving an electrical pulse. Actuation of the contact 6LS-B to an open position will terminate energization to the scan solenoid SOL-4 and the microfiche clamping mechanism solenoid SOL-5 for permitting return of the microfiche carriage to the home position under action of the spring 196. Upon reaching the home position, the limit switch 18LS is actuated for closing the contact 18LS-A to provide electrical power to the wire W117. In the previous description of the operation for longtiudinal indexing, only the longitudinal escapement solenoid SOL-7 and the relay 16CR were tied into the wire W117 when the contact 18LS-A was closed. In this sequence of operation, however, the wire W117 is also connected to the relay 17CR. This connection is provided as the limit switch 17LS was closed when the microfiche carriage was indexed into the sixteenth column. This switch remains closed as long as the microfiche carriage is in the sixteenth column. Energization of the relay 17CR closes its contact 17CR-2 for providing electrical power to a wire W115 to produce energization of the relay 13CR which becomes locked in through its own contact 13CR-1 and the normally closed longitudinal home switch 7LS to the main power line W8. In addition, electrical power is supplied to the relay 15CR through now closed contacts 17CR-2.

Energization of the relay 13CR closes its normally open contact 13CR-3A and opens its contact 13CR-3B thereby energizing the reverse coil in the linear actuator LM-2 for driving the microfiche carriage across the entire length of the microfiche to its home position. When the carriage arrives in its home position, the longitudinal home switch 7LS is actuated to an open condition to open the circuit to the relay 13CR for terminating the energization of the reverse coil in the linear actuator LM-2. In addition to the return of the microfiche carriage to its home position, the index coil for the linear actuator LM-1 is also energized to index the microfiche carriage to the next succeeding row. This is accomplished by the energization of the relay 15CR which closes the contact 15CR-2 to provide power to the linear motor LM-1 and to the index coil of this motor through the normally closed contact 14CR-3B. Upon leaving the end longitudinal position wherein the limit switch 17LS was actuated, this switch will be opened immediately as the microfiche carriage moves toward the home position. Opening of the switch 17LS will immediately de-energize the relay 17CR for breaking the connection to the wire W115 by the previously closed contact 17CR-2. However, the relay 13CR remains energized by the closure of its holding contact 13CR-1 thereby maintaining energization of the reverse coil of the linear actuator LM-2 until the carriage returns home.

With the relay 13CR still in an energized state, its contact 13CR-2 remains closed to provide power from the wire W117 to the transverse escapement solenoid SOL-7. The longitudinal escapement solenoid SOL-6 also remains energized during the return of the microfiche to its home longitudinal position in order to hold the latch element 171 out of any of the notches 172 in the indexing rod 155. As stated above, the contact 14CR-3B is normally closed while the contact 14CR-3A is open for normally providing electrical power to the indexing coil for the linear actuator LM-1. This particular coil, when energized, normally produces indexing of the actuator from row to row. Energization of the indexing coil for the linear actuator LM-1 causes movement of the microfiche carriage a distance equal to the length of a microimage frame as previously described.

In order to provide electrical power to the linear actuator LM-1 and LM-2, both relays 15CR and 16CR must be energized. In the case of the linear actuator LM-1, the relay 15CR will be energized through the previously described circuit which includes the contact 17CR-2 and the wire W117. In the case of the linear actuator LM-2, the relay 16CR will be energized through the circuit which also includes the wire W117 but which is divided into a parallel circuit separable by the contact 13CR-2.

During complete operation of the microfiche handling mechanism 12 wherein various rows and columns of microimages are to be reproduced, the relay 16CR will be energized when the microfiche has been indexed to a last column; and relays 15CR will be energized when the microfiche carriage has been indexed to the last microimage in a particular row. When either or both of these relays are energized in order to actuate the indexing or reversing function, either or both of the normally closed contacts 15CR-1 or 16CR-1 in the wire W82 will open to terminate power to the scan and clamp solenoids SOL-4 and SOL-5, respectively. This arrangement prevents inadvertent scrapping and damage to the microfiche. Both of these relays are energized when the microfiche carriage has been moved to the last column or the last microimage in any particular row.

The process of scanning, longitudinal indexing for the microimages in each row, transverse indexing after each row has been completed continues until the entire microfiche has been completely scanned. During this time, the xerographic processing apparatus functions continuously to make an enlarged reproduction of each microimage on the microfiche. For each of these scanning cycles, scanning commences when the carriage platform returns to the begin-of-scan position and the timer relay 5TR has been energized through the previously described timer circuit for providing power from the wire W82 to the wire W83 for energizing the relay 18CR. This in turn will energize the clamping solenoid SOL-5 and the scanning solenoid SOL-4.

During each scan cycle, the light pattern of the microimage being scanned is projected by means of the optical projection lens 17 onto the surface of the continuously rotating drum to dissipate the drum charge in accordance with the light pattern thereby forming an enlarged latent electrostatic image of the microimage on the drum. The exposed portion of the drum then rotates into the developing station where the image is developed by the developer 22 whereby the toner particles adhere to the electrostatic image to form a xerographic powder image in the configuration of the microimage. The exposed and developed portion of the surface of the drum then passes to the transfer station where it receives a sheet of paper that is being fed to the drum by paper feeder mechanism 23. During scanning of the microimage, when approximately 20 percent of the scan has been accomplished, the program start switch 5LS is tripped to energize the program release solenoid SOL-3. Energization of the solenoid SOL-3 allows the clutch element 336 to be rotated with the shaft SH-1 in order to trip the microswitch 3LS for energizing a clutch solenoid SOL-1 which will permit feeding of a sheet of paper by the paper feed mechanism 23 onto the surface of the drum in registration with the electrostatic latent image on the drum.

Since the details concerning the paper feed mechanism 23 and its related structure and its operative connection with the solenoid SOL-1 forms no part of the present invention, such details will not be described. Such details may be found in the above-referred to patent to Mayo et al. Continued rotation of the clutch element 336 will trip the microswitch 6LS for terminating the scanning motion of the carriage platform 117 whereupon the platform and consequently the microfiche carriage 100 will begin its return to the start-of-scan position. Further rotation of the clutch element 336 trips the microswitch 4LS for energizing the pick-off solenoid SOL-2 for stripping the sheet of paper from the xerographic drum and placing the sheet upon the conveyor belt 27 of the transport mechanism 28.

Details of the pick-off mechanism, its related structure, form no part of the present invention and are adequately disclosed in the above-referred to patent to Mayo et al. As previously stated, with the limit switch 6LS having been actuated when the microfiche carriage reaches the end-of-scan position which occurs at the same time that the switch 6LS is adapted for actuation by the cam pin on the clutch element 336, the microfiche carriage will commence returning to the begin-of-scan position. Actuation of the switch 6LS closes the contact 6LS–A to energize the relay 20CR and also to charge the capacitor CA in the RC timer circuit. Energization of the relay 20CR closes the contact 20CR–1A. However, the indexing circuits still require the closing of the begin-of-scan switch contact 18LS–A which occurs when the microfiche carriage reaches the begin-of-scan position. The relay 20CR remains energized because of the charge provided in the RS timing circuit.

When the microfiche carriage has been indexed to the last row or row F and to the last column, column 16, in order to place the ninety-sixth microimage frame in position relative to the optical axis X to be scanned, the end longitudinal switch 17LS will be actuated. The end transverse switch 11LS has already been actuated when the first frame in row F was in scanning position and for the ninety-sixth frame, both switches 17LS and 11LS will have been actuated. This will provide energization of the relay 13CR and the relay 14CR at one time, and both of which become locked in through their own relay contacts. This causes energization of both linear actuator reverse coils, returning the carriage back to the home position in both directions, that is, the transverse home position and the longitudinal home position. In accomplishing this movement, the transverse escapement solenoid SOL-7 would have been energized to release the latching element 128 from the rod 118 for permitting the actuation by the linear actuator LM-1 upon the microfiche carriage 100 to return the same to the home position. Similarly, the longitudinal escapement solenoid SOL-6 would have been energized to release the latching element 171 from the longitudinal rod 155 to permit actuation by the linear actuator LM-2 for returning the microfiche carriage to the longitudinal home position.

When the microfiche carriage has been returned to the two home positions, the longitudinal home switch 7LS is actuated to an open condition; and the transverse home switch 10LS is actuated to open the normally closed contact 10LS–B. In moving away from the two end positions, both relays 13CR and 14CR are de-energized, and this is accomplished by the de-energization of the solenoids SOL-6 and SOL-7. The microfiche handling mechanism 12 is now in condition for another production run of the microimages in the microfiche or the removal of the microfiche holder from the apparatus. With the microfiche carriage in the two home positions, the apparatus assumes a "Standby" condition awaiting further action by the operator or continued operation of the machine in the event that multiple copy runs have been preselected into the machine. In the event that only one complete run was chosen or selected into the machine, when the microfiche carriage has returned to the home position, the machine will assume a "Standby" condition; and the operator must remove the microfiche holder from the carriage 100 or reset the machine for another run.

In order to produce one complete reproduction run of all of the microimages on the microfiche, the selector switch SW-6 is manipulated to the position "1" on the control panel in order to align the contact arm SW-6B with the proper contact. When the longitudinal home switch 7LS was actuated after the microfiche carriage arrived at its home position upon completion of the run, the contact 7LS-1 is closed to provide power to the wire W81 for stepper switch selection 1TR (SW) the selector switch. This power will permit advancement of the stepper section of one step which for a single run will result in the stepper contact arm moving to the "1" position contact and connection with the contact to which the selector switch SW–6B was actuated. This connection will provide power to the circuit for the relay 5CR. When the relay 5CR is energized, it opens the normally closed relay contact 5CR-1 for opening the circuit to the relay 3CR which will become de-energized to open its contact 3CR–A and the circuit along the wire 38 as well as the timer circuit along the wire W82. In addition, the normally closed contact 3CR–B is allowed to close for providing power by way of the wire W47 to the reload lamps LMP-6 and LMP-7 indicating to the operator that the machine is in condition for a rerun or the removal and insertion of another microfiche holder. Closing of the contact 3CR–B provides the power through the now-closed contact 5CR-2 to the reset timer relay coil 1TR which returns the 1TR (SW) contact arm to the zero position. Power is also supplied to the relay timer coil 3TR which is a 50-second shutdown timer. The operator has 50 seconds in which to restart the machine for another run or to commence the reproduction of another microimage. If no other input is provided the machine, after 50 seconds the machine will shut down in the normal way, that is, the normally closed relay contact 3TR-1 in the power section of the circuit drops out, and the entire machine is shut down.

Assuming that multiple runs for the reproduction of the microfiche are desirable and for discussion purposes, it is desired that four reproductions of the entire microfiche be made. The selector switch section SW-6B will be rotated until its contact is set to the position No. 4 as shown in FIG. 38. As each run is made, that is, all of the microimages on the microfiche have been reproduced, the stepper contact 1TR (SW) steps up one position. In addition, the count stepper coil 1TR count is advanced one position in the switch section SW–6A. When the fourth run has been completed and the microfiche carriage is driven to the home position to close the longitudinal home switch 7LS, the contact in the stepper 1TR (SW) is interconnected with the contact for the switch contact SW–6B, by a conductor which runs through the switch, thereby completing the circuit to the relay 5CR. This energization will close the relay contact 5CR–2 for tripping the reset coil 1TR reset which immediately takes the stepper contact 1TR (SW) and returns it back to zero by a spring return which is built into the stepper. In addition, the contact 5CR–1 is opened to de-energize the relay 3CR permitting opening of the contact 3CR–B for commencing the 50-second timing cycle of the timer 3TR. At the same time that this relay is dropped out, the print lamps LMP–4 and LMP–5 go out; and the reload lamps LMP–6 and LMP–7 are energized to indicate to the operator that the machine is finished making the desired number of runs. After the 50-second time period has transpired and no further input has been introduced into the machine, the timer contact 3TR–1 in the main circuit will open thus terminating power to the main power relay 1CR.

As previously described in connection with the microfiche alignment clamping mechanism 220, the present apparatus is provided with a last frame detecting circuit for insuring that the microfiche cards will return to the home position in both directions in the event that the microfiche does not include a full complement of microimages. Heretofore, in the previous discussion, a microfiche, by way of example, was provided with 96 microimages in order to fill six rows and sixteen columns of the microfiche. In the event that the microfiche card is of a size which may include six rows and sixteen columns but actually only a few microimages are provided and the remaining portion of the microfiche card is clear, the photocell detecting circuit is provided for terminating further indexing of the microfiche carriage and to insure its return to the home position after the last microimage has been scanned.

For purposes of this description, it will be assumed that the rows A and B are filled with microimages, that is, each row includes sixteen microimages, and that row C is provided with eight microimages, that is, columns 1 through 8 are provided with microimages for the row C. The photocell P–2 on the upper clamping mechanism 223 is adapted to receive light from the light source 260 located upon the lower clamping lever and normally a microimage will intercept the light between the light source and the photocell whereupon the photocell will receive a minimum of light thereon.

As shown in FIG. 38, the photocell P–2 is connected between the neutral wire W1 and the wire W27 for receiving energy from the wire W82 when the contact 18CR–2B is closed. This contact remains closed when the relay 18CR is not energized. Normally, the resistance of the photocell P–2 is above a preset value when a microimage is positioned between the light source and the photocell. In the event that the eighth microimage in row C is being scanned, the space that would have been occupied by the microimage No. 9 is clear, thereby permitting a sharp increase of light to fall upon the photocell P–2.

In this event, the resistance of the photocell will fall below a preset value and the silicon controlled rectifier SCR–2 will become energized. Once the rectifier fires, a D.C. voltage will result for energizing the relay 12CR. This remains energized and armed until the next time that the wire W117 becomes energized, that is, when the scan home switch contact 18LS–A has been closed by movement of the microfiche carriage to the begin-of-scan position. As previously understood, when the wire W117 becomes energized, it is the result of a normal indexing signal; however, in this case, the signals from the wire W117 bypass the end transverse switch 11LS and instead is carried through the now closed contact 12CR–2 for directly energizing the relay 14CR and, when the contact 14CR–1 is closed, to energize the relay 13CR. This would have been the condition of the microfiche apparatus when the microimage of the last row and the last column has been scanned. Under these circumstances then, the microfiche carriage returns to the home position and the apparatus goes through its normal shutdown procedure unless the operator restarts the apparatus or the machine has been conditioned for producing another run.

The microfiche handling mechanism 12 is also provided with a hold and release circuit which will permit manual termination of the operation of the machine to allow the operator to place it in "Standby" condition for any purpose, such as, adding paper in the event that there is a paper shortage during the reproduction run for the microfiche and before the end of the run has been reached. This circuit will stop further operation of the machine at the frame wherein termination is induced and will condition the apparatus for continuation of the production when the machine is restarted without losing the count during the process.

The hold and release circuit includes a hold switch SW–5 and a release switch SW–4 connected between the main wires W1 and W2. This circuit also includes the paper supply limit switch 8LS which is normally open when there is sufficient paper in the paper tray mechanism 24 for operation of the machine. When the paper supply drops below a predetermined limit, the switch 8LS is actuated closing the contact 8LS–A energizing the relay 6CR which remains closed and through its holding contact 6CR–1. In addition, the contact 6CR–2 is opened which also happens when the microfiche is at an end-of-scan position. Opening of the contact 6CR–2 can also be accomplished by pushing the hold switch SW–5. In either of these two events, that is, automatic opening when a paper shortage occurs and the switch 8LS closes or the operator closes the hold switch SW–5 before paper shortage occurs but is low enough to need a greater quantity of paper, the opening of the contact 6CR–2 may occur during the scanning of a microimage. It is important that the machine does not disrupt the particular scan sequence presently in progress. This scan sequence will not be interrupted simply because the relay 18CR still remains energized and will remain so until the end-of-scan switch 6LS has been actuated. With 18CR energized, the contact 18CR–1 is closed for bypassing 6CR–2 in the event that scanning is in progress when the latter switch has opened.

Assuming then that the particular scanning function has been completed and the contact 6CR–2 is opened, as previously described, indexing of the microfiche carriage is accomplished to the next microimage since the indexing circuit is independent of the energization of the wire W82. At the end of the scanning procedure, the relays 15CR and 16CR are de-energized since both of these relays require for energization electrical power in the wire W117. With this energization, the contacts 15CR–1 and 16CR–1 in the wire W82 are opened. Under these circumstances then, the control circuit does not call for the end of the machine sequence nor does it call for another scan cycle, in fact, the machine remains in this condition until the release button SW–4 is released to open the circuit to the relay 6CR for closing the contact 6CR–2 and provide power to the circuits connected to the wire W82. Assuming again that the paper is supplied to the paper feeder tray 23 in order to open the paper supply switch 8LS–A, the machine will commence scanning the next microimage after the last one previously scanned before shutdown. Just prior to the shutdown of the machine, the microfiche carriage was indexed to the next frame and assumed a begin-of-scan attitude before shutting down. Once the paper supply switch 8LS–A has been closed and the power supply to the apparatus has been restored, the apparatus will now continue to scan and index until the microfiche has been comletely reproduced.

The microfiche handling apparatus control circuit is also provided with a "Print-Stop" switch SW–9 as shown in FIG. 37. This is generally used in the event that the operator desires to have the microfiche carriage be driven to the home position in the event that is is determined that the wrong frame has been scanned or in the event that the operator wishes to replace the microfiche. In other words, the operator desires to stop the machine wherever it may be at the time to return the microfiche carriage back to its home position in order to permit him to remove the microfiche card and insert a new one. In this condition of the machine, it is in 50-second "Shut-down" condition.

As shown in FIG. 37, the "Print-Stop" switch SW–9 is connected between the main wire lines W1 and W8 and is in series with a relay 11CR which becomes energized when the switch SW–9 is closed. Energizing the relay 11CR closes its contact 11CR–2 which bypasses the frame in position switch 9LS to energize the relay 5CR. As stated before, when the relay 5CR is energized, the relay 3CR is de-energized because of the resultant opening of the contact 5CR–1. Regardless of when the "Print-Stop" button is pushed, if a microimage frame is in the process of being scanned, this scanning will continue until the end-of-scan switch 6LS has been actuated at the end of scanning for the microfiche carriage. In addition, the contact 11CR–1A is closed for causing energization of the relay 14CR which in turn will cause energization of the relay 13CR in order to permit energization of the linear actuators to drive the microfiche carriage to the home position. The machine will now revert to a shut-down cycle as previously described.

*Random frame selection circuit*

The random frame selection circuit that is incorporated in the microfiche handling mechanism 12 and the associated circuits permits the operator to select any microimage frame that he desires to commence a reproduction run, select the last frame of his run and to reproduce all of the microimage frames that extend between his selected starting and terminating frames and to make multiple copies of these microimages whether it be a single microimage or any number of microimages short of the total number on the microfiche card.

As shown in FIG. 3, the control panel is provided with four selector switches having knobs and pointers that may be moved manually to various letters and numerals. During the description of the microfiche card 40, the microimages were arranged in six longitudinal rows designated with the capital letters A through F, and the columns were arranged transversely and designated by numerals from one through sixteen. In FIG. 3, the switch ST designates the start transverse function of the random selection circuit and is manually manipulated to point to the row in which is positioned the microimage that the operator desires to commence his run. The second switch SL, or the start longitudinal switch, is manipulated to register the number of the column in which the selected microimage is arranged. For purposes of illustration, the ST switch is positioned for row D and the SL switch is positioned to the fourth column of that microfiche card. For the microfiche previously described, the particular microimage so designated would be the fifty-second microimage of the card. The ET or an end transverse switch designates the row of the microfiche which will contain the microimage that terminates the particular production run. The switch EL or end longitudinal switch is manipulated to bring the microimage to which the production run is to terminate as related to the column of the microfiche. For purposes of illustration, the ET switch has been manipulated to row F and the EL switch has been manipulated to designate the fourth column. In other words, the terminating microimage for this particular run is the ninety-fourth microimage of the microfiche.

In normal operation, when the entire microfiche is desired to be reproduced, the switch ST is set for the A row, the switch SL is set to column "1," the switch ET is set for row F, and the switch EL is set to the sixteenth column. These were the conditions that were assumed in the foregoing discussion of the operation of the microfiche handling mechanism to produce an entire microfiche.

Each of the selector switches ST, SL, ET and EL is provided with a count stepper solenoid and a reset stepper solenoid similar to the selector switch SW–6. As shown in FIG. 39, the start transverse switch ST is provided with a selector contact which is manipulated to the desired row of the microfiche card to begin the production run. This switch is also provided with a stepper wiper arm which advances one row as each row is completed and until in coincidence with the selected row contact whereupon further stepping by this switch will cease. Similarly, the start longitudinal switch SL is provided with a selector contact which is manipulated to position its contact arm to the desired column of the microimage that will be the first to be scanned. This switch is also provided with a stepper contact arm which will advance one position for each microimage scanned along a row until the wiper arm is in coincidence with the contact that was preselected by the contact arm.

The end transverse switch ET, as shown in FIG. 37, is also provided with a select contact arm which is manipulated to register the row containing the last microimage to be scanned in a particular run. Similarly, the end longitudinal switch EL is provided with a select contact arm which is manipulated to be positioned with the proper column containing that microimage. The switches ET and EL are provided with stepper contact arms which advance one position as microimages are scanned. The reset coils STR, SLR, ETR and ELR for the four switches will return the respective stepper contact arms to their starting position.

The random frame selection circuit also includes a small timer motor M11 which is connected between the main wire W1 and the main wire W8 through a relay contact 1FCR–1. The motor M11 is provided with a suitable cam on its shaft for continuously opening and closing a limit switch MS for alternately opening and closing the normally open contact MS–1 and the normally closed contact MS–2. The motor M11 rotates at a very slow speed and generates pulses alternately in the conductors W100 and W101. The conductor W100 carries the pulses produced by the repeated closing of the contact MS–1 to the longitudinal escapement mechanism solenoid SOL–6 to energize the same for producing indexing per pulse of the longitudinal rod 155 for the microfiche carriage. As the motor shaft rotates to produce a series of pulses, the solenoid SOL–6 will be energized repeatedly in order to index the same per pulse until the carriage reaches the preselected column which in our example is column 4. In addition, both relays 15CR and 16CR are pulsed.

The conductor W100 is also utilized to periodically energize the solenoid SOL–7 in order to produce indexing of the microfiche carriage from row to row until the preselected row which in our case is row D has been attained. When the microfiche carriage has arrived at a position to present the fifty-second microimage into a begin-of-scan position, the apparatus is now in condition for commencing reproduction of those microimages occurring at the fifty-second frame until the preselected ending microimage on the microfiche has been reached and scanned.

The power that is supplied the random frame selection circuit is acquired through a wire W102 which is connected to the main power wire W8 through a normally open contact 1FCR–1. This contact is closed when the relay 1FCR is energized by virtue of the "Print" button SW–7 being closed. Actuating the "Print" button provides power to the wire W38 and through the normally closed contacts 3FCR–1 and 5FCR–1 to the relay 1FCR. When the main circuit was energized, that is, when the main relay 1CR was energized to close the relay contact 1CR–1, power was supplied through the wire W8 and the wire W103 to the stepper contact arms for the selector switches ST and SL.

As the transverse index rod 118 indexes the microfiche carriage to the preselected row D position, the stepper contact arm for the ST selector switch advances as the coil STS is pulsed by the pulses which travel through the wire W100, normally closed contact 4FCR–1 and normally closed contact 3FCR–1. When the stepper contact arm reaches row D, power is supplied to the relay 4FCR through a circuit which includes the now closed contact 1FCR–1, the selector contact arm for the ST switch and the stepper contact arm. Relay 4FCR remains energized by way of the wire W103 and its now closed contact 4FCR–2. Similarly, the coil SLS is energized in step-by-step fashion to position the stepper contact arm for the SL selector switch until it is in coincidence with the selector contact arm for this switch whereupon the relay 2FCR is energized and held in by its own contact 2FCR–2. The selector switches ST and SL are now in satisfied condition, and the machine is in condition to commence reproduction of the first microimage of the microimages that have been selected for reproduction.

Energization of the relay 2FCR causes closing of its normally open contact 2FCR–3 which closes the circuit to the longitudinal escapement solenoid SOL–6 and the relay 16CR, both of which become conditioned for energization when the wire W117 is pulsed after the completion of a scanning cycle. When the relay 4FCR was energized, its contact 4FCR–3 was closed to condition the transverse escapement solenoid SOL–7 and the relay 15CR for energization by the wire W117. During cycling of the motor M11 when the contact MS–2 is closed, power is supplied by way of the wire W101 to the relay 5FCR through the now closed contacts 2FCR–4 and 4FCR–4. The energization of the relay 5FCR de-energizes the relay 1FCR which in turn causes energization of the wire W82 since the contact 1FCR–2 in this wire is normally closed.

In time, the timer 5TR times out and starts a normal scan sequence of the first preselected microimage, and the start longitudinal and start transverse switches ST and SL will be ineffective. For each microimage scanned, the pulse produced thereby upon closing of the begin-of-scan switch 18LS–B, is conducted, as previously described, by the wire W117 through the now closed contact 2FCR–3 to the longitudinal escapement solenoid SOL–6. Since the stepper coil ELS is connected in parallel with the solenoid, it too becomes energized for each pulse. This action continues until the last frame of a row is reached whereupon the end longitudinal switch 17LS is actuated by the microfiche carriage. As previously described, actuation of the switch 17LS closes the circuit to the relay 17CR for closing the contact 17CR–2 for connecting the wire W117 to relay 13CR. With this relay energized, the reverse coil for the longitudinal linear actuator LM–2 is energized by the closing of the contact 13CR–3A in order to return the microfiche carriage back to its home position wherein column "1" is in position for scanning the first microimage in the next row. Energization of the relay 13CR also closes the contact 13CR–2 in order to permit conduction of the pulse in the wire W117 to the transverse solenoid SOL–7 for producing transverse indexing of the microfiche carriage to the next row. Since the transverse stepper coil ETS is connected in parallel with the solenoid, it too becomes energized when the relay 14CR was energized.

The machine functions in its normal manner, and the end longitudinal stepper coil for the switch EL and the end transverse stepper coil for the switch ET will start and continue to record the position of the longitudinal and transverse indexing rods. As each frame of the microfiche card is scanned and indexed along the longitudinal path and the carriage 100 is transversely indexed, the stepper coils ETS and ELS for the selector switches ET and EL, respectively, advance one position; and this action continues until the preselected contacts are in coincidence with the respective select contact arms. In this sequence of operation, the selector switch ET will be satisfied first since the row D will be attained before the selected column. However, there is no action resulting from this condition until the preselected microimage column is attained. When this occurs and with the wire W82 energized, a pulse is conducted through the selector contact arm for the switch ET, through the stepper contact arm for that switch, through the selector contact arm for the switch EL and finally through the stepper contact arm for the switch EL to connect the relay 7FCR for power. This causes energization of this relay which becomes locked in by its own contact 7FCR–2. With the end transverse stepper contact arm satisfied and the end longitudinal stepper contact arm EL satisfied, and the pulse circuit of the timer 5 TR has de-energized to energize the wire W82 to thereupon energize the relay 7FCR and lock it in by means of the contact 7FCR–2, the next pulse that arrives by way of the wire W117 from the timing circuit energizes the relay 13CR and the relay 14CR through the closed contact 7FCR–1.

With the relay 14CR energized, the microfiche carriage 100 is returned to the home position in the normal mode of operation, that is, the reverse coil of the linear motor LM–1 is energized. In addition, the relay 3FCR is energized to open the contact 3FCR–1 and 3FCR–2, and the stepper coils ELS, ETS, SLS and STS are de-energized and allow the reset circuits of these elements, that is, ELR, ETR, SLR and STR to become energized and to function. The reset coils ELR and SLR become energized when the normally open contact 6FCR–2 is closed as the relay 6FCR is energized along with the relay 13CR. In addition, the relay 5FCR is de-energized along with the relays 2FCR, 7FCR and 4FCR. With the relay 5FCR de-energized, the contact 5FCR–1 to the relay 1FCR is closed. When the longitudinal and transverse indexing rods return to their home position, the relays 14CR and 3FCR are de-energized for allowing the closing of the contact 3FCR–1 causing the energization of the relay 1FCR. Assuming that only one copy run was desired and the selector contact arm on the switch SW–6B is connected through this switch to the stepper arm therefor, the wire W81 will be connected to the relay 5CR for opening the contact 5CR–1 to the relay 3CR. This will open the contact 3CR–A to terminate power to the circuit. For another run, the operator must actuate the "Print" button SW–7 for bypassing the now open contact 3CR–A to reconnect the circuit to the power source.

If a multiple copy position is desired and the selector switch SW–6B was previously manipulated to position the contact arm therefor into registry with a number indicating the number of copy runs desired for those microimages selected, when the relay 1FCR was energized, the sequence continues again, as previously described. When the preselected number of copies are made, the relay 5CR is eventually energized to place the machine in a shutdown condition.

While the invention has been described with reference to the structure disclosed herein, it is not confined to the details set forth; and this application is intended to cover such modifications or changes as may come within the purposes of the improvements or the scope of the following claims.

What is claimed is:

1. An apparatus for producing and controlling sequential movement of a positionable element including:
   a first support means for supporting the positionable element for movement in a first direction,
   first indexing means for imparting incremental movement to said first support means in said first direction, said first indexing means including a first energizable device adapted to produce a single incremental movement of said first support for each energization thereof, a second support means for supporting said first support means and the positionable element for movement in a second direction, second indexing means for imparting incremental movement to said second support means in said second direction, said second indexing means including a second energizable device adapted to produce a single incremental movement of said second support means for each energization thereof, a base structure for supporting said second support means, a drive mechanism mounted on said base and operatively connected to said second support means for driving the same along a path of movement parallel to one of said directions, a control circuit connected to said energizable devices and said drive mechanism and arranged for actuating the latter for imparting driving action to said second support means after each of a predetermined set of incremental movements of one of said support means.

2. An apparatus for producing and controlling sequential movement of a positionable element including:

a first support means for supporting the positionable element for movement in a first direction, first indexing means for imparting incremental movement to said first support means in said first direction, said first indexing means including a first energizable device adapted to produce a single incremental movement of said first support for each energization thereof, a second support means for supporting said first support means and the positionable element for movement in a second direction, second indexing means for imparting incremental movement to said second support means in said second direction, said second indexing means including a second energizable device adapted to produce a single incremental movement of said second support means for each energization thereof, a base structure for supporting said second support means, and a reciprocatory drive system operatively connected to said second support means for imparting reciprocatory motion to the same along a line parallel to one of said directions, a control circuit connected to said energizable devices and said drive system and arranged for actuating the latter for imparting a reciprocatory cycle of movement to said second support means after each of a predetermined set of incremental movements of one of said support means.

References Cited
UNITED STATES PATENTS

| | | | |
|---|---|---|---|
| 1,138,515 | 5/1915 | Todd et al. | 77—63 |
| 2,341,383 | 2/1944 | Johnson | 77—64 |
| 2,791,136 | 5/1959 | Smith | 77—64 |
| 3,155,383 | 11/1964 | Whitmore | 269—58 |
| 3,206,837 | 9/1965 | Holmes | 77—64 |

GERALD M. FORLENZA, *Primary Examiner.*

ALBERT J. MAKAY, *Assistant Examiner.*